United States Patent

Matsuzuki

(10) Patent No.: US 6,697,790 B2
(45) Date of Patent: Feb. 24, 2004

(54) INTELLIGENT DATA STRUCTURE, PROCESSING APPARATUS, AND MEDIUM USING NETWORK

(75) Inventor: Tadao Matsuzuki, Tokyo (JP)

(73) Assignee: Knowledge Modeling Institute, Inc., Tokyo (JP)

(*) Notice: Subject to any disclaimer, the term of this patent is extended or adjusted under 35 U.S.C. 154(b) by 0 days.

(21) Appl. No.: 09/388,784

(22) Filed: Sep. 2, 1999

(65) Prior Publication Data
US 2003/0110174 A1 Jun. 12, 2003

(30) Foreign Application Priority Data
Nov. 18, 1998 (JP) .............................. 10-327963

(51) Int. Cl.[7] .............................. G06F 17/00; G06N 5/00
(52) U.S. Cl. .............................. 706/45; 706/14; 706/925
(58) Field of Search .............................. 706/45, 14, 925

(56) References Cited

U.S. PATENT DOCUMENTS

| | | | |
|---|---|---|---|
| 5,191,522 A | * 3/1993 | Bosco et al. | 705/4 |
| 5,432,926 A | * 7/1995 | Citron et al. | 714/4 |
| 5,862,325 A | * 1/1999 | Reed et al. | 709/201 |
| 5,940,818 A | * 8/1999 | Malloy et al. | 707/2 |

OTHER PUBLICATIONS

Marco Gori et al; A General framework for Adaptive Processing of Data Structures; Sep. 1998; IEEE; 1045–9227; 768–786.*

* cited by examiner

Primary Examiner—Wilbert L. Starks, Jr.
Assistant Examiner—Joseph P. Hirl
(74) Attorney, Agent, or Firm—Ronald Craig Fish; Ronald Craig Fish, A Law Corporation

(57) ABSTRACT

Data processing versatility increases for both other companies and a given company to which a user belongs, information simultaneity can be obtained inside and outside the given company, quick data processing can be performed, and knowledge work processing can be obtained. The data processing apparatus has a reception processing means connected to a network, transmission processing means connected to the network, self data group storage portion, reception data group storage portion, and transmission data group storage portion. The data structure of each storage portion is classified into organization, reference, and general control in the vertical direction and slip, book, and knowledge in the horizontal direction. Although data contents in the vertical direction are the same, they are defined as data having different meanings. Slips and books are managed using identification codes, and knowledge is managed using item data and knowledge table.

18 Claims, 82 Drawing Sheets

| DESCRIPTION OF CREDIT AMOUNT OF CLIENT |||||
|---|---|---|---|---|
| CLIENT NO. 020010 || CLIENT NAME ABCDE COMPANY |||
| DATE OF START OF APPLICATION || DATE OF END OF APPLICATION | CREDIT AMOUNT | STOP OF APPLICATION |
| 97/06/06 || 00/00/00 | 200,000,000 | |
| | | | | |
| | | | END | CANCEL |

[SETTING WINDOW]

FIG. 3A

| ORDER RECEPTION ||||
|---|---|---|---|
| CLIENT NO. 020010 ||| CLIENT NAME ABCDE COMPANY |
| MERCHANDISE CODE XX0001 | UNIT PRICE XXXX | QUANTITY YYYY ||
| AMOUNT OF ORDER RECEIVED OOOOOO ||||
| ||||

[APPLICATION WINDOW]

FIG. 3B

| BUSINESS LOGIC TERM | APPLICATION SOFTWARE (UPPER LIMIT, LOWER LIMIT, PRESENCE, ACCUMULATION) | WORKSHEET ID | WORKSHEET ID | WORKSHEET ID |
|---|---|---|---|---|
| DATE | PRESENCE | 00000 | 00001 | ----- |
| CLIENT NO. | PRESENCE | 00000 | 00001 | ----- |
| MERCHANDISE CODE | PRESENCE | 00000 | 00001 | ----- |
| AMOUNT OF ORDER RECEIVED | UPPER LIMIT, LOWER LIMIT | 00000 | 00001 | ----- |
| AMOUNT OF PURCHASE ORDER | UPPER LIMIT, LOWER LIMIT | 00001 | 00010 | ----- |

FIG. 4

PRESENCE CHECK

| DESCRIPTION OF SUPPLIER | | | | |
|---|---|---|---|---|
| SUPPLIER CODE | SUPPLIER NAME | DATE OF START OF TRANSACTION | DATE OF END OF TRANSACTION | STOP OF APPLICATION |
| 0 1 0 0 | A COMPANY | 91/01/10 | 00/00/00 | |
| 0 2 0 0 | B COMPANY | 92/08/08 | 93/01/20 | |
| 0 3 0 0 | C COMPANY | 93/07/07 | 00/00/00 | |
| 0 4 0 0 | D COMPANY | 92/05/05 | 00/00/00 | |
| 0 5 0 0 | E COMPANY | 94/07/09 | 00/00/00 | |

[SETTING WINDOW]    OK BECAUSE SUPPLIERS ARE PRESENT AS
                    COMPANIES TO WHICH ORDERS ARE MADE

FIG. 8A

| ORDER RECEPTION | |
|---|---|
| ORDER NO. 0 5 0 1 | PERSON IN CHARGE FOR ORDER   MR. D |
| DATE OF ORDER  95/06/06   SUPPLIER CODE  0 3 0 0   C COMPANY | |
| MERCHANDISE CODE   4 5 3 1 2 1 3 | MERCHANDISE NAME   ABC APPARATUS |

[APPLICATION WINDOW]    FIG. 8B

UPPER LIMIT CHECK

| SALES AMOUNT AUTHORITY OF PERSON IN CHARGE ||||| 
|---|---|---|---|---|
| CODE OF PERSON IN CHARGE | 9 5 0 1 0 |||| 
| DATE OF START OF APPLICATION | DATE OF END OF APPLICATION | SALES AMOUNT AUTHORITY | STOP OF APPLICATION | |
| 96/04/01 | 97/03/31 | 500,000 | | |
| 97/04/01 | 99/03/31 | 700,000 | | |
| 99/04/01 | 00/00/00 | 1,000,000 | | |

[SETTING WINDOW]  (OK BECAUSE SALES AMOUNT AUTHORITY IS 700,000 OR LESS)

FIG. 9A

| ORDER RECEPTION ||||||
|---|---|---|---|---|---|
| ORDER NO. 9 7 0 5 0 9 || | CODE OF PERSON IN CHARGE FOR ORDER | 9 5 0 1 0 ||
| DATE OF ORDER 98/01/30 ||| CLIENT | X COMPANY ||
| MERCHANDISE CODE | MERCHANDISE NAME | QUANTITY | UNIT PRICE | AMOUNT ||
| 0 1 0 0 | ABC APPARATUS | 1 0 | 1 0 0 | 1 0 0 0 ||
| 0 2 0 0 | XYZ APPARATUS | 1 0 | 1 5 0 | 1 5 0 0 ||
| | | | TOTAL AMOUNT | 2, 5 0 0 ||

[APPLICATION WINDOW]    FIG. 9B

LOWER LIMIT CHECK

| DESCRIPTION OF DAYS REQUIRED FOR MERCHANDISE DELIVERY ||||| |
|---|---|---|---|---|
| MERCHANDISE CODE | 4 5 3 1 2 1 3 || MERCHANDISE NAME | ABC APPARATUS |
| DATE OF START OF APPLICATION | DATE OF END OF APPLICATION | DAYS REQUIRED FOR DELIVERY | STOP OF APPLICATION | |
| 95/04/01 | 96/03/31 | 5 | | |
| 96/04/01 | 97/03/31 | 4 | | |
| 97/04/01 | 98/03/31 | 3 | | |
| 99/04/01 | 00/00/00 | 2 | | |

[SETTING WINDOW]  OK BECAUSE VALUE OF DELIVERY PERIOD IS LARGER THAN DATE OF ORDER+2 DAYS

FIG. 10A

| ORDER RECEPTION |||||
|---|---|---|---|---|
| ORDER NO. 0 1 0 4 0 || | CLIENT Z COMPANY ||
| DATE OF ORDER 98/07/07 || | DATE OF DELIVERY 99/07/10 ||
| MERCHANDISE CODE | 4 5 3 1 2 1 3 || MERCHANDISE NAME | ABC APPARATUS |
| QUANTITY 1 0 0 || UNIT PRICE 9 5 | AMOUNT 9,500 ||

[APPLICATION WINDOW]  FIG. 10B

UNIT CHECK

| MERCHANDISE SALES SET |||||
|---|---|---|---|---|
| MERCHANDISE CODE | 4 5 3 1 2 1 3 | MERCHANDISE NAME | ABC APPARATUS ||
| DATE OF START OF APPLICATION | DATE OF END OF APPLICATION | SALES SET | STOP OF APPLICATION ||
| 96/04/01 | 97/03/31 | 10 |||
| 97/04/01 | 98/03/31 | 50 |||
| 98/04/01 | 00/00/00 | 100 |||

[SETTING WINDOW]         (OK BECAUSE SALES SET
                          INDICATES MULTIPLE OF 50)

FIG. 11A

| ORDER RECEPTION ||||
|---|---|---|---|
| ORDER NO. 0 1 0 3 0 || PERSON IN CHARGE FOR ORDER RECEPTION | MR. B |
| DATE OF ORDER 98/03/03 || CLIENT X COMPANY ||
| MERCHANDISE CODE | 4 5 3 1 2 1 3 | MERCHANDISE NAME | ABC APPARATUS |
| QUANTITY | 1 0 0 | UNIT PRICE | 9 5 |
||| AMOUNT | 9, 5 0 0 |

[APPLICATION WINDOW]    FIG. 11B

EDIT

| DESCRIPTION OF MERCHANDISE UNIT PRICE FOR EACH QUANTITY | | | | | |
|---|---|---|---|---|---|
| MERCHANDISE CODE | 4 5 3 1 2 1 3 | | MERCHANDISE NAME | ABC APPARATUS | |
| DATE OF START OF APPLICATION | DATE OF END OF APPLICATION | QUANTITY RANGE | | UNIT PRICE | STOP OF APPLICATION |
| 98/04/01 | 00/00/00 | 0 | 99 | 100 | |
| 98/04/01 | 00/00/00 | 100 | 199 | 95 | |
| 98/04/01 | 00/00/00 | 200 | 299 | 90 | |
| 98/04/01 | 00/00/00 | 300 | 399 | 85 | |

[SETTING WINDOW]

FIG. 12A

OK BECAUSE THIS CASE CORRESPONDS TO UNIT PRICE OF 90, WHICH IS THEN EDITED ON WINDOW TO SET VALUE

| ORDER RECEPTION | | | |
|---|---|---|---|
| ORDER NO. 0 1 0 2 0 | | PERSON IN CHARGE FOR ORDER RECEPTION | MR. A |
| DATE OF ORDER 98/06/01 | | CLIENT X COMPANY | |
| MERCHANDISE CODE | 4 5 3 1 2 1 3 | MERCHANDISE NAME | ABC APPARATUS |
| QUANTITY | 2 5 0 UNITS | UNIT PRICE | ¥9 0 |
| | | AMOUNT | ¥2 2, 5 0 0 |

[APPLICATION WINDOW]

FIG. 12B

JAPANESE
ENGLISH
CHINESE

| | SLIP (X1) | BOOK (X2) | KNOWLEDGE (X3) |
|---|---|---|---|
| ORGANIZATION<br>·HEAD OFFICE<br>·BRANCH<br>·BUSINESS OFFICE<br>·CUSTOMER<br>·MERCHANDISE<br>·PRODUCTION LINE<br>·PERSONNEL<br>·SALARY<br>·ACCOUNTING<br>(Y1) | SLIP;<br>VARIOUS SLIPS<br>WHEN SLIP IN<br>THIS COLUMN HAS<br>ACTIVE FLAG<br>"1", SLIP<br>IS USED.<br>THESE SLIPS ARE<br>MAINLY USED IN<br>THIS APPARATUS<br>(X1Y1) | BOOK;<br>VARIOUS BOOKS<br>WHEN BOOK IN<br>THIS COLUMN HAS<br>ACTIVE FLAG<br>"1", BOOK<br>IS USED<br>THESE BOOKS ARE<br>MAINLY USED IN<br>THIS APPARATUS<br>(X2Y1) | KNOWLEDGE;<br>ITEM NAMES<br>OF SLIPS<br>AND BOOKS,<br>DATA IN<br>EACH ITEM<br><br>(X3Y1) |
| REFERENCE<br><br><br><br><br><br><br><br>(Y2) | SLIP;<br>VARIOUS SLIPS<br>THESE SLIPS ARE<br>REGISTERED<br>SLIPS USED IN<br>APPARATUS<br>AND IN ALL<br>BUYERS/VENDORS<br>AND BANKS<br>(X1Y2) | BOOK;<br>VARIOUS BOOKS<br>THESE BOOKS ARE<br>REGISTERED<br>BOOKS USED IN<br>APPARATUS<br>AND IN ALL<br>BUYERS/VENDORS<br>AND BANKS<br>(X2Y2) | KNOWLEDGE;<br>ITEM NAMES<br>OF SLIPS<br>AND BOOKS<br>ON LEFT<br>SIDE, DATA<br>OF EACH<br>ITEM,<br>TABLES<br>(X3Y2) |
| GENERAL<br>CONTROL<br><br><br><br><br><br><br><br><br><br><br>(Y3) | SLIP;<br>VARIOUS SLIPS<br>IN CASE OF<br>COMMUNICATION<br>FROM HEAD<br>OFFICE, BRANCH,<br>BUYER/VENDOR,<br>OR BANK THROUGH<br>SLIP WITH<br>ACTIVE FLAG<br>"1", CHECK FLAG<br>IS SET AT "1"<br>(X1Y3) | BOOK;<br>VARIOUS BOOKS<br>IN CASE OF<br>COMMUNICATION<br>FROM HEAD<br>OFFICE, BRANCH,<br>BUYER/VENDOR,<br>OR BANK THROUGH<br>SLIP WITH<br>ACTIVE FLAG<br>"1", CHECK FLAG<br>IS SET AT "1"<br>(X2Y3) | KNOWLEDGE;<br>ITEM NAMES<br>OF SLIPS<br>AND BOOKS<br>ON LEFT<br>SIDE, DATA<br>OF EACH<br>ITEM,<br>TABLES<br><br><br>(X3Y3) |

FIG. 14   DATA STRUCTURE OF SELF DATA GROUP

| KNOWLEDGE MODELING INSTITUTE CO., LTD | |
|---|---|
| | COMPANY |

| | |
|---|---|
| COMPANY CODE | 100 |
| COMPANY NAME | KOTOBUKI SHOJI CO., LTD |
| PHONETIC TRANSCRIPTION OF COMPANY NAME | KOTOBUKI SHOUJI KABUSHIKI KAISHA |
| ABBREVIATION OF COMPANY | KSC |
| ENGLISH NAME OF COMPANY | Kotobuki Syouji Co.,Ltd |
| ENGLISH ABBREVIATION OF COMPANY | KSC |
| POSTAL CODE | 164 |
| ADDRESS | NAKANO-KU, TOKYO |
| BUILDING NAME | NAKANO BUILDING |
| TELEPHONE NUMBER | 03-3377-8877 |
| FAX NUMBER | 03-3377-8899 |

RECORD: 1 / 1      END

FIG. 23

KNOWLEDGE MODELING INSTITUTE CO., LTD

PC OF KNOWLEDGE NETWORK

| COMPUTER ID | ▼WKS0010 |
|---|---|
| COMPUTER NAME | TOKYO SALES ADMINISTRATIVE DIVISION, BUSINESS OPERATION MANAGEMENT SECTION PC-WKS0010 |
| COMPUTER COUNTRY NUMBER | 81 |
| COMPUTER TELEPHONE NAME | 03-3577-8801 |
| NAME OF SITE OF USE | NAKANO |
| POSTAL CODE | 164 |
| ADDRESS | NAKANO-KU, TOKYO |
| BUILDING NAME | NAKANO BUILDING |
| TELEPHONE NUMBER | 03-3377-8877 |
| FAX NUMBER | 03-3377-8899 |

RECORD: 1 / 2

[END]

KNOWLEDGE MODELING INSTITUTE CO., LTD

PC OF KNOWLEDGE NETWORK

| | |
|---|---|
| COMPUTER ID | ▼WKS0024 |
| COMPUTER NAME | FUKUOKA SALES OFFICE PC-WKS0024 |
| COMPUTER COUNTRY NUMBER | 81 |
| COMPUTER TELEPHONE NAME | 092-365-7365 |
| NAME OF SITE OF USE | HAKATA |
| POSTAL CODE | 810-01 |
| ADDRESS | HAKATA-KU, FUKUOKA-SHI, FUKUOKA-KEN |
| BUILDING NAME | HAKATA BUILDING |
| TELEPHONE NUMBER | 092-376-5451 |
| FAX NUMBER | 095-376-5599 |

RECORD: |◄|◄| 2 |►|►|*| / 2

[END]

KNOWLEDGE MODELING INSTITUTE CO., LTD

DATA STORAGE PC FOLDER OF COMPANY

COMPUTER ID ▼ WKS0010    TOKYO SALES ADMINISTRATIVE DIVISION, BUSINESS
OPERATION MANAGEMENT SECTION PC-WKS0010

| FOLDER NAME | Knowledge Data |
| COMPANY CODE | 100 |
| COMPANY NAME | KOTOBUKI SHOJI CO., LTD |

| FOLDER NAME | |
| COMPANY CODE | |
| COMPANY NAME | |

RECORD: 2 / 2
RECORD: 1 / 2

END

FIG. 26

| KNOWLEDGE MODELING INSTITUTE CO., LTD | | |
|---|---|---|
| DATA STORAGE PC FOLDER OF COMPANY | | |
| COMPUTER ID ▼ WKS0024　　FUKUOKA SALES OFFICE PC-WKS0024 | | |
| FOLDER NAME | Knowledge Data | |
| COMPANY CODE | 100 ▼ | |
| COMPANY NAME | KOTOBUKI SHOJI CO., LTD ▼ | |
| ▲ FOLDER NAME | | |
| COMPANY CODE | | |
| COMPANY NAME | | |
| RECORD: |◄ ◄ 2 ► ►| ►* / 2 | | |
| RECORD: |◄ ◄ 2 ► ►| ►# / 2 | | |

FIG. 27

KNOWLEDGE MODELING INSTITUTE CO., LTD    SELF PC OF KNOWLEDGE NETWORK

| Field | Value |
|---|---|
| COMPUTER ID | WKS0010 |
| COMPUTER NAME | TOKYO SALES ADMINISTRATIVE DIVISION, BUSINESS OPERATION MANAGEMENT SECTION PC-WKS0010 |
| COMPUTER COUNTRY NUMBER | 81 |
| COMPUTER TELEPHONE NUMBER | 03-3577-8801 |
| NAME OF SITE OF USE | NAKANO |
| POSTAL CODE | 164 |
| ADDRESS | NAKANO-KU, TOKYO |
| BUILDING NAME | NAKANO BUILDING |
| TELEPHONE NUMBER | 03-3377-8877 |
| FAX NUMBER | 03-3377-8899 |

[END]

| KNOWLEDGE MODELING INSTITUTE CO., LTD | | |
|---|---|---|
| PC TRANSMISSION REGULATION OF GENERAL CONTROL DATA | | |

| COMPANY CODE | 100 | ▶ | KOTOBUKI SHOJI CO., LTD |
|---|---|---|---|
| TRANSMISSION SOURCE COMPUTER ID | WKS0010 | ▶ | TOKYO SALES ADMINISTRATIVE DIVISION, BUSINESS OPERATION MANAGEMENT SECTION PC-WKS0010 |
| TRANSMISSION SOURCE FOLDER NAME | Knowledge Data | | |
| BUSINESS PROCESSING WINDOW NAME | GENERAL CONTROL OF SALES PRICE OF MERCHANDISE OF ORGANIZATION | | |
| ORGANIZATION COMPOSITION NO. OF TRANSMISSION DATA | 7 | ▶ | SEVENTH-TERM ORGANIZATION COMPOSITION |
| ORGANIZATION CODE OF TRANSMISSION DATA | 810 | ▶ | FUKUOKA SALES OFFICE, FIRST SALES SECTION |
| TRANSMISSION DESTINATION COMPUTER ID | WKS0024 | ▶ | FUKUOKA SALES OFFICE PC-WKS0024 |
| TRANSMISSION DESTINATION FOLDER NAME | Knowledge Data | | |

─ TRANSMISSION METHOD ─
○ PERIODICAL    ⊙ ANY TIME

─ PERIODICAL TRANSMISSION ─
⊙ EVERY HOUR    EVERY HOUR
⊙ EVERY DAY     EVERY DAY
⊙ EVERY WEEK    EVERY WEEK
⊙ EVERY MONTH   EVERY MONTH
⊙ EVERY DATE

DATE AND TIME OF START OF TRANSMISSION    90/01/01 09:00:00
DATE AND TIME OF END OF TRANSMISSION
STOP OF TRANSMISSION  □

▶ MINUTE      MINUTE (IN UNITS OF 10 MINUTES)
              MINUTE (IN UNITS OF 10 MINUTES)
▶ DAY OF WEEK MINUTE (IN UNITS OF 10 MINUTES)
  DAY         MINUTE (IN UNITS OF 10 MINUTES)
  DATE

RECORD: [◀][1][▶][▶*] / 1                         [END]

KNOWLEDGE MODELING INSTITUTE CO., LTD

PC RECEPTION REGULATION OF SLIP DATA

| | | |
|---|---|---|
| COMPANY CODE | 100 ▼ | KOTOBUKI SHOJI CO., LTD |
| TRANSMISSION SOURCE COMPUTER ID | WKS0024 ▼ | FUKUOKA SALES OFFICE PC-WKS0024 |
| TRANSMISSION SOURCE FOLDER NAME | Knowledge Data | |
| BUSINESS PROCESSING WINDOW | MERCHANDISE ORDER RECEPTION SLIP FROM BUYER ▼ | |
| ORGANIZATION COMPOSITION NO. OF RECEPTION DATA | 7 ▼ | SEVENTH-TERM ORGANIZATION COMPOSITION |
| ORGANIZATION CODE OF RECEPTION DATA | 810 ▼ | FUKUOKA SALES OFFICE, FIRST SALES SECTION |
| RECEIVING-SIDE COMPUTER ID | WKS0010 ▼ | TOKYO SALES ADMINISTRATIVE DIVISION, BUSINESS OPERATION MANAGEMENT SECTION PC-WKS0010 |
| RECEIVING-SIDE FOLDER NAME | Knowledge Data | |
| TIME AND DATE OF START OF RECEPTION | 90/01/01 09:00:00 | |
| TIME AND DATE OF END OF RECEPTION | | |
| STOP OF RECEPTION | ☐ | |
| MANUAL OPERATION | ☐ | |

RECORD: |◄|▼| 1 |►|►►|►*| / 1

[END]

FIG. 30

| KNOWLEDGE MODELING INSTITUTE CO., LTD | |
|---|---|
| COMPANY | |
| COMPANY CODE | 100 |
| COMPANY NAME | KOTOBUKI SHOJI CO., LTD |
| PHONETIC TRANSCRIPTION OF COMPANY NAME | KOTOBUKI SHOUJI KABUSHIKI KAISHA |
| ABBREVIATION OF COMPANY | KSC |
| ENGLISH NAME OF COMPANY | Kotobuki Syouji Co.,Ltd |
| ENGLISH ABBREVIATION OF COMPANY | KSC |
| POSTAL CODE | 164 |
| ADDRESS | NAKANO-KU, TOKYO |
| BUILDING NAME | NAKANO BUILDING |
| TELEPHONE NUMBER | 03-3377-8877 |
| FAX NUMBER | 03-3377-8899 |

RECORD: 1 / 1    [END]

KNOWLEDGE MODELING INSTITUTE CO., LTD

PC OF KNOWLEDGE NETWORK

| COMPUTER ID | ▶WKS0024 |
|---|---|
| COMPUTER NAME | FUKUOKA SALES OFFICE PC-WKS0024 |
| COMPUTER COUNTRY NUMBER | 81 |
| COMPUTER TELEPHONE NUMBER | 092-365-7365 |
| NAME OF SITE OF USE | HAKATA |
| POSTAL CODE | 810-01 |
| ADDRESS | HAKATA-KU, FUKUOKA-SHI, FUKUOKA-KEN |
| BUILDING NAME | HAKATA BUILDING |
| TELEPHONE NUMBER | 092-376-5451 |
| FAX NUMBER | 095-376-5599 |

RECORD: 2 / 2

[END]

KNOWLEDGE MODELING INSTITUTE CO., LTD

PC OF KNOWLEDGE NETWORK

| COMPUTER ID | ▼WKS0010 |
|---|---|
| COMPUTER NAME | TOKYO SALES ADMINISTRATIVE DIVISION, BUSINESS OPERATION MANAGEMENT SECTION PC-WKS0010 |
| COMPUTER COUNTRY NUMBER | 81 |
| COMPUTER TELEPHONE NUMBER | 03-3577-8801 |
| NAME OF SITE OF USE | NAKANO |
| POSTAL CODE | 164 |
| ADDRESS | NAKANO-KU, TOKYO |
| BUILDING NAME | NAKANO BUILDING |
| TELEPHONE NUMBER | 03-3377-8877 |
| FAX NUMBER | 03-3377-8899 |

RECORD: [◄][◄] 1 [►][►][*] / 2

[END]

KNOWLEDGE MODELING INSTITUTE CO., LTD

DATA STORAGE PC FOLDER OF COMPANY

COMPUTER ID: WKS0024  FUKUOKA SALES OFFICE PC-WKS0024

| FOLDER NAME | Knowledge Data |
| COMPANY CODE | 100 |
| COMPANY NAME | KOTOBUKI SHOJI CO., LTD |

FOLDER NAME
COMPANY CODE
COMPANY NAME

RECORD: 2 / 2
RECORD: 2 / 2

END

KNOWLEDGE MODELING INSTITUTE CO., LTD

DATA STORAGE PC FOLDER OF COMPANY

COMPUTER ID ▼WKS0010   TOKYO SALES ADMINISTRATIVE DIVISION, BUSINESS OPERATION MANAGEMENT SECTION PC-WKS0010

| FOLDER NAME | Knowledge Data |
| COMPANY CODE | 100 |
| COMPANY NAME | KOTOBUKI SHOJI CO., LTD |

| FOLDER NAME | |
| COMPANY CODE | |
| COMPANY NAME | |

RECORD: |◄|▼|  2  |▲|▲*| / 2
RECORD: |◄|▼|  1  |▲|▲*| / 2

END

FIG. 35

KNOWLEDGE MODELING INSTITUTE CO., LTD     SELF PC OF KNOWLEDGE NETWORK

| COMPUTER ID | WKS0024 |
| --- | --- |
| COMPUTER NAME | FUKUOKA SALES OFFICE PC-WKS0024 |
| COMPUTER COUNTRY NUMBER | 81 |
| COMPUTER TELEPHONE NUMBER | 092-365-7365 |
| NAME OF SITE OF USE | HAKATA |
| POSTAL CODE | 810-01 |
| ADDRESS | HAKATA-KU, FUKUOKA-SHI, FUKUOKA-KEN |
| BUILDING NAME | HAKATA BUILDING |
| TELEPHONE NUMBER | 092-376-5451 |
| FAX NUMBER | 095-376-5599 |

[END]

KNOWLEDGE MODELING INSTITUTE CO., LTD

PC RECEPTION REGULATION OF GENERAL CONTROL DATA

| COMPANY CODE | 100 | ▶ | KOTOBUKI SHOJI CO., LTD |
| --- | --- | --- | --- |
| TRANSMISSION SOURCE COMPUTER ID | WKS0010 | ▶ | TOKYO SALES ADMINISTRATIVE DIVISION, BUSINESS OPERATION MANAGEMENT SECTION PC-WKS0010 |
| TRANSMISSION SOURCE FOLDER NAME | Knowledge Data | | |
| BUSINESS PROCESSING WINDOW | GENERAL CONTROL OF SALES PRICE OF MERCHANDISE OF ORGANIZATION | | |
| ORGANIZATION COMPOSITION NO. OF RECEPTION DATA | 7 ▶ | | SEVENTH-TERM ORGANIZATION COMPOSITION |
| ORGANIZATION CODE OF RECEPTION DATA | 810 ▶ | | FUKUOKA SALES OFFICE, FIRST SALES SECTION |
| RECEIVING-SIDE COMPUTER ID | WKS0024 ▶ | | FUKUOKA SALES OFFICE PC-WKS0024 |
| RECEIVING-SIDE FOLDER NAME | Knowledge Data | | |
| TIME AND DATE OF START OF RECEPTION | 90/01/01 09:00:00 | | |
| TIME AND DATE OF END OF RECEPTION | | | |
| STOP OF RECEPTION | ☐ | | |
| MANUAL OPERATION | ☐ | | |

RECORD: ◄◄ ◄ 1 ► ►► ►* / 1

END

KNOWLEDGE MODELING INSTITUTE CO., LTD

PC TRANSMISSION REGULATION OF SLIP DATA

| | | |
|---|---|---|
| COMPANY CODE | 100 | ▶ KOTOBUKI SHOJI CO., LTD |
| TRANSMISSION SOURCE COMPUTER ID | WKS0024 | ▶ FUKUOKA SALES OFFICE PC-WKS0024 |
| TRANSMISSION SOURCE FOLDER NAME | Knowledge Data | |
| BUSINESS PROCESSING WINDOW NAME | | MERCHANDISE ORDER RECEPTION SLIP FROM BUYER ▶ |
| ORGANIZATION COMPOSITION NO. OF TRANSMISSION DATA | 7 | ▶ SEVENTH-TERM ORGANIZATION COMPOSITION |
| ORGANIZATION CODE OF TRANSMISSION DATA | 810 | ▶ FUKUOKA SALES OFFICE, FIRST SALES SECTION |
| TRANSMISSION DESTINATION COMPUTER ID | WKS0010 | ▶ TOKYO SALES OFFICE ADMINISTRATIVE DIVISION, BUSINESS OPERATION MANAGEMENT SECTION PC-WKS0010 |
| TRANSMISSION DESTINATION FOLDER NAME | Knowledge Data | |

── TRANSMISSION METHOD ──
○ PERIODICAL   ⊙ ANY TIME

── PERIODICAL TRANSMISSION ──
⊙ EVERY HOUR   EVERY HOUR
⊙ EVERY DAY    EVERY DAY
⊙ EVERY WEEK   EVERY WEEK
⊙ EVERY MONTH  EVERY MONTH
⊙ EVERY DATE

DATE AND TIME OF START OF TRANSMISSION   90/01/01 09:00:00
DATE AND TIME OF END OF TRANSMISSION
STOP OF TRANSMISSION ☐

▶ MINUTE         MINUTE (IN UNITS OF 10 MINUTES)
  DAY OF WEEK    MINUTE (IN UNITS OF 10 MINUTES)
  DAY            MINUTE (IN UNITS OF 10 MINUTES)
  DATE           MINUTE (IN UNITS OF 10 MINUTES)

RECORD: ◀ ◀ 1 ▶ ▶* /1         [END]

FIG. 38

| KNOWLEDGE MODELING INSTITUTE CO., LTD | | |
|---|---|---|
| | COMPANY | |
| COMPANY CODE | 100 | |
| COMPANY NAME | KOTOBUKI SHOJI CO., LTD | |
| PHONETIC TRANSCRIPTION OF COMPANY NAME | KOTOBUKI SHOUJI KABUSHIKI KAISHA | |
| ABBREVIATION OF COMPANY | KSC | |
| ENGLISH NAME OF COMPANY | Kotobuki Syouji Co.,Ltd | |
| ENGLISH ABBREVIATION OF COMPANY | KSC | |
| POSTAL CODE | 164 | |
| ADDRESS | NAKANO-KU, TOKYO | |
| BUILDING NAME | NAKANO BUILDING | |
| TELEPHONE NUMBER | 03-3377-8877 | |
| FAX NUMBER | 03-3377-8899 | |

RECORD: 1 / 1

FIG. 39

KNOWLEDGE MODELING INSTITUTE CO., LTD

COMPANY

| COMPANY CODE | 999 |
| --- | --- |
| COMPANY NAME | KNOWLEDGE FINANCE CO., LTD |
| PHONETIC TRANSCRIPTION OF COMPANY NAME | KNOWLEDGE FINANCE KABUSHIKI KAISHA |
| ABBREVIATION OF COMPANY | KFC |
| ENGLISH NAME OF COMPANY | Knowledge Finance Co.,Ltd |
| ENGLISH ABBREVIATION OF COMPANY | KFC |
| POSTAL CODE | 160 |
| ADDRESS | SHINJUKU-KU, TOKYO |
| BUILDING NAME | SHINJUKU BUILDING |
| TELEPHONE NUMBER | 03-3355-9988 |
| FAX NUMBER | 03-3355-8877 |

RECORD: |◄|◄| 2 |►|►|*| / 2

END

FIG. 40

KNOWLEDGE MODELING INSTITUTE CO., LTD

PC OF KNOWLEDGE NETWORK

| COMPUTER ID | WKS0020 |
| --- | --- |
| COMPUTER NAME | TOKYO SALES ADMINISTRATIVE DIVISION FINANCING DEPARTMENT PC-WKS0020 |
| COMPUTER COUNTRY NUMBER | 81 |
| COMPUTER TELEPHONE NUMBER | 03-3577-8801 |
| NAME OF SITE OF USE | NAKANO |
| POSTAL CODE | 164 |
| ADDRESS | NAKANO-KU, TOKYO |
| BUILDING NAME | NAKANO BUILDING |
| TELEPHONE NUMBER | 03-3377-8877 |
| FAX NUMBER | 03-3377-8899 |

RECORD: 3 / 4

[END]

FIG. 41

KNOWLEDGE MODELING INSTITUTE CO., LTD

PC OF KNOWLEDGE NETWORK

| COMPUTER ID | KFC8010 |
|---|---|
| COMPUTER NAME | TOKYO HEAD OFFICE FINANCING DEPARTMENT PC-KFC8010 |
| COMPUTER COUNTRY NUMBER | 81 |
| COMPUTER TELEPHONE NUMBER | 03-3355-1122 |
| NAME OF SITE OF USE | SHINJUKU |
| POSTAL CODE | 160 |
| ADDRESS | SHINJUKU-KU, TOKYO |
| BUILDING NAME | SHINJUKU BUILDING |
| TELEPHONE NUMBER | 03-3355-9988 |
| FAX NUMBER | 03-3355-8877 |

RECORD: 1 / 3

END

FIG. 42

KNOWLEDGE MODELING INSTITUTE CO., LTD
DATA STORAGE PC FOLDER OF COMPANY

| COMPUTER ID | ▼WKS0020 | TOKYO SALES ADMINISTRATIVE DIVISION FINANCING DEPARTMENT PC-WKS0020 |

| FOLDER NAME | Knowledge Data |
| COMPANY CODE | 100 |
| COMPANY NAME | KOTOBUKI SHOJI CO., LTD |

| FOLDER NAME | |
| COMPANY CODE | |
| COMPANY NAME | |

RECORD: |◂|◂| 2 |▸|▸*| / 2
RECORD: |◂|◂| 3 |▸|▸#| / 4

END

KNOWLEDGE MODELING INSTITUTE CO., LTD

DATA STORAGE PC FOLDER OF COMPANY

COMPUTER ID: KFC8010  TOKYO HEAD OFFICE FINANCING DEPARTMENT  PC-KFC8010

| FOLDER NAME | Knowledge Business Paper |
| COMPANY CODE | 999 |
| COMPANY NAME | KNOWLEDGE FINANCE CO., LTD |

| FOLDER NAME | |
| COMPANY CODE | |
| COMPANY NAME | |

RECORD: 2 / 2
RECORD: 1 / 4

END

| KNOWLEDGE MODELING INSTITUTE CO., LTD | |
|---|---|
| SELF PC OF KNOWLEDGE NETWORK | END |

| | |
|---|---|
| COMPUTER ID | WKS0020 |
| COMPUTER NAME | TOKYO SALES ADMINISTRATIVE DIVISION FINANCING DEPARTMENT PC-WKS0020 |
| COMPUTER COUNTRY NUMBER | 81 |
| COMPUTER TELEPHONE NUMBER | 03-3577-8801 |
| NAME OF SITE OF USE | NAKANO |
| POSTAL CODE | 164 |
| ADDRESS | NAKANO-KU, TOKYO |
| BUILDING NAME | NAKANO BUILDING |
| TELEPHONE NUMBER | 03-3377-8877 |
| FAX NUMBER | 03-3377-8899 |

| KNOWLEDGE MODELING INSTITUTE CO., LTD | | |
|---|---|---|
| PC EXTERNAL TRANSMISSION REGULATION OF SLIP DATA | | |
| TRANSMISSION SOURCE COMPANY CODE | 100 | KOTOBUKI SHOJI CO., LTD |
| TRANSMISSION SOURCE COMPUTER ID | WKS0020 | TOKYO SALES ADMINISTRATIVE DIVISION PURCHASE SECTION PC-WKS0020 |
| TRANSMISSION SOURCE FOLDER NAME | Knowledge Data | |
| BUSINESS PROCESSING WINDOW NAME | | KNOWLEDGE FINANCE APPLICATION SLIP |
| ORGANIZATION COMPOSITION NO. OF TRANSMISSION DATA | 7 | SEVENTH-TERM ORGANIZATION COMPOSITION |
| ORGANIZATION CODE OF TRANSMISSION DATA | 110 | TOKYO SALES ADMINISTRATIVE DIVISION PURCHASE SECTION |
| TRANSMISSION DESTINATION COMPANY CODE | 999 | KNOWLEDGE FINANCE CO., LTD |
| TRANSMISSION DESTINATION COMPUTER ID | KFC8010 | TOKYO HEAD OFFICE FINANCING DEPARTMENT PC-KFC8010 |
| TRANSMISSION DESTINATION FOLDER NAME | Knowledge Business Paper | |

─ TRANSMISSION METHOD ─
○ PERIODICAL    ⊙ ANY TIME

DATE AND TIME OF START OF TRANSMISSION   90/04/01  09:00:00
DATE AND TIME OF END OF TRANSMISSION   ☐
STOP OF TRANSMISSION  ☐

─ PERIODICAL TRANSMISSION ─
⊙ EVERY HOUR    EVERY HOUR    ▼ MINUTE
⊙ EVERY DAY    EVERY DAY    ☐ MINUTE (IN UNITS OF 10 MINUTES)
⊙ EVERY WEEK    EVERY WEEK    ▼ DAY OF WEEK  ☐  ☐ MINUTE (IN UNITS OF 10 MINUTES)
⊙ EVERY MONTH    EVERY MONTH    ☐ DAY  ☐ MINUTE (IN UNITS OF 10 MINUTES)
⊙ EVERY DATE    EVERY DATE    ☐ DATE  ☐ MINUTE (IN UNITS OF 10 MINUTES)

RECORD: ◄ ▼ 1 ► ►| ►* / 1                    [END]

| KNOWLEDGE MODELING INSTITUTE CO., LTD | |
|---|---|
| | COMPANY |
| COMPANY CODE | 999 |
| COMPANY NAME | KNOWLEDGE FINANCE CO., LTD |
| PHONETIC TRANSCRIPTION OF COMPANY NAME | KNOWLEDGE FINANCE KABUSHIKI KAISHA |
| ABBREVIATION OF COMPANY | KFC |
| ENGLISH NAME OF COMPANY | Knowledge Finance Co.,Ltd |
| ENGLISH ABBREVIATION OF COMPANY | KFC |
| POSTAL CODE | 160 |
| ADDRESS | SHINJUKU-KU, TOKYO |
| BUILDING NAME | SHINJUKU BUILDING |
| TELEPHONE NUMBER | 03-3355-9988 |
| FAX NUMBER | 03-3355-8877 |

RECORD: |◀|▼| 2 |▲|▶|*| / 2

FIG. 47

KNOWLEDGE MODELING INSTITUTE CO., LTD

PC OF KNOWLEDGE NETWORK

| COMPUTER ID | ▶KFC8010 |
|---|---|
| COMPUTER NAME | TOKYO HEAD OFFICE FINANCING DEPARTMENT PC-KFC8010 |
| COMPUTER COUNTRY NUMBER | 81 |
| COMPUTER TELEPHONE NUMBER | 03-3355-1122 |

| NAME OF SITE OF USE | SHINJUKU |
|---|---|
| POSTAL CODE | 160 |
| ADDRESS | SHINJUKU-KU, TOKYO |
| BUILDING NAME | SHINJUKU BUILDING |
| TELEPHONE NUMBER | 03-3355-9988 |
| FAX NUMBER | 03-3355-8877 |

RECORD: |◀|◁| 1 |▷|▶|*| / 3

[END]

KNOWLEDGE MODELING INSTITUTE CO., LTD

PC OF KNOWLEDGE NETWORK

| COMPUTER ID | ▶ WKS0020 |
|---|---|
| COMPUTER NAME | TOKYO SALES ADMINISTRATIVE DIVISION FINANCING DEPARTMENT PC-WKS0020 |
| COMPUTER COUNTRY NUMBER | 81 |
| COMPUTER TELEPHONE NAME | 03-3577-8801 |

| NAME OF SITE OF USE | NAKANO |
|---|---|
| POSTAL CODE | 164 |
| ADDRESS | NAKANO-KU, TOKYO |
| BUILDING NAME | NAKANO BUILDING |
| TELEPHONE NUMBER | 03-3377-8877 |
| FAX NUMBER | 03-3377-8899 |

RECORD: |◄|◄| 3 |▲|▼|►|►|*| / 4

[END]

KNOWLEDGE MODELING INSTITUTE CO., LTD

DATA STORAGE PC FOLDER OF COMPANY

COMPUTER ID ▼ KFC8010  TOKYO HEAD OFFICE FINANCING DEPARTMENT  PC-KFC8010

| FOLDER NAME | Knowledge Business Paper |
| COMPANY CODE | 999 ▶ |
| COMPANY NAME | KNOWLEDGE FINANCE CO., LTD |

▲
| FOLDER NAME | |
| COMPANY CODE | ▶ |
| COMPANY NAME | |

RECORD: ◀▼  2 ▲▼▲*  / 2
RECORD: ◀▼  1 ▲▼▲#  / 4

END

FIG. 51

KNOWLEDGE MODELING INSTITUTE CO., LTD
DATA STORAGE PC FOLDER OF COMPANY

COMPUTER ID ▼ WKS0020   TOKYO SALES ADMINISTRATIVE DIVISION
FINANCING DEPARTMENT PC-WKS0020

| FOLDER NAME | Knowledge Data |
| COMPANY CODE | 100 ▼ |
| COMPANY NAME | KOTOBUKI SHOJI CO., LTD |

| FOLDER NAME | |
| COMPANY CODE | ▼ |
| COMPANY NAME | |

RECORD: |◄|◄| 2 |▲|▲|*| / 2
RECORD: |◄|◄| 3 |▲|▲|*| / 4

END

FIG. 52

KNOWLEDGE MODELING INSTITUTE CO., LTD

SELF PC OF KNOWLEDGE NETWORK

| | |
|---|---|
| COMPUTER ID | KFC8010 |
| COMPUTER NAME | TOKYO HEAD OFFICE FINANCING DEPARTMENT PC-KFC8010 |
| COMPUTER COUNTRY NUMBER | 81 |
| COMPUTER TELEPHONE NUMBER | 03-3355-1122 |
| NAME OF SITE OF USE | SHINJUKU |
| POSTAL CODE | 160 |
| ADDRESS | SHINJUKU-KU, TOKYO |
| BUILDING NAME | SHINJUKU BUILDING |
| TELEPHONE NUMBER | 03-3355-9988 |
| FAX NUMBER | 03-3355-8877 |

[END]

FIG. 53

TABLE OF MERCHANDISE ORDER RECEPTION SLIPS FROM BUYERS

| FIELD NAME | DATA TYPE | DESCRIPTION |
|---|---|---|
| ORGANIZATION COMPOSITION NO. | NUMERICAL VALUE | ORGANIZATION COMPOSITION NO. OF ORDER RECEPTION ORGANIZATION |
| ORGANIZATION CODE | TEXT TYPE | IDENTIFICATION CODE OF ORDER RECEPTION ORGANIZATION |
| MERCHANDISE ORDER RECEPTION SLIP NO. | TEXT TYPE | MERCHANDISE ORDER RECEPTION SLIP NO. OF ORDER RECEPTION ORGANIZATION |
| DATE OF ORDER RECEPTION | DATE/TIME TYPE | DATE OF ORDER RECEPTION |
| CODE OF PERSON IN CHARGE FOR ORDER RECEPTION | TEXT TYPE | IDENTIFICATION CODE OF PERSON IN CHARGE FOR ORDER RECEPTION |
| BUYER CODE | TEXT TYPE | IDENTIFICATION CODE OF BUYER |
| ORGANIZATION COMPOSITION NO. OF BUYER | NUMERICAL VALUE | ORGANIZATION COMPOSITION NO. OF ORDERING ORGANIZATION OF BUYER |
| ORGANIZATION CODE OF BUYER | TEXT TYPE | IDENTIFICATION CODE OF ORDERING ORGANIZATION OF BUYER |

FIG. 55A

| | | FIELD PROPERTY |
|---|---|---|
| CODE OF PERSON IN CHARGE FOR ORDER OF BUYER | TEXT TYPE | IDENTIFICATION CODE OF PERSON IN CHARGE FOR ORDER OF BUYER |
| ORDER NO. OF BUYER | TEXT TYPE | MEMO FOR ORDER NO. OF BUYER |
| DUE DATE OF DELIVERY | DATE/TIME TYPE | DATE OF DELIVERY OF MERCHANDISE |
| MEMO FOR ORDER DELIVERY RECEPTION | TEXT TYPE | MEMO FOR ORDER RECEPTION |
| INPUT ORGANIZATION COMPOSITION NO. | NUMERICAL VALUE | COMPOSITION NO. OF INPUT ORGANIZATION OF MERCHANDISE ORDER RECEPTION SLIP |
| INPUT ORGANIZATION CODE | TEXT TYPE | IDENTIFICATION CODE OF INPUT ORGANIZATION OF MERCHANDISE ORDER RECEPTION SLIP |
| CODE OF PERSON IN CHARGE FOR INPUT | TEXT TYPE | IDENTIFICATION CODE OF PERSON IN CHARGE FOR INPUT OF MERCHANDISE ORDER RECEPTION SLIP |
| RECORD LOCK | YES/NO TYPE | MARK FOR EXCLUSIVE CONTROL OF MERCHANDISE ORDER RECEPTION SLIP |
| DATE OF REGISTRATION | DATE/TIME TYPE | |
| DATE OF CHANGE | DATE/TIME TYPE | |

FIG. 55B

TABLE OF PARTICULARS OF MERCHANDISE ORDER RECEPTION SLIPS FROM BUYERS

| FIELD NAME | DATA TYPE | DESCRIPTION |
|---|---|---|
| ORGANIZATION COMPOSITION NO. | NUMERICAL VALUE | ORGANIZATION COMPOSITION NO. OF ORDER RECEPTION ORGANIZATION |
| ORGANIZATION CODE | TEXT TYPE | IDENTIFICATION CODE OF ORDER RECEPTION ORGANIZATION |
| MERCHANDISE ORDER RECEPTION SLIP NO. | TEXT TYPE | MERCHANDISE ORDER RECEPTION SLIP NO. OF ORDER RECEPTION ORGANIZATION |
| PARTICULARS LINE ORDER NO. | NUMERICAL VALUE | PARTICULARS LINE ORDER NO. OF ORDER RECEPTION SLIP |
| MERCHANDISE CODE | TEXT TYPE | IDENTIFICATION CODE OF ORDERED MERCHANDISE |
| JAN CODE | TEXT TYPE | JAN CODE OF ORDERED MERCHANDISE |
| QUANTITY OF ORDER RECEIVED | NUMERICAL VALUE | QUANTITY OF ORDERED MERCHANDISE |
| UNIT PRICE OF ORDER RECEIVED | CURRENCY TYPE | UNIT PRICE OF ORDERED MERCHANDISE |
| DATE OF REGISTRATION | DATE/TIME TYPE | |
| DATE OF CHANGE | DATE/TIME TYPE | |

| FIELD PROPERTY |
|---|
| |

FIG. 56A

DESCRIPTION

PARTICULARS OF MERCHANDISE ORDER RECEPTION SLIP FROM INDEX BUYER

| | INDEX NAME | FIELD NAME | ORDER OF REARRANGEMENT |
|---|---|---|---|
| 🔑 | Primary Key | ORGANIZATION COMPOSITION NO. | ASCENDING |
| 🔑 | | ORGANIZATION CODE | ASCENDING |
| 🔑 | | MERCHANDISE ORDER RECEPTION SLIP NO. | ASCENDING |
| 🔑 | | PARTICULARS LINE ORDER NO. | ASCENDING |

INDEX PROPERTY

| | | |
|---|---|---|
| PRINCIPAL KEY | YES | DESIGNATE INDEX NAME. TEN FIELDS CAN BE SET FOR ONE INDEX. |
| UNIQUE INDEX | YES | |
| Null NEGLECT | NO | |

FIELD PROPERTY

FIG. 56B

TABLE OF MERCHANDISE SALES COLLECTION SLIPS FROM BUYERS

| FIELD NAME | DATA TYPE | DESCRIPTION |
|---|---|---|
| ORGANIZATION COMPOSITION NO. | NUMERICAL VALUE | COMPOSITION NO. OF ORGANIZATION |
| ORGANIZATION CODE | TEXT TYPE | IDENTIFICATION CODE OF ORGANIZATION |
| MERCHANDISE SALES COLLECTION SLIP NO. | TEXT TYPE | MERCHANDISE SALES COLLECTION SLIP NO. OF ORGANIZATION |
| DATE OF COLLECTION | DATE/TIME TYPE | DATE OF COLLECTION |
| CODE OF PERSON IN CHARGE FOR COLLECTION | TEXT TYPE | IDENTIFICATION CODE OF PERSON IN CHARGE FOR COLLECTION |
| BUYER CODE | TEXT TYPE | IDENTIFICATION CODE OF BUYER FROM WHICH SALES IS TO BE COLLECTED |
| ORGANIZATION COMPOSITION NO. OF BUYER | NUMERICAL VALUE | COMPOSITION NO. OF ORGANIZATION OF BUYER FROM WHICH SALES IS TO BE COLLECTED |
| ORGANIZATION CODE OF BUYER | TEXT TYPE | IDENTIFICATION CODE OF ORGANIZATION OF BUYER FROM WHICH SALES IS TO BE COLLECTED |
| CODE OF PERSON IN CHARGE FOR PAYMENT OF BUYER | TEXT TYPE | IDENTIFICATION CODE OF PERSON IN CHARGE FOR PAYMENT OF ORGANIZATION OF BUYER FROM WHICH SALES IS TO BE COLLECTED |
| AMOUNT OF COLLECTION | CURRENCY TYPE | AMOUNT OF COLLECTION |
| COLLECTION CONSUMPTION TAX OR THE LIKE | CURRENCY TYPE | AMOUNT OF TAX SUCH AS CONSUMPTION TAX INCLUDED IN AMOUNT OF COLLECTION |
| PAYMENT COMMISSION OR THE LIKE | CURRENCY TYPE | AMOUNT OF PAYMENT OF PAY-IN COMMISSION FOR COLLECTION |
| PAYMENT CONSUMPTION TAX OR THE LIKE | CURRENCY TYPE | AMOUNT OF TAX SUCH AS CONSUMPTION TAX INCLUDED IN PAY-IN COMMISSION FOR COLLECTION |
| CURRENCY | TEXT TYPE | CURRENCY FOR COLLECTION |

FIG. 57A

| ORGANIZATION COMPOSITION NO. OF PAYEE | NUMERICAL VALUE | COMPOSITION NO. OF ORGANIZATION OF PAYEE |
|---|---|---|
| ORGANIZATION CODE OF PAYEE | TEXT TYPE | IDENTIFICATION CODE OF ORGANIZATION OF PAYEE |
| CODE OF BANK | TEXT TYPE | IDENTIFICATION CODE OF BANK OF ORGANIZATION OF PAYEE |
| CODE OF BRANCH OF BANK | TEXT TYPE | IDENTIFICATION CODE OF BRANCH OF BANK OF ORGANIZATION OF PAYEE |
| SAVINGS ACCOUNT NUMBER | TEXT TYPE | SAVINGS ACCOUNT NUMBER OF ORGANIZATION OF PAYEE |
| CHECKING ACCOUNT NUMBER | TEXT TYPE | CHECKING ACCOUNT NUMBER OF ORGANIZATION OF PAYEE |
| POST OFFICE CODE | TEXT TYPE | IDENTIFICATION CODE OF POST OFFICE OF ORGANIZATION OF PAYEE |
| POSTAL SAVING ACCOUNT NUMBER | TEXT TYPE | POSTAL SAVING ACCOUNT NUMBER OF ORGANIZATION OF PAYEE |
| SAFE CODE | TEXT TYPE | IDENTIFICATION CODE OF SAFE OF ORGANIZATION OF PAYEE |
| MERCHANDISE ESTIMATE SLIP NO. | TEXT TYPE | MERCHANDISE ESTIMATE SLIP NO. TO BUYER OF ORGANIZATION |
| MERCHANDISE RESERVATION SLIP NO. | TEXT TYPE | MERCHANDISE RESERVATION SLIP NO. FROM BUYER OF ORGANIZATION |
| MERCHANDISE ORDER RECEPTION SLIP NO. | TEXT TYPE | MERCHANDISE ORDER RECEPTION SLIP NO. FROM BUYER OF ORGANIZATION |
| MERCHANDISE SHIPMENT SLIP NO. | TEXT TYPE | MERCHANDISE SHIPMENT SLIP NO. TO BUYER OF ORGANIZATION |
| MERCHANDISE DELIVERY SLIP NO. | TEXT TYPE | MERCHANDISE DELIVERY SLIP NO. TO BUYER OF ORGANIZATION |

FIG. 57B

| | | |
|---|---|---|
| MERCHANDISE RECEIPT SLIP NO. | TEXT TYPE | MERCHANDISE RECEIPT SLIP NO. FROM BUYER OF ORGANIZATION |
| MERCHANDISE DEPOSIT BILLING SLIP NO. | TEXT TYPE | MERCHANDISE DEPOSIT BILLING SLIP NO. TO BUYER OF ORGANIZATION |
| MERCHANDISE DEPOSIT COLLECTION SLIP NO. | TEXT TYPE | MERCHANDISE DEPOSIT COLLECTION SLIP NO. FORM BUYER OF ORGANIZATION |
| MERCHANDISE SALES BILLING SLIP NO. | TEXT TYPE | MERCHANDISE SALES BILLING SLIP NO. TO BUYER OF ORGANIZATION |
| MEMO FOR COLLECTION | TEXT TYPE | MEMO FOR COLLECTION |
| INPUT ORGANIZATION COMPOSITION NO. | NUMERICAL VALUE | COMPOSITION NO. OF INPUT ORGANIZATION OF MERCHANDISE SALES COLLECTION SLIP |
| INPUT ORGANIZATION CODE | TEXT TYPE | IDENTIFICATION CODE OF INPUT ORGANIZATION OF MERCHANDISE SALES COLLECTION SLIP |
| CODE OF PERSON IN CHARGE FOR INPUT | TEXT TYPE | IDENTIFICATION CODE OF PERSON IN CHARGE FOR INPUT OF MERCHANDISE SALES COLLECTION SLIP |
| RECORD LOCK | YES/NO TYPE | MARK FOR EXCLUSIVE CONTROL OF MERCHANDISE SALES COLLECTION SLIP |
| DATE OF REGISTRATION | DATE/TIME TYPE | |
| DATE OF CHANGE | DATE/TIME TYPE | |
| | FIELD PROPERTY | |

FIG. 57C

TABLE OF MERCHANDISE ORDER SLIPS TO MERCHANDISE VENDORS

| FIELD NAME | DATA TYPE | DESCRIPTION |
|---|---|---|
| ORGANIZATION COMPOSITION NO. | NUMERICAL VALUE | ORGANIZATION COMPOSITION NO. OF ORDERING ORGANIZATION |
| ORGANIZATION CODE | TEXT TYPE | IDENTIFICATION CODE OF ORDERING ORGANIZATION |
| MERCHANDISE ORDER SLIP NO. | TEXT TYPE | MERCHANDISE ORDER RECEPTION SLIP NO. OF ORDERING ORGANIZATION |
| DATE OF ORDER | DATE/TIME TYPE | DATE OF ORDER |
| CODE OF PERSON IN CHARGE FOR ORDER | TEXT TYPE | IDENTIFICATION CODE OF PERSON IN CHARGE FOR ORDER |
| CODE OF MERCHANDISE VENDOR | TEXT TYPE | IDENTIFICATION CODE OF MERCHANDISE VENDOR |
| ORGANIZATION COMPOSITION NO. OF MERCHANDISE VENDOR | NUMERICAL VALUE | ORGANIZATION COMPOSITION NO. OF ORDER RECEPTION ORGANIZATION OF MERCHANDISE VENDOR |
| ORGANIZATION CODE OF MERCHANDISE VENDOR | TEXT TYPE | IDENTIFICATION CODE OF ORDER RECEPTION ORGANIZATION OF MERCHANDISE VENDOR |

FIG. 58A

| | | |
|---|---|---|
| CODE OF PERSON IN CHARGE FOR ORDER RECEPTION OF MERCHANDISE VENDOR | TEXT TYPE | IDENTIFICATION CODE OF PERSON IN CHARGE FOR ORDER RECEPTION OF MERCHANDISE VENDOR |
| ORDER RECEPTION NO. OF MERCHANDISE VENDOR | TEXT TYPE | MEMO FOR ORDER RECEPTION NO. OF MERCHANDISE VENDOR |
| DATE OF DELIVERY | DATE/TIME TYPE | DATE OF DELIVERY OF MERCHANDISE |
| MEMO FOR ORDER | TEXT TYPE | MEMO FOR ORDER |
| INPUT ORGANIZATION COMPOSITION NO. | NUMERICAL VALUE | COMPOSITION NO. OF INPUT ORGANIZATION OF MERCHANDISE ORDER SLIP |
| INPUT ORGANIZATION CODE | TEXT TYPE | IDENTIFICATION CODE OF INPUT ORGANIZATION OF MERCHANDISE ORDER SLIP |
| CODE OF PERSON IN CHARGE FOR INPUT | TEXT TYPE | IDENTIFICATION CODE OF PERSON IN CHARGE FOR INPUT OF MERCHANDISE ORDER SLIP |
| RECORD LOCK | YES/NO TYPE | MARK FOR EXCLUSIVE CONTROL OF MERCHANDISE ORDER SLIP |
| DATE OF REGISTRATION | DATE/TIME TYPE | |
| DATE OF CHANGE | DATE/TIME TYPE | |
| | FIELD PROPERTY | |

FIG. 58B

TABLE OF PARTICULARS OF MERCHANDISE ORDER SLIPS TO MERCHANDISE VENDORS

| | FIELD NAME | DATA TYPE | DESCRIPTION |
|---|---|---|---|
| 🔑 | ORGANIZATION COMPOSITION NO. | NUMERICAL VALUE | ORGANIZATION COMPOSITION NO. OF ORDERING ORGANIZATION |
| 🔑 | ORGANIZATION CODE | TEXT TYPE | IDENTIFICATION CODE OF ORDERING ORGANIZATION |
| 🔑 | MERCHANDISE ORDER SLIP NO. | TEXT TYPE | MERCHANDISE ORDER SLIP NO. OF ORDERING ORGANIZATION |
| 🔑 | PARTICULARS LINE ORDER NO. | NUMERICAL VALUE | PARTICULARS LINE ORDER NO. OF ORDER SLIP |
| | MERCHANDISE CODE | TEXT TYPE | IDENTIFICATION CODE OF ORDERED MERCHANDISE |
| | JAN CODE | TEXT TYPE | JAN CODE OF ORDERED MERCHANDISE |
| | QUANTITY OF ORDER | NUMERICAL VALUE | QUANTITY OF ORDERED MERCHANDISES |
| | UNIT PRICE OF ORDER | CURRENCY TYPE | UNIT PRICE OF ORDERED MERCHANDISE |
| | DATE OF REGISTRATION | DATE/TIME TYPE | |
| | DATE OF CHANGE | DATE/TIME TYPE | |
| | | FIELD PROPERTY | |

FIG. 59A

DESCRIPTION

PARTICULARS OF MERCHANDISE ORDER RECEPTION SLIP TO INDEX MERCHANDISE VENDOR

| INDEX NAME | FIELD NAME | ORDER OF REARRANGEMENT |
|---|---|---|
| Primary Key | ORGANIZATION COMPOSITION NO. | ASCENDING |
| | ORGANIZATION CODE | ASCENDING |
| | MERCHANDISE ORDER SLIP NO. | ASCENDING |
| | PARTICULARS LINE ORDER NO. | ASCENDING |

INDEX PROPERTY

| PRINCIPAL KEY | YES |
| UNIQUE INDEX | YES |
| Null NEGLECT | NO |

DESIGNATE INDEX NAME. TEN FIELDS CAN BE SET FOR ONE INDEX.

FIELD PROPERTY

FIG. 59B

TABLE OF PAYMENT SLIPS TO MERCHANDISE VENDORS

| FIELD NAME | DATA TYPE | DESCRIPTION |
|---|---|---|
| ORGANIZATION COMPOSITION NO. | NUMERICAL VALUE | COMPOSITION NO. OF ORGANIZATION |
| ORGANIZATION CODE | TEXT TYPE | IDENTIFICATION CODE OF ORGANIZATION |
| MERCHANDISE VENDOR PAYMENT SLIP NO. | TEXT TYPE | MERCHANDISE PURCHASE PAYMENT SLIP NO. OF ORGANIZATION |
| DATE OF PAYMENT | DATE/TIME TYPE | DATE OF PAYMENT |
| CODE OF PERSON IN CHARGE FOR PAYMENT | TEXT TYPE | IDENTIFICATION CODE OF PERSON IN CHARGE FOR PAYMENT |
| CODE OF MERCHANDISE VENDOR | TEXT TYPE | IDENTIFICATION CODE OF MERCHANDISE VENDOR AS PAYEE |
| ORGANIZATION COMPOSITION NO. OF MERCHANDISE VENDOR | NUMERICAL VALUE | COMPOSITION NO. OF ORGANIZATION OF MERCHANDISE VENDOR AS PAYEE |
| ORGANIZATION CODE OF MERCHANDISE VENDOR | TEXT TYPE | IDENTIFICATION CODE OF ORGANIZATION OF MERCHANDISE VENDOR AS PAYEE |
| CODE OF PERSON IN CHARGE FOR COLLECTION OF MERCHANDISE VENDOR | TEXT TYPE | IDENTIFICATION CODE OF PERSON IN CHARGE FOR COLLECTION OF ORGANIZATION OF MERCHANDISE VENDOR AS PAYEE |
| CODE OF BANK OF MERCHANDISE VENDOR | TEXT TYPE | IDENTIFICATION CODE OF BANK OF ORGANIZATION OF MERCHANDISE VENDOR AS PAYEE |
| CODE OF BRANCH OF ORGANIZATION OF MERCHANDISE VENDOR | TEXT TYPE | IDENTIFICATION CODE OF BRANCH OF BANK OF ORGANIZATION OF MERCHANDISE VENDOR AS PAYEE |
| SAVINGS ACCOUNT OF MERCHANDISE VENDOR | TEXT TYPE | SAVINGS ACCOUNT NUMBER OF MERCHANDISE VENDOR AS PAYEE |
| CHECKING ACCOUNT OF MERCHANDISE VENDOR | TEXT TYPE | CHECKING ACCOUNT NUMBER OF MERCHANDISE VENDOR AS PAYEE |

FIG. 60A

| | | |
|---|---|---|
| POST OFFICE CODE OF MERCHANDISE VENDOR | TEXT TYPE | IDENTIFICATION CODE OF POST OFFICE OF ORGANIZATION OF MERCHANDISE VENDOR AS PAYEE |
| POSTAL SAVING ACCOUNT NUMBER OF MERCHANDISE VENDOR | TEXT TYPE | POSTAL SAVINGS ACCOUNT NUMBER OF ORGANIZATION OF MERCHANDISE VENDOR AS PAYEE |
| AMOUNT OF PAYMENT | CURRENCY TYPE | AMOUNT OF PAYMENT |
| PAYMENT COMMISSION OR THE LIKE | CURRENCY TYPE | AMOUNT OF PAYMENT OF PAY-IN COMMISSION FOR PAYMENT |
| PAYMENT CONSUMPTION TAX OR THE LIKE | CURRENCY TYPE | AMOUNT OF TAX SUCH AS CONSUMPTION TAX INCLUDED IN THE TOTAL AMOUNT OF PAYMENT |
| CURRENCY | TEXT TYPE | CURRENCY FOR PAYMENT |
| ORGANIZATION COMPOSITION NO. OF PAYER | NUMERICAL VALUE | COMPOSITION NO. OF ORGANIZATION OF PAYER |
| ORGANIZATION CODE OF PAYER | TEXT TYPE | IDENTIFICATION CODE OF ORGANIZATION OF PAYER |
| CODE OF BANK | TEXT TYPE | IDENTIFICATION CODE OF BANK OF PAYER |
| CODE OF BRANCH OF BANK | TEXT TYPE | IDENTIFICATION CODE OF BRANCH OF BANK OF ORGANIZATION OF PAYER |
| SAVINGS ACCOUNT NUMBER | TEXT TYPE | SAVINGS ACCOUNT NUMBER OF ORGANIZATION OF PAYER |
| CHECKING ACCOUNT NUMBER | TEXT TYPE | CHECKING ACCOUNT NUMBER OF ORGANIZATION OF PAYER |
| POST OFFICE CODE | TEXT TYPE | IDENTIFICATION CODE OF POST OFFICE OF ORGANIZATION OF PAYER |
| POSTAL SAVINGS ACCOUNT NUMBER | TEXT TYPE | POSTAL SAVINGS ACCOUNT NUMBER OF ORGANIZATION OF PAYER |
| SAFE CODE | TEXT TYPE | SAFE CODE OF ORGANIZATION OF PAYER |

FIG. 60B

| | | FIELD PROPERTY |
|---|---|---|
| MERCHANDISE RESERVATION SLIP NO. | TEXT TYPE | MERCHANDISE RESERVATION SLIP NO. TO MERCHANDISE VENDOR OF ORGANIZATION |
| MERCHANDISE ORDER SLIP NO. | TEXT TYPE | MERCHANDISE ORDER SLIP NO. TO MERCHANDISE VENDOR OF ORGANIZATION |
| MERCHANDISE ARRIVAL SLIP NO. | TEXT TYPE | MERCHANDISE ARRIVAL SLIP NO. FROM MERCHANDISE VENDOR OF ORGANIZATION |
| MERCHANDISE DEPOSIT BILLING SLIP NO. | TEXT TYPE | MERCHANDISE DEPOSIT BILLING SLIP NO. FROM MERCHANDISE VENDOR OF ORGANIZATION |
| MERCHANDISE DEPOSIT PAYMENT SLIP NO. | TEXT TYPE | MERCHANDISE DEPOSIT PAYMENT SLIP NO. TO MERCHANDISE VENDOR OF ORGANIZATION |
| MERCHANDISE PURCHASE BILLING SLIP NO. | TEXT TYPE | MERCHANDISE PURCHASE BILLING SLIP NO. FROM MERCHANDISE VENDOR OF ORGANIZATION |
| MEMO FOR PAYMENT | TEXT TYPE | MEMO FOR PAYMENT |
| INPUT ORGANIZATION COMPOSITION NO. | NUMERICAL VALUE | COMPOSITION NO. OF INPUT ORGANIZATION OF MERCHANDISE PURCHASE PAYMENT SLIP |
| INPUT ORGANIZATION CODE | TEXT TYPE | IDENTIFICATION CODE OF INPUT ORGANIZATION OF MERCHANDISE PURCHASE PAYMENT SLIP |
| CODE OF PERSON IN CHARGE FOR INPUT | TEXT TYPE | IDENTIFICATION CODE OF PERSON IN CHARGE FOR INPUT OF MERCHANDISE PURCHASE PAYMENT SLIP |
| RECORD LOCK | YES/NO TYPE | MARK FOR EXCLUSIVE CONTROL OF MERCHANDISE PURCHASE PAYMENT SLIP |
| DATE OF REGISTRATION | DATE/TIME TYPE | |
| DATE OF CHANGE | DATE/TIME TYPE | |

FIG. 60C

INTELLIGENT DATA STRUCTURE, PROCESSING APPARATUS, AND MEDIUM USING NETWORK

BACKGROUND OF THE INVENTION

The present invention relates to an intelligent data structure, processing apparatus, and medium for using a network, which allow knowledge processing of determination necessary for a work when a businessman in a company performs external or internal work processing or a person makes business transactions.

Conventionally, as means for assisting works of a company or staff members of a company, various data searching means using personal computers for accounting, slip adjustment, sales processing, business result processing, due date management, and the like have been used.

As described above, the conventional work assist means are used to independently assist works unique to individual specialties (accounting division, sales division, manufacturing division, and the like). When a company has many branches, assist systems unique to the respective branches are constructed. However, such work assist means impede information simultaneity between the head office and branches. In addition, data cannot be directly processed between a branch and head office or between other companies and a given company to which the user belongs because of the difference in data structure, resulting in inconvenience. To use data of other companies in the given company, data input operation using an instruction manual is necessary. As a consequence, the periods of order reception and purchase order of merchandise may have time delays, and the quantity cannot be optimized. For overall settlement processing including the head office and branches as well, a time delay may be generated between the head office and each branch because of the absence of information simultaneity. This may result in economical loss.

BRIEF SUMMARY OF THE INVENTION

It is therefore an object of the present invention to provide an intelligent data structure, processing apparatus, and recording medium using a network, which allow to quickly make various determinations or perform settlement processing by obtaining a work assist method capable of increasing the flexibility of data processing for both other companies and a given company to which a user belongs, obtaining information simultaneity outside and inside the company, performing quick data processing, and obtaining knowledge work processing.

In order to achieve the above object, according to the present invention, basically, a data processing apparatus has a self data group storage portion, reception data group storage portion, transmission data group storage portion, reception processing means connected to a network, and transmission processing means connected to the network. The data structure of each storage portion is classified into organization, reference, and general control in the vertical direction and slip, book, and knowledge in the horizontal direction. Although the data contents in the vertical direction are the same, they are defined as data having different meanings. Slips and books are managed using identification codes, and knowledge is managed using item data and knowledge table.

The present invention is an intelligent data structure wherein data is used in an apparatus comprising reception processing means connected to a network, transmission processing means connected to the network, self data group storage portion, a reception data group storage portion for storing data received by the reception processing means, and a transmission data group storage portion for storing data to be transmitted by the transmission processing means, the self data group storage portion has a data structure in which slip data that means a slip has a structure comprising at least a slip identification code, a slip item identification code expressed or described in the slip, and a layout window identification code used to display the slip, book data that means a book has a structure comprising at least a book identification code, a book item identification code expressed or described in the book, and a layout window identification code used to display the book, and knowledge data that means knowledge comprises an actual data group corresponding to the slip identification code and the slip item identification code, and the book identification code and the book item identification code, a knowledge table formed from collection item identification codes prepared to collect items corresponding to the slip item identification code and the book item identification code, thereby gathering data of items corresponding to the collection item identification codes, and a layout window identification code used to display the knowledge table, the slip data is arranged in columns of organization, reference, and general control in the same format, the book data is arranged in the columns of organization, reference, and general control in the same format, and the knowledge data is arranged in the columns of organization, reference, and general control in the same format, data in the column of organization is defined as data used by the apparatus, data in the column of reference is defined as entire data used in the apparatus and other apparatuses, and data in the column of general control is defined as data of at least an instruction, communication, or message, a reception data group has the same data structure as that of a self data group, a transmission data group has the same data structure as that of the self data group, and when the slip, book, and knowledge data are transmitted in the column of general control of the reception data group, the received knowledge data of the data can be displayed using the knowledge table so as to allow operation of permitting or inhibiting replacement of the received knowledge data with corresponding knowledge data of the self data group.

With this data structure, data can be used in various forms with high versatility. When reception data is received from a branch or other companies, and transmission data is transmitted to a branch or other companies, simultaneity with respect to the branch or other company can be obtained, and simultaneity in purchase order and order reception of merchandise can be obtained.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 3A and 3B are views showing examples of a setting window and application window in use of the apparatus of the present invention;

FIG. 4 is a view showing an example of a table of a business logic applying section;

FIGS. 8A and 8B are views showing examples of the setting window and application window in use of the apparatus of the present invention;

FIGS. 9A and 9B are views showing examples of the setting window and application window in use of the apparatus of the present invention;

FIGS. 10A and 10B are views showing examples of the setting window and application window in use of the apparatus of the present invention;

FIGS. 11A and 11B are views showing examples of the setting window and application window in use of the apparatus of the present invention;

FIGS. 12A and 12B are views showing examples of the setting window and application window in use of the apparatus of the present invention;

FIG. 14 is a view showing the data structure of the present invention;

FIG. 23 is a view showing an application window in use of the apparatus of the present invention;

FIG. 24 is a view showing an application window in use of the apparatus of the present invention;

FIG. 25 is a view showing an application window in use of the apparatus of the present invention;

FIG. 26 is a view showing an application window in use of the apparatus of the present invention;

FIG. 27 is a view showing an application window in use of the apparatus of the present invention;

FIG. 28 is a view showing an application window in use of the apparatus of the present invention;

FIG. 29 is a view showing an application window in use of the apparatus of the present invention;

FIG. 30 is a view showing an application window in use of the apparatus of the present invention;

FIG. 31 is a view showing an application window in use of the apparatus of the present invention;

FIG. 32 is a view showing an application window in use of the apparatus of the present invention;

FIG. 33 is a view showing an application window in use of the apparatus of the present invention;

FIG. 34 is a view showing an application window in use of the apparatus of the present invention;

FIG. 35 is a view showing an application window in use of the apparatus of the present invention;

FIG. 36 is a view showing an application window in use of the apparatus of the present invention;

FIG. 37 is a view showing an application window in use of the apparatus of the present invention;

FIG. 38 is a view showing an application window in use of the apparatus of the present invention;

FIG. 39 is a view showing an application window in use of the apparatus of the present invention;

FIG. 40 is a view showing an application window in use of the apparatus of the present invention;

FIG. 41 is a view showing an application window in use of the apparatus of the present invention;

FIG. 42 is a view showing an application window in use of the apparatus of the present invention;

FIG. 43 is a view showing an application window in use of the apparatus of the present invention;

FIG. 44 is a view showing an application window in use of the apparatus of the present invention;

FIG. 45 is a view showing an application window in use of the apparatus of the present invention;

FIG. 46 is a view showing an application window in use of the apparatus of the present invention;

FIG. 47 is a view showing an application window in use of the apparatus of the present invention;

FIG. 49 is a view showing an application window in use of the apparatus of the present invention;

FIG. 50 is a view showing an application window in use of the apparatus of the present invention;

FIG. 51 is a view showing an application window in use of the apparatus of the present invention;

FIG. 52 is a view showing an application window in use of the apparatus of the present invention;

FIG. 53 is a view showing an application window in use of the apparatus of the present invention;

FIGS. 55A to 55C are views showing a use example of a knowledge table using the data structure of the present invention;

FIGS. 56A and 56B are views showing a use example of another knowledge table using the data structure of the present invention;

FIGS. 57A to 57D are views showing a use example of still another knowledge table using the data structure of the present invention;

FIGS. 58A to 58C are views showing a use example of still another knowledge table using the data structure of the present invention;

FIGS. 59A and 59B are views showing a use example of still another knowledge table using the data structure of the present invention;

FIGS. 60A to 60D are views showing a use example of still another knowledge table using the data structure of the present invention;

DETAILED DESCRIPTION OF THE INVENTION

An embodiment of the present invention will be described below with reference to the accompanying drawing.

Figure 1:
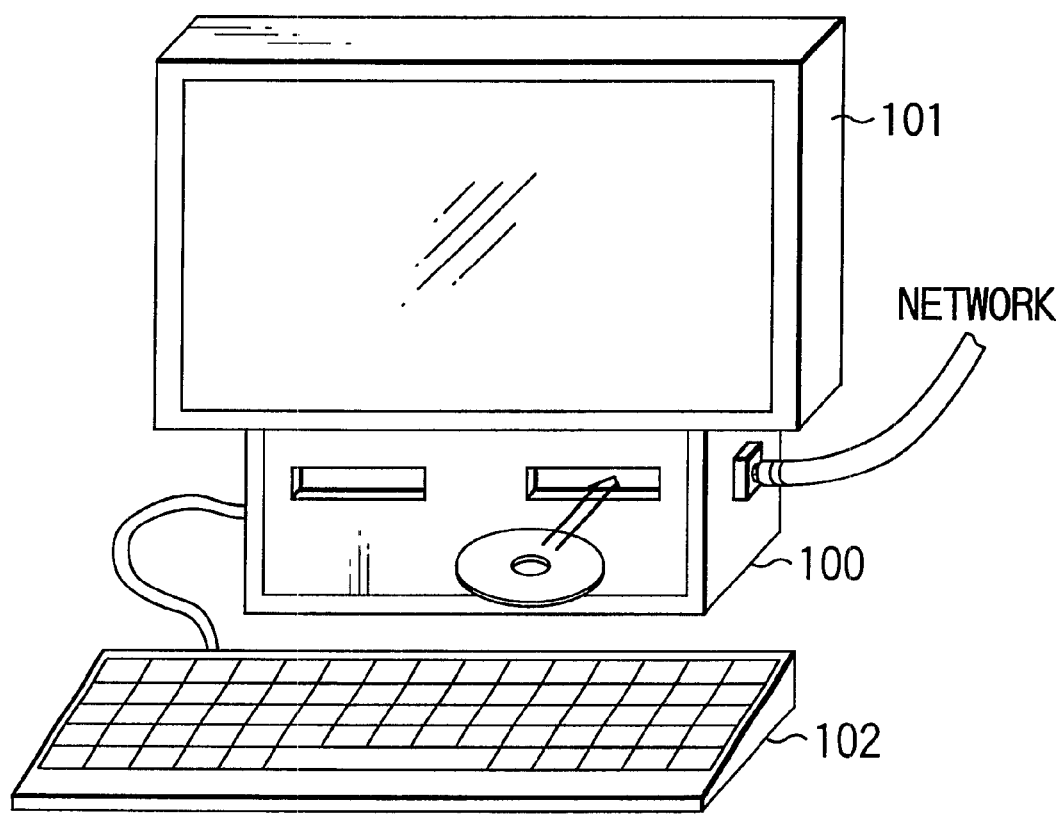
FIG. 1 is a view showing the outer appearance of an apparatus of the present invention.

FIG. 1 shows the outer appearance of a knowledge work processing apparatus to which the present invention is applied. The knowledge work processing apparatus uses, e.g., a personal computer and incorporates transmission and reception units for connecting the apparatus to a public line. An apparatus main body 100 is connected to a display 101 and operation section 102. A medium such as a magnetic disk (FD) or optical disk (DVD, CD-ROM, or MO) can be loaded in the apparatus main body 100 and used as a data or application file storage section.

Figure 2:
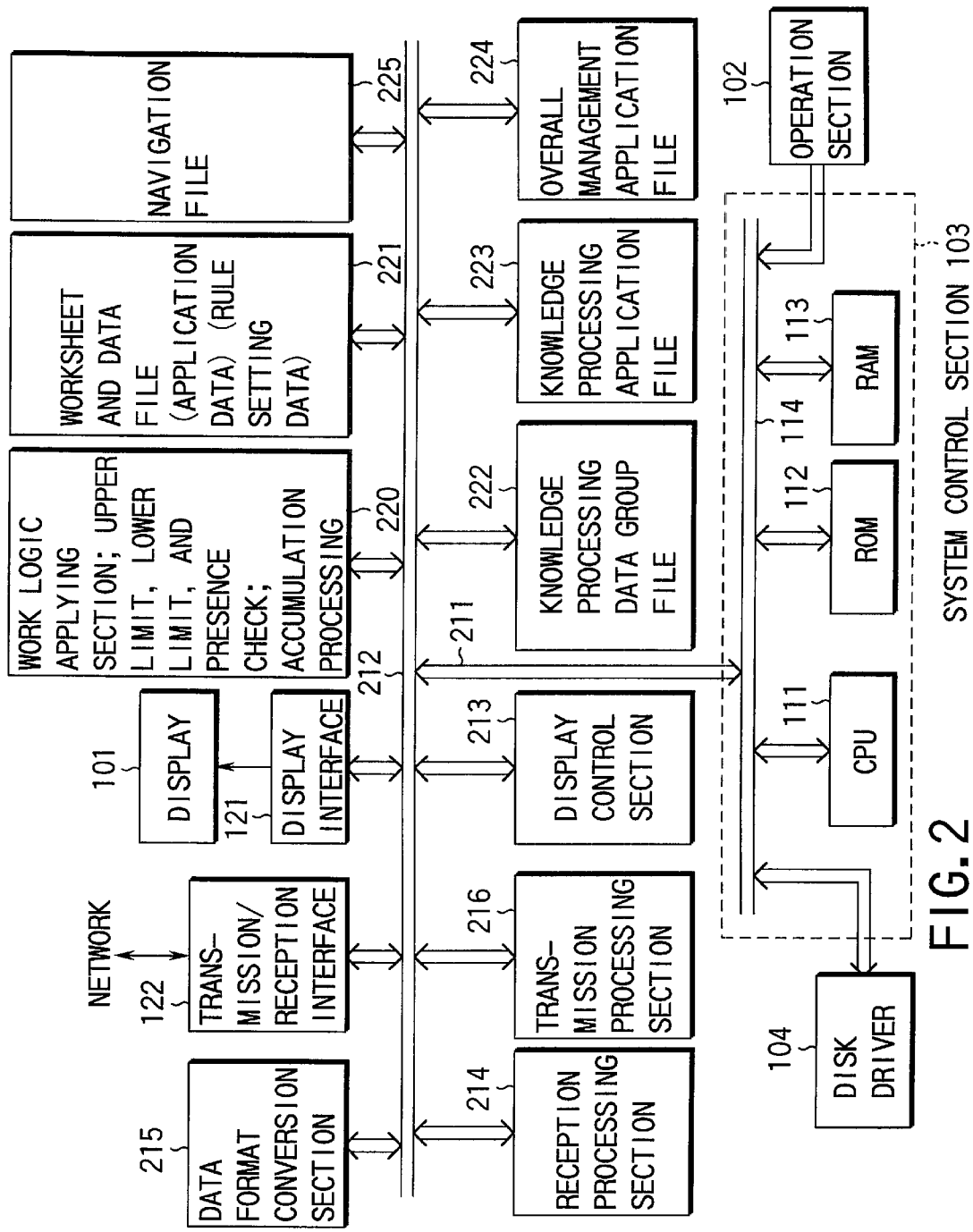
FIG. 2 is a block diagram showing the basic arrangement of the apparatus of the present invention.

FIG. 2 shows the functional blocks of the apparatus.

Reference numeral 103 denotes a system control section to which a central processing unit (CPU) 111, read-on memory (ROM) 112, and random access memory (RAM) 113 are connected through a bus 114. The operation section 102 and a disk driver 104 are also connected to the bus 114. The ROM 112 stores an application as a so-called operating system (OS) for controlling the basic operation of the system control section 103. The CPU 111 sends/receives instructions to/from the ROM 112 and executes arithmetic processing on the basis of the OS. The RAM 113 is used as a work memory for temporarily storing data.

The bus 114 is connected to functional blocks constructing the feature portion of the present invention via a bus 211. The display 101 is connected to the bus 211 through a display interface 121. The bus 211 is connected to a network through a transmission/reception interface 122. Examples of the network are a public telephone line, Internet line, or intranet line.

An image or data displayed on the display 101 is managed by a display control section 213. Data received through the transmission/reception interface 122 is temporarily received and held by a reception processing section 214. The format of the data received by the reception processing section 214 is converted by a data format conversion section 215 as needed. The converted data is received by the reception processing section 214 again.

Data stored in a transmission processing section 216 is sent onto the network through the transmission/reception interface 122. In this case, the transmission data contains a telephone number or identification number (ID) for designating a transmission destination. The transmission data may be converted in its data format by the data format conversion section 215 and transmitted depending on the transmission destination. This is because the data format of the computer of the communication partner may be different from that of this apparatus.

The data format conversion section 215 also has a function of converting the item name of reception data and receiving the data. For example, a merchandise deposit payment slip sent from the partner serves as a merchandise deposit collection slip on the receiving side. A merchandise sales billing slip sent from the partner serves as a merchandise purchase billing slip on the receiving side. A merchandise order slip sent from the partner serves as a merchandise order reception slip on the receiving side.

A work logic applying section 220 and worksheet and data file 221 are connected to a bus 212. The worksheet and data file 221 stores worksheets for various works and management operations in the form of windows. The use method of worksheets and the function of the work logic applying section 220 will be described later.

A knowledge processing data group file 222 and knowledge processing application file 223 are also connected to the bus 212. A knowledge processing data group in the knowledge processing data group file 222 has at least self data associated with self operation and reception data associated with operation, which is received from another company or subsidiary shop, as will be described later. These self data and reception data have the same format.

The self data and reception data are processed by a knowledge processing application stored in the knowledge processing application file 223. The processing result is used by the user as assist information in business operations.

An overall management application file 224 is also connected to the bus 212. The overall management application file 224 stores a management application for controlling the operation form of the entire apparatus in accordance with an operation input from the operation section 102. A navigation file 225 is also connected to the bus 212. The navigation file 225 stores an application as a navigator which assists the user operation together with the overall management application.

In the above arrangement, the system control section 103, display 101, transmission/reception interface 122, display interface 121, operation section 102, and disk driver 104 construct hardware. The remaining blocks may be application files or data files recorded on the recording area of a recording medium such as a magnetic disk or optical disk.

Details of the operation of the above system will be described next together with the manner of handling.

[1] Rule setting mode (setting before the start of use of the apparatus)
[2] Rule application mode (when the apparatus is used in business operations)
[3] Work assist mode (assist for the user when the apparatus is used in business operations)

In this apparatus, by only inputting data to a data input position (blank column with item name) of a worksheet, an application necessary for processing the contents of the item is automatically determined and executed.

The worksheet and data file 221 stores, as data, various types of worksheets such as a rule setting register, a slip, and a plan for rules required in business operations, and a slip, a book and slip, an order slip, and a settling slip used in distribution business.

The worksheets include various types of sheets such as a rule setting register, a slip, and a plan for rule required in business operations, and a slip, a book and slip, an order slip, and a settling slip used in distribution business. Each worksheet includes at least one business logic term representing the minimum unit of the meaning and contents of a work. A data input position is present in correspondence with the logic term.

In design for use of this apparatus, a plan or worksheet for rule setting is used. When data is input to the data input position of the worksheet, the input data becomes item name data or rule setting data. The data input position of the worksheet is classified into a minimum unit representing the meaning and contents of a work and defined. For this reason, when data is input to the data input position, the work and contents meant by this data input position have reality. Additionally, a data processing application is automatically made to correspond to the data input position. In this apparatus, the work and contents meant by the data input position, or the item is called a work logic term.

A simple example will be described. For example, when due date data is input to an item "sales period" of a data input position of a book and slip representing sales merchandise A, the sales period of this merchandise is set. The due date data of the sales period serves as check data when the merchandise A is ordered or as check data when the sales period is to be changed. When data is input to an item "inventory quantity" of a data input position of the book and slip, an inventory quantity M is set. When the merchandise A is ordered, this data serves as inventory check data. That is, when rule setting data is input, an application that will use this data is also determined.

After input of the rule setting data, when data is input to a data input position of an order reception slip of the merchandise A where an order reception quantity is to be input in use of the computer for operations, this data serves as application data.

For example, when an order for the merchandise A is made, and the quantity of order received is m, the user inputs the quantity m to the data input position. In the computer, (M−m) is checked. If (M−m) has a positive value, it is determined that the stocked merchandise is present. If the value is negative, it is determined that no stocked merchandise is present. When the merchandise A is ordered, the sales period is also checked. To do this, the set due date data is compared with time data in the apparatus to check whether the date represented by the time data is present within the period represented by the set due date data. Hence, when data is input to a data input position of a worksheet, an application that uses this data is also correlated to the data.

The work logic applying section 220 has a table processing section for correlating the item of each data input position of a worksheet to an application for processing data of this item. In this apparatus, this application is called a business operating system (business OS). The business operating system (business OS) is predetermined software such as presence check software, upper limit check software, lower limit check software, and total amount processing software.

In this apparatus, the table processing section is called a rule matching/check section for determining which software is used when business operating system software is used on the basis of the business logic terms of a business worksheet in data processing.

This will be described in more detail.

FIG. 3A shows a worksheet. The worksheet describes business logic terms. Data can be described in blank portions (data input positions) corresponding to the business terms. This example is a worksheet with which a credit amount is set for a client. The title "Description of Credit Amount for Client" is set. To read out the worksheet with this title, for example, when a menu is requested from the operation section 102, a title menu appears on the display. The user clicks the title "Description of Credit Amount for Client" on this title menu to display the worksheet on the display. The overall management application file 224 contains an application for activating the system and responding to an input from the operation section 102. On the basis of this application, window data such as a menu contained in the navigation data of the navigation file 225 is read out and displayed on the display 101 through the display control section 213.

Since the data processing contents corresponding to the item "Description of Credit Amount for Client" are predetermined, the work logic applying section 220 has data representing the correlation between software for performing this data processing and the worksheet.

In the display state shown in FIG. 3A, the client number and the company name are input. This worksheet also has columns of the date of start of application, date of end of application, credit amount, and stop of application. Necessary data are described in these columns. In this example, the date of start of application is Jun. 6, 1997 and the credit amount is 200,000,000. No data are described in the columns of the date of end of application and the stop of application. When no data are described, data processing for these items are not automatically executed. A worksheet for creating a sales merchandise list of a client is also stored. With this worksheet, various types of data of the client (rule setting data) can be created.

When necessary rule setting data are described in necessary worksheets, the end of window display is clicked. The worksheets are stored in the worksheet and data file 221. Since the necessary data processing in a business operation is predetermined depending on the types (contents meant) of the rule setting data, a program to be applied to each data can be determined upon the data input.

In actual use, when application data is input to check a client for, e.g., the above-mentioned credit amount, it must be determined whether the application data is appropriate. The upper limit check processing is performed by comparing the application data with the previously input credit amount (business setting data) and by determining whether the value of the application data exceeds that of the business rule setting data.

More specifically, in this apparatus, business application software is perfectly separated into business logic and program logic (computer logic) in accordance with a predetermined reference, and the arrangement of the apparatus is considered based on this separation. The predetermined reference includes worksheets (business documents) and items expressed in the worksheets. The worksheets are displayed as computer windows or computer books and slips in the form of slips or references.

Further the business data are classified into a business transaction know-how data group (meaningful minimum unit elements for determining the contents of a business contract and the like), a basic business operation data group (meaningful minimum unit elements such as company rules for pursuing the contract), and an account data group (meaningful minimum units such as accounting processing rules based on the Commercial Code the tax law, and the commercial transaction law). These data groups are made to correspond to applications for processing these data groups.

The data are separated and arranged as described above. Only the mechanism for processing the above items is left as the program logic to constitute the application program. This is the business OS. The above items are simple data if their meaning and contents are known. These are business data or work data.

The software (business OS) stored in the work logic applying section 220 is a software group for performing upper limit check processing, lower limit check processing, presence check processing, and total amount processing using application data (data input when the apparatus of the present invention is used in actual business transaction) and corresponding rule setting data (data stored in a database in advance).

Referring back to FIG. 3A, a database using a worksheet is prepared, as shown in FIG. 3A. In the above example, the credit amount is set for a given client. In addition, a client company list database, database of sales merchandise for the clients, data of unit prices and quantity information of sales merchandise can also be prepared.

FIG. 3B shows an application window when a client, ABCDE Co. made an order. In this case, an application worksheet is read out as the worksheet. As shown in FIG. 3B, accessed information is input to each necessary position. More specifically, the client code, client name, merchandise code, unit price, quantity, and amount of order received are input. When these data are input, the start is instructed. The application worksheet of the above application window is read out by switching the mode to rule application mode and requesting the application window menu from the operation section 102. Navigation data of the navigation file 225 and the display control section 213 operate to display the titles of application worksheets on the display 101. When a desired title, i.e., "Order Reception" is present, the user clicks this title.

With this operation, the application window shown in FIG. 3B can be obtained on the display 101. The user then inputs data. When the start of inquiry is operated, it is determined whether the amount of order received exceeds the credit amount (upper limit check processing). At this time, the work logic applying section 220 recognizes the item "amount of order received" and automatically selects and executes software for upper limit check processing. The resultant data is displayed on the display 101 as "within the credit amount" or "over the credit amount" through the display control section 213.

FIG. 4 shows a correlation table among worksheets, business logic terms described in the worksheets, worksheet group data in which the business logic terms are present, and application software. With this table, a worksheet currently accessed on the display 101 is recognized. When data is input, a corresponding business logic term is recognized, and corresponding application software is determined. Data obtained upon applying the software is fed back on the display as a window again. The table shown in FIG. 4 can be described in either the work logic applying section 220 or worksheet and data file 221.

The above embodiment has described the basic principle of the present invention. The present invention is not limited to the above embodiment. The business logic terms are merely examples. All the items such as various types of slips, books and slips, and settling slips correspond to the business logic terms of the present invention and are used by the business logic applying section as references to select software.

Figure 5:
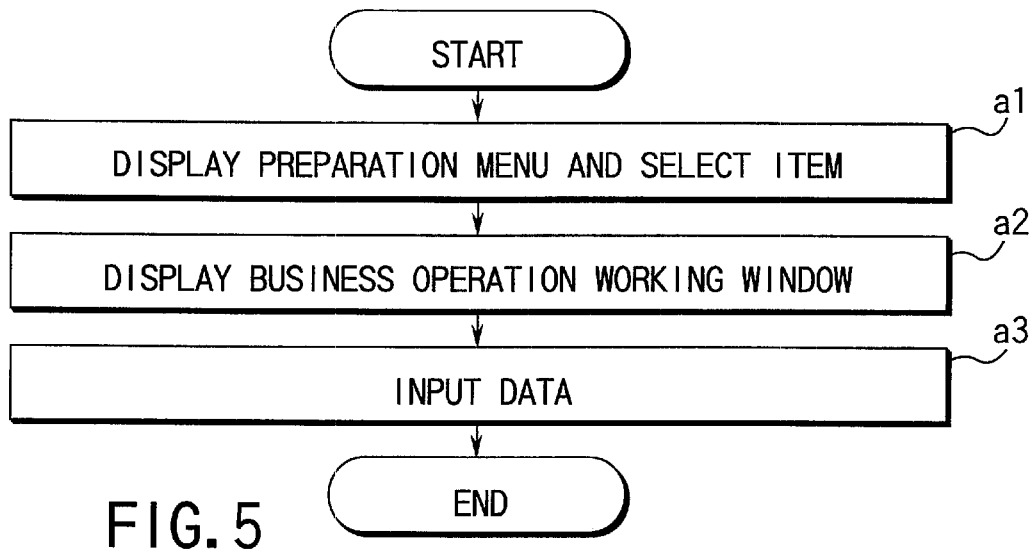
FIG. 5 is a flow chart showing an operation routine in use of the apparatus of the present invention.

FIG. 5 shows an operation in the preparation stage of use of the apparatus of the present invention in business operations. Overall unit management is performed by an application program of the overall management application file 224, and the operation order of the respective units, data search, data output, and the like are controlled.

Assume that an operation is performed through the operation section to use a business operation working window. A business operation working window (worksheet) for preparing a data file is selected from a working preparation menu and displayed on the display (steps a1 and a2). While viewing the window, the user inputs business setting data to blank portions of appropriate items (step a3) to prepare a business operation data file. A similar processing routine is executed to set a business operation rule.

Figure 6:
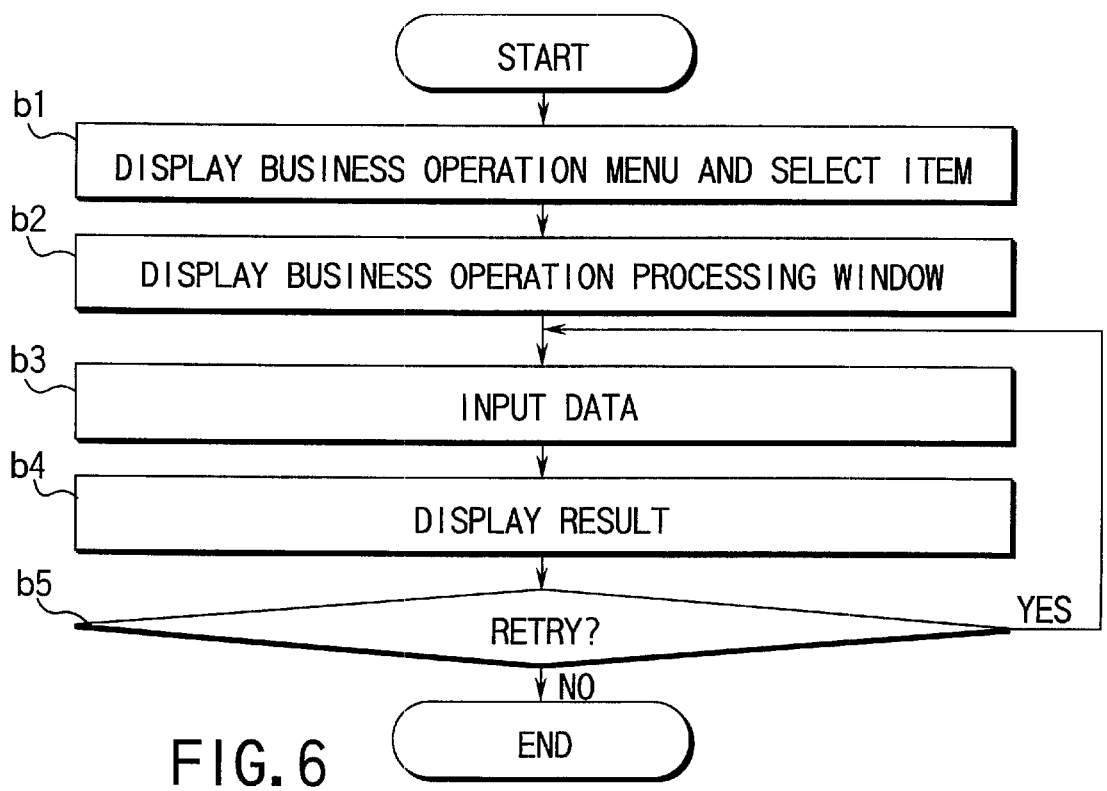
FIG. 6 is a flow chart showing an operation routine in use of the apparatus of the present invention.

FIG. 6 shows an operation example for using a database (control data) thus prepared. When a business operation menu is displayed, and a target item is selected from the menu (step b1), the window is changed to a business operation processing window (step b2) corresponding to the item. The user inputs necessary use data while viewing the business operation processing window (step b3). The work logic applying section 220 intelligently determines necessary software in accordance with the type of use data on the basis of the table shown in FIG. 4. A processing result by this software is displayed on the display (step b4). The user retries or enters OK upon checking this result (step b5).

Figure 7:
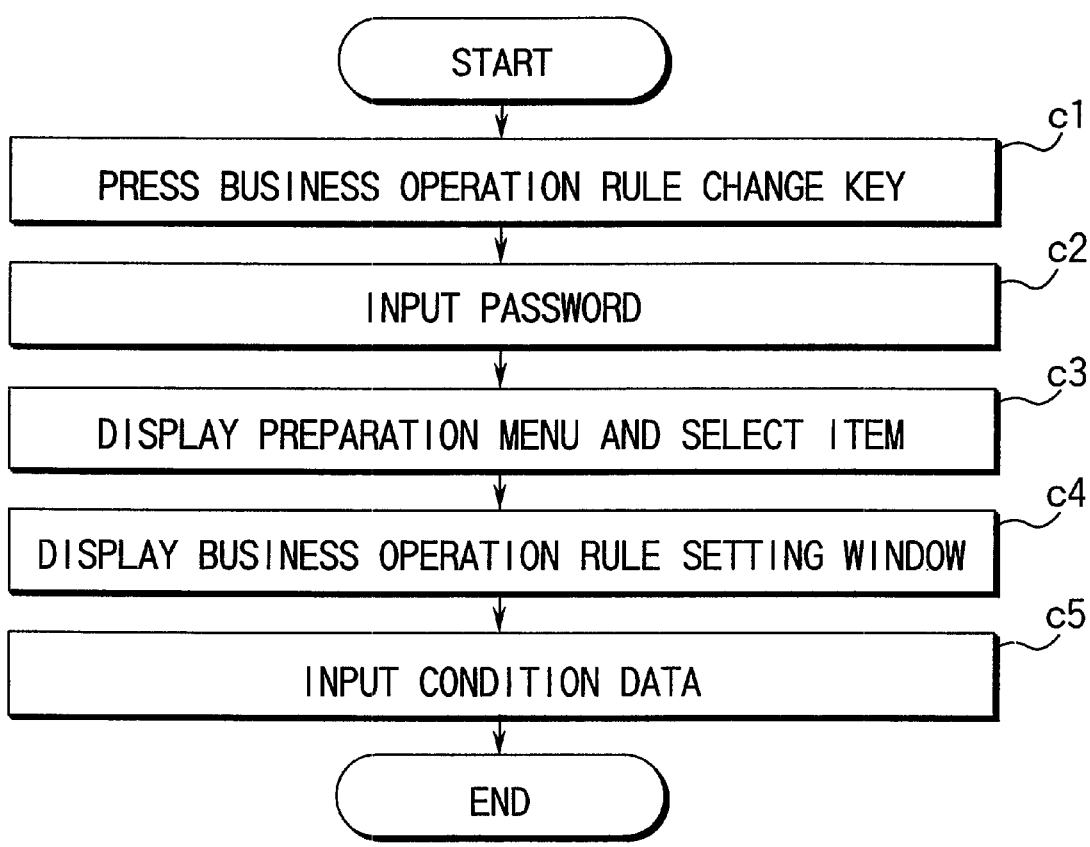
FIG. 7 is a flow chart showing an operation routine in use of the apparatus of the present invention.

FIG. 7 shows a processing procedure used when a business operation rule must be changed. When the business operation rule change key is operated, a prompt is displayed to input a password with keys (steps c1 and c2). This aims at preventing anybody from arbitrarily changing the business operation rule. When the password is input, a preparation menu is displayed, as in the above-described case. The user selects an item for changing the rule from this menu (step c3). When the business operation rule setting window is displayed, condition data is input to a necessary portion (step c5).

Several examples will be described below.
(1) Check of Account of Client in Order Reception Operation
  (a) Preparation for Order Reception . . . the client is registered in this preparation.
  (b) Actual Order Reception Operation Time . . . it is checked if the client is registered in advance.

(2) Check of Credit Amount in Order Reception Operation
   (a) Preparation for Order Reception . . . the client is registered, and its credit amount is registered.
   (b) Actual Order Reception Operation Time . . . it is checked if the sum of the account receivable of the client and the amount of order exceeds the credit amount.
(3) Check of Authority of Person in Charge in Order Reception Operation
   (a) Preparation for Order Reception . . . the person in charge is registered, and the upper limit amount of the sales authority of the person in charge is registered.
   (b) Actual Order Reception Operation Time . . . it is checked if the total amount of order received exceeds the upper limit amount of the sales authority of the person in charge.

The present invention is not limited to the above embodiment, and various changes and modifications can be made.

FIG. 8A shows a rule setting window for setting a presence check rule. FIG. 8B shows a presence check application window. The rule setting window has a supplier code, supplier name, date of start of transaction, date of end of transaction, and stop of application. Assume that the order No., date of order "Jun. 6, 1995", and supplier code "0300" are input on the application window shown in FIG. 8B. Since this supplier is present in the data file and the date of start of transaction is appropriate, an order can be made. The information of the supplier, merchandise code, and merchandise name are displayed. If no supplier is present, or the date of end of transaction has passed, an alarm message or sound is generated.

FIG. 9A shows a rule setting window when a rule is set to check the upper limit of the sales amount authority of the person in charge. FIG. 9B shows an example of the upper limit check application window. The rule setting window (FIG. 9A) has, as items, the code of person in charge, date of start of application, date of end of application, sales amount authority, and stop of application. Assume that the person in charge inputs the code of person in charge "95010", date of order Jan. 30, 1998 client "X Company", merchandise code, merchandise name, quantity, unit price, and the like in the order reception application window (FIG. 9B). In the application window, spreadsheet software automatically runs to calculate the total amount. After this, check software runs to determine whether the total amount falls within the sales amount authority and whether the date of application is appropriate. In the illustrated example, nothing appears or no alarm is generated because all the input data are appropriate (2,500<700,000=sales amount authority).

FIG. 10A shows a rule setting window for setting a rule upon describing the number of days required for merchandise delivery. FIG. 10B shows a lower limit check application window. The rule setting window (FIG. 10A) has, as items, the merchandise code, merchandise name, date of start of application, date of end of application, the number of days required for merchandise delivery, and stop of application. Assume that the person in charge inputs the order reception date "Jul. 7, 1998", date of delivery "Jul. 10, 1999", merchandise code, merchandise name, quantity, and unit price in the order reception application window (FIG. 10B). In this case, the merchandise code is confirmed, and the sum of the order reception date and two days (the number of days required for delivery) is calculated. The calculated date is Jul. 9, 1998. The date of delivery desired by the user is Jul. 10, 1998. Lower limit check processing is then performed to determine that the order reception is allowed.

FIG. 11A shows a rule setting window for setting a rule for a merchandise sales set as an example of unit check. FIG. 11B shows an order reception application window. The rule setting window (FIG. 11A) has, as items, the merchandise code, merchandise name, date of start of application, date of end of application, sales set, and stop of application, and data are input to these items.

Assume that the order reception date "Mar. 3, 1998", merchandise code "4531213", and quantity "100" are input in the application window (FIG. 11B) to make order reception. In this case, since the quantity is 100, i.e., a multiple of 50, order reception is allowed.

FIG. 12A shows a rule setting window for describing merchandise unit prices for the respective quantities, which belongs to edit processing. FIG. 12B shows an order reception application window. Tue rule setting window (FIG. 12A) has, as items, the merchandise code, merchandise name, date of start of application, date of end of application, quantity range, unit price, and stop of application.

Assume that the order reception date "Jun. 1, 1998", merchandise code "4531213", and quantity "250" are input in the application window (FIG. 12B). In this case, order reception can be made without any problem. When the quantity is 250, the unit price is given as ¥90 according to the rule setting data. Data "90" is read out and displayed in the column of unit price. The arithmetic function works to calculate 90×250, and "22,500" is displayed in the column of amount.

The above rule setting windows and application windows are merely examples, and various changes and modifications can be made.

As described above, in the apparatus of the present invention, when the user simply inputs data without being aware of the description of a program language (e.g., COBOL and FORTRAN), the input data meaning is detected, and software for processing this data can be automatically applied and prepared. In addition, immediate response processing can be executed in accordance with setting data input, and software recheck or correction need not be performed.

The user work assist function will be described next.

Figure 13:
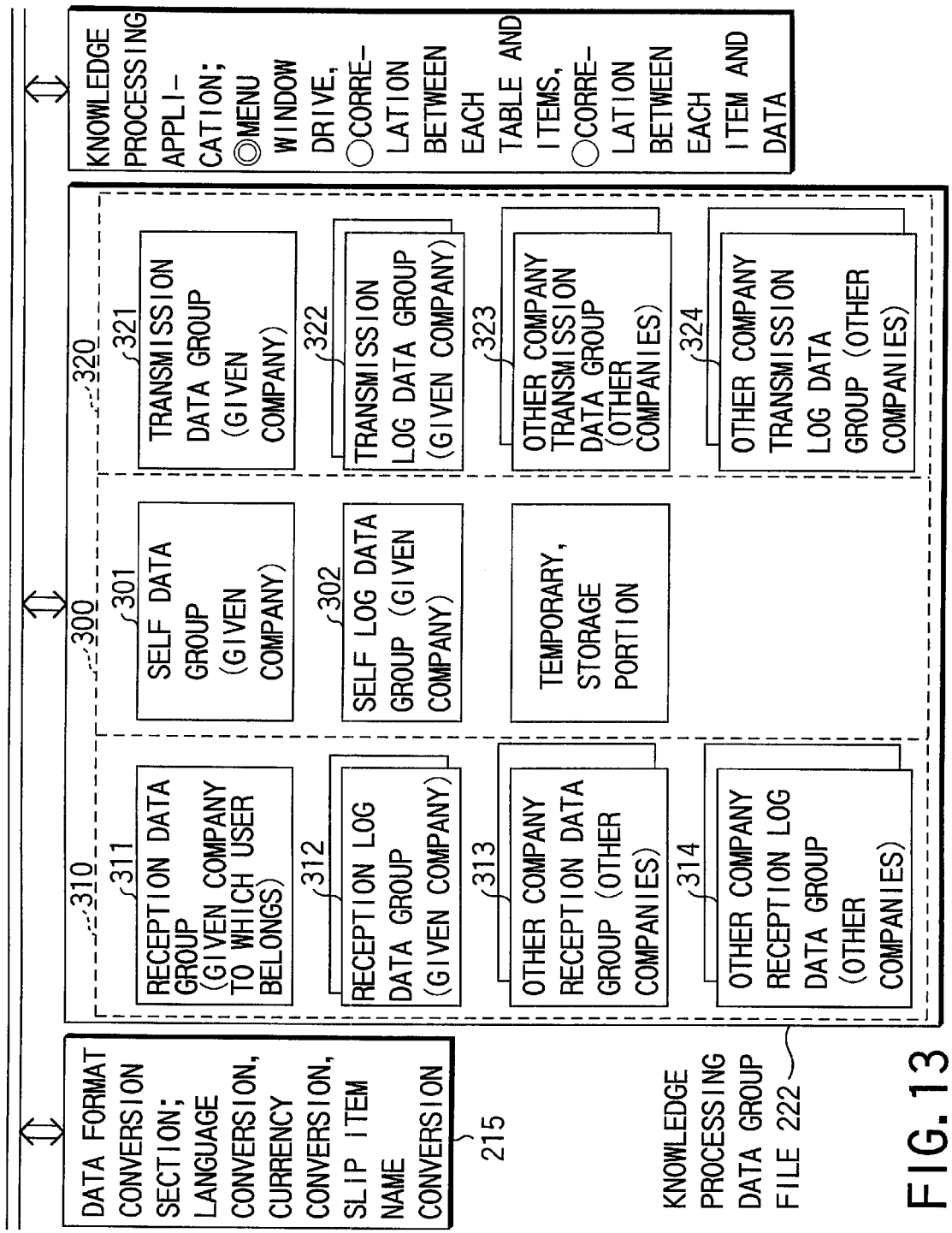
FIG. 13 is a view showing the arrangement of main part of the apparatus of the present invention.

FIG. 13 shows the detailed contents of the knowledge processing data group file 222 shown in FIG. 2. The knowledge processing data group file 222 may be integrated with the worksheet and data file 221. The knowledge processing data group file 222 has a self data portion 300, reception data portion 310, and transmission data portion 320.

The self data portion 300 has a self data group storage portion 301 for storing self data in the form of data corresponding to an item of a worksheet, and a self log data group storage portion 302 for storing data in the same form as the storage form of the self data group storage portion 301. The storage forms and data formats of the two storage portions are the same, although the definitions of stored data are different between the storage portions 301 and 302. More specifically, data stored in the storage portion 301 is current data, and data stored in the storage portion 302 is past data which has been present as self data before an operation of, e.g., altering current data.

The reception data portion 310 comprises a reception data group storage portion 311, reception log data group storage portion 312, other company reception data group storage portion 313, and other company reception log data group storage portion 314. The reception data group storage portion 311 and reception log data group storage portion 312 are paired. Although only one pair is illustrated in FIG. 13, a plurality of pairs for branches and head office, i.e. a given company group to which the user belongs are prepared. The other company reception data group storage portion 313 and other company reception log data group storage portion 314 are paired. Although only one pair is illustrated in FIG. 13, a plurality of pairs are prepared for a plurality of companies. The storage portions 311, 312, 313, and 314 of the reception data portion 310 can store data in the same form as the storage form of the self data group storage portion 301. The reception data groups include current data. The reception log data groups include past data which have been present as reception data before an operation of, e.g., altering current data.

As the reception data group of the given company group, data with the same contents as those of the self data group are preferably recorded.

The other company reception data group has the same storage format as that of the self data group. However, as actual data contents, data transmitted from other companies, whose reception is permitted, are present.

The transmission data portion 320 comprises a transmission data group storage portion 321, transmission log data group storage portion 322, other company transmission data group storage portion 323, other company transmission log data group storage portion 324. The transmission data group storage portion 321 and transmission log data group storage portion 322 are paired. Although only one pair is illustrated in FIG. 13, a plurality of pairs for branches and head office, i.e. the given company group are prepared. The other company transmission data group storage portion 323 and other company transmission log data group storage portion 324 are paired. Although only one pair is illustrated in FIG. 13, a plurality of pairs are prepared for a plurality of companies. The storage portions 321, 322, 323, and 324 of the transmission data portion 320 can store data in the same form as the storage form of the self data group storage portion 301. The transmission data groups include current data. The transmission log data groups include past data which have been present as transmission data before an operation of, e.g., altering current data.

As the transmission data group of the given company group, data with the same contents as those of the self data group are preferably recorded.

The other company transmission data group has the same storage format as that of the self data group. However, as actual data contents, data designated for transmission to other companies are present.

The data format conversion section 215 includes a language conversion section, currency conversion section, and the like, so the language used for the item name of data to be transmitted/received can be converted in accordance with the other party, so the currency can be converted in accordance with the rate information.

Currency rate information can be updated by rate information update software. The currency rate information is transmitted from an information center set through the transmission/reception interface 122.

Assume that this apparatus is set in the head office. In this case, the reception data group storage portion 311 stores data sent from a branch of the given company or its subsidiary company. FIG. 13 shows the storage portion 311 for storing a reception data group from one branch. In addition to this storage portion, storage portions for storing reception data groups from the remaining branches are present. Conversely, when this apparatus is set in a branch, the reception data group storage portion 311 has a reception data group sent from, e.g., the head office.

This also applies to the transmission data group storage portion 321. More specifically, when this apparatus is set in the head office of the given company, the transmission data group storage portion 321 stores data to be transmitted to a branch of the given company or its subsidiary company. FIG. 13 shows the storage portion 321 storing a transmission data group to be transmitted to one branch. In addition to this storage portion, storage portions for storing transmission data group to be transmitted to the remaining branches are present. Conversely, when this apparatus is set in a branch, the transmission data group storage portion 321 has a transmission data group to be transmitted to, e.g., the head office or a transmission data group to be transmitted to another branch.

The above data groups are used by various applications stored in the knowledge processing data group file 222 for display control, preparation, setting, extraction, knowledge analysis, and the like. The knowledge analysis includes history check and settlement.

FIG. 14 shows the classification form of data in the self data group.

Since the remaining reception data groups, transmission data groups, and recording data groups are the same, the format of the self data group storage portion 301 will be described as a representative example.

Data are classified into columns of organization Y1, reference Y2, and general control Y3 in the vertical direction and columns of slip X1, book X2, and knowledge X3 in the horizontal direction. As a data group X1Y1 in the column of organization/slip, a data group of various slips used in the respective organizations is present.

As a data group X1Y2 in the column of reference/slip or data group X1Y3 in the column of general control/slip of the vertical system, various slips equal in number to those of the data group X1Y1 in the column of organization/slip are stored in the same form as that of the data group X1Y1 together with identification codes. The slips include slips sent/received to/from clients, slips associated with distribution of merchandise, products, or components, slips associated with personnel, slips associated with banks, slips associated with salary, and slips associated with accounting. The slips also include billing slips, offset slips, finance slips, and factoring slips. The finance slips and factoring slips are classified into application slips, permission slips, and NG slips.

These slips are arranged in the columns of organization/slip, reference/slip, and general control/slip in the same form, though the meaning of a slip changes depending on the column to which the slip belongs. Slips stored in the column of organization/slip mean that the slips are used in the head office or branch where the system is actually located. Slips stored in the column of reference/slip mean that the slips are used in all of the head office, branches, and other companies as clients, i.e., in the given and other companies. Hence, for some slips present in the column of reference, corresponding slips in the column of organization are not used.

Slips stored in the column of general control/slip mean that the slips are mainly used for instructions, inquiries, and communications, which generally control change, correction, alteration, or deletion of a price, and change, correction, alternation, or deletion of a period.

As data groups X2Y1, X2Y2, and X2Y3 in the columns of organization/book, reference/book, and general control/book of the vertical system, various books equal in number are stored in the same form. Books include books associated with the business and personnel organizations of the head office and branches, books of merchandise and products, books associated with personnel, books of transaction banks, books associated with salary, and books associated with accounting. Items corresponding to all items (e.g., company name, organization, merchandise name, and personal name) to be described in slips are put into books.

These books are arranged in the columns of organization/book, reference/book, and general control/book in the same form, though the meaning of a book changes depending on the column. Books stored in the column of organization/book mean that the books are used in the head office or branch where the system is actually located. Books stored in the column of reference/book mean that the books are used in all of the head office, branches, and other companies as clients. Books stored in the column of general control/book mainly mean instructions, inquiries, and communications and generally control change, correction, alteration, or deletion of data in books, and change, correction, alternation, or deletion of a period.

As data groups X3Y1, X3Y2, and X3Y3 in the columns of organization/knowledge, reference/knowledge, and general control/knowledge of the vertical system, actual data corresponding to slips and books that are equal in number and are stored in the same form are stored.

In the data group X3Y1, item names, company names, and numerical values written in slips are described as actual data, and item names, company names, and numerical values written in books are also described as actual data. Hence, there are data of specific clients, prices of merchandise and products, sales periods, names of persons belonging to organizations, salary, and the like. The slips, books, and knowledge are linked through item identification codes in the horizontal system.

These actual data are arranged in the columns of organization/knowledge reference/knowledge, and general control/knowledge of the vertical system, though the meaning of data changes depending on the column. Data stored in the column of organization/knowledge mean that the data are used in the head office or branch where the system is actually located. Data stored in the column of reference/knowledge mean that the data are used in all of the head office, branches, and other companies as clients. Data stored in the column of general control/knowledge mainly mean instructions, inquiries, and communications and generally control change, correction, alteration, or deletion of actual data, and change, correction, alternation, or deletion of a period.

These data are correlated to corresponding items of slips or books by indices or addresses. This correlation will be described later.

Figure 15:
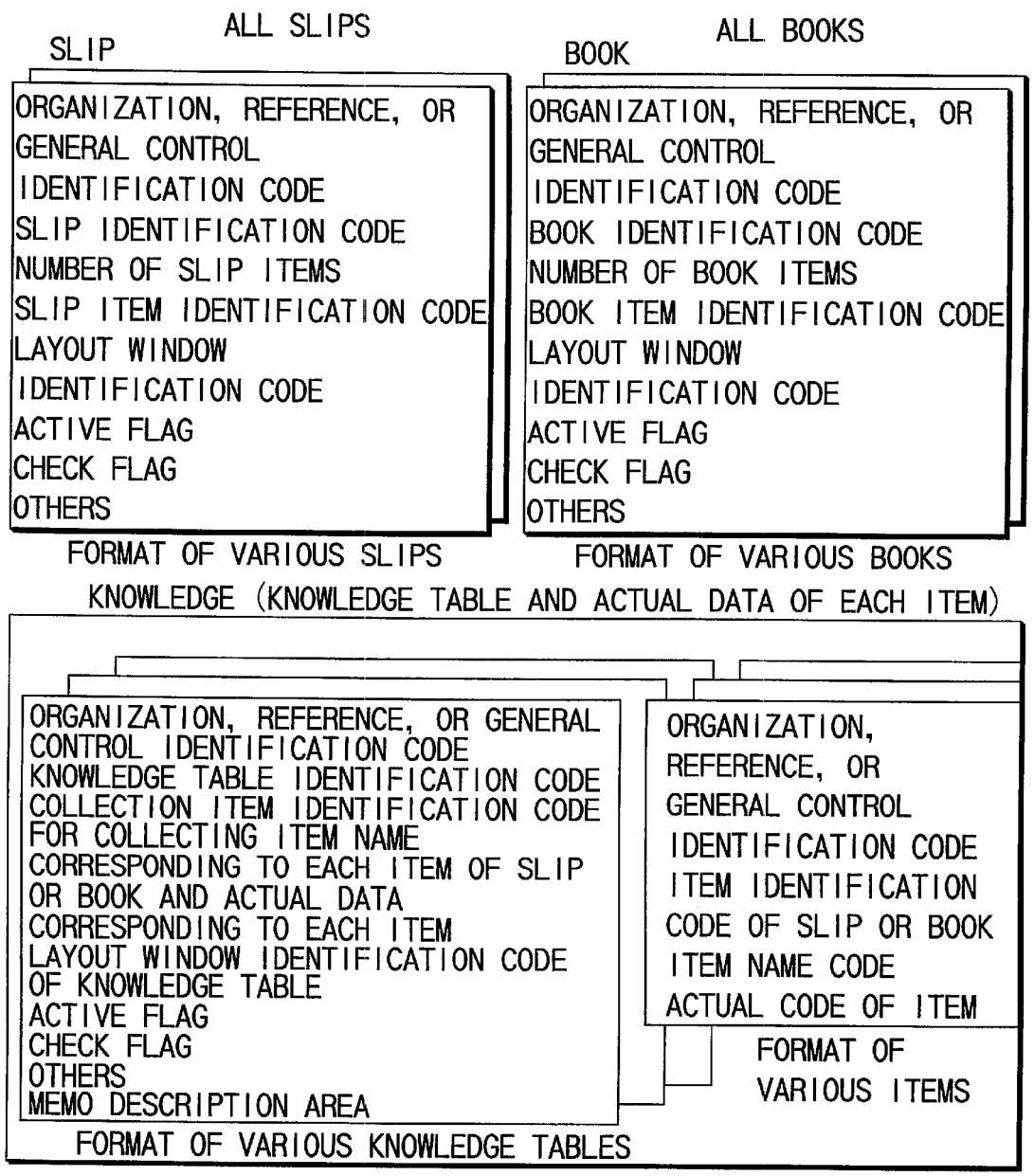
FIG. 15 is a view showing the data structure of the present invention.

FIG. 15 shows the data structures of a slip, book, and knowledge. A slip in the column of slip has a data structure comprising an identification code representing the column to which this slip belongs: organization, reference, or general control, slip identification code representing identification of the slip itself, the number of items (portions where the slip name, company name, merchandise name, and the like are to be written) of this slip, identification code of each item, and identification code of a layout window used to display this slip. The data also has a check flag area. This flag is temporarily used when a certain operation has been performed, e.g., immediately after reception or in preparation for transmission. An active flag is used to represent whether this slip is currently included in slips to be used. With this flag, slips that are used in the head office but not in branches can be identified. The data also has an area used for another identification code. This code is an identification code representing whether the data belongs to the self data group or self log data group, i.e., a data group (storage portion) in FIG. 13, in which the data is present. There are also identification codes representing the given company reception data group, other company reception data group, given company transmission data group, and other company transmission data group. Other necessary identification codes are also present.

The data structure in the column of the book is as follows.

The data comprises an identification code representing "organization", "reference", or "general control" to which the book belongs, book identification code representing identification of the book itself, the number of items of the book, identification code of each item, layout window identification code used to display this book on the screen, check flag, active flag, and the like. The check flag, active flag, and the like are used as in the above-described slip.

The data structure in the column of knowledge is as follows.

The data structure of knowledge is roughly divided into a knowledge table group and all-item data group. The knowledge table comprises an identification code representing "organization", "reference", or "general control" to which the table belongs, knowledge table identification code representing identification of the table itself, identification codes of items collected in this table, layout window identification code used to display the knowledge table on the screen, check flag, active flag, and the like. The check flag, active flag, and the like are used as in the above-described slip. There are also actual data areas corresponding to all items and memo information. Items and their data in the column of knowledge correspond to the items of a slip and book. The memo information is attached as information representing the know-how of handling these data, handling method, questions, and communications.

In FIG. 15, one group of data structures of the slip, book, and knowledge is shown. The columns of organization/knowledge reference/knowledge, and general control/knowledge shown in FIG. 14 have the same data structures as described above. The data format shown in FIG. 14 is the same even in each data group storage portion shown in FIG. 13. The reception data portion 310 has actual data associated with slips, books, and knowledge for which reception is permitted. The transmission data portion 320 has actual data associated with slips, books, and knowledge for which transmission is designated.

In the above data structures, various languages are prepared for item names and terms. That is, data structures corresponding to various languages are prepared. Hence, when a slip or book is displayed, the language used for item names, slip name, or book name can be changed.

Figure 16:
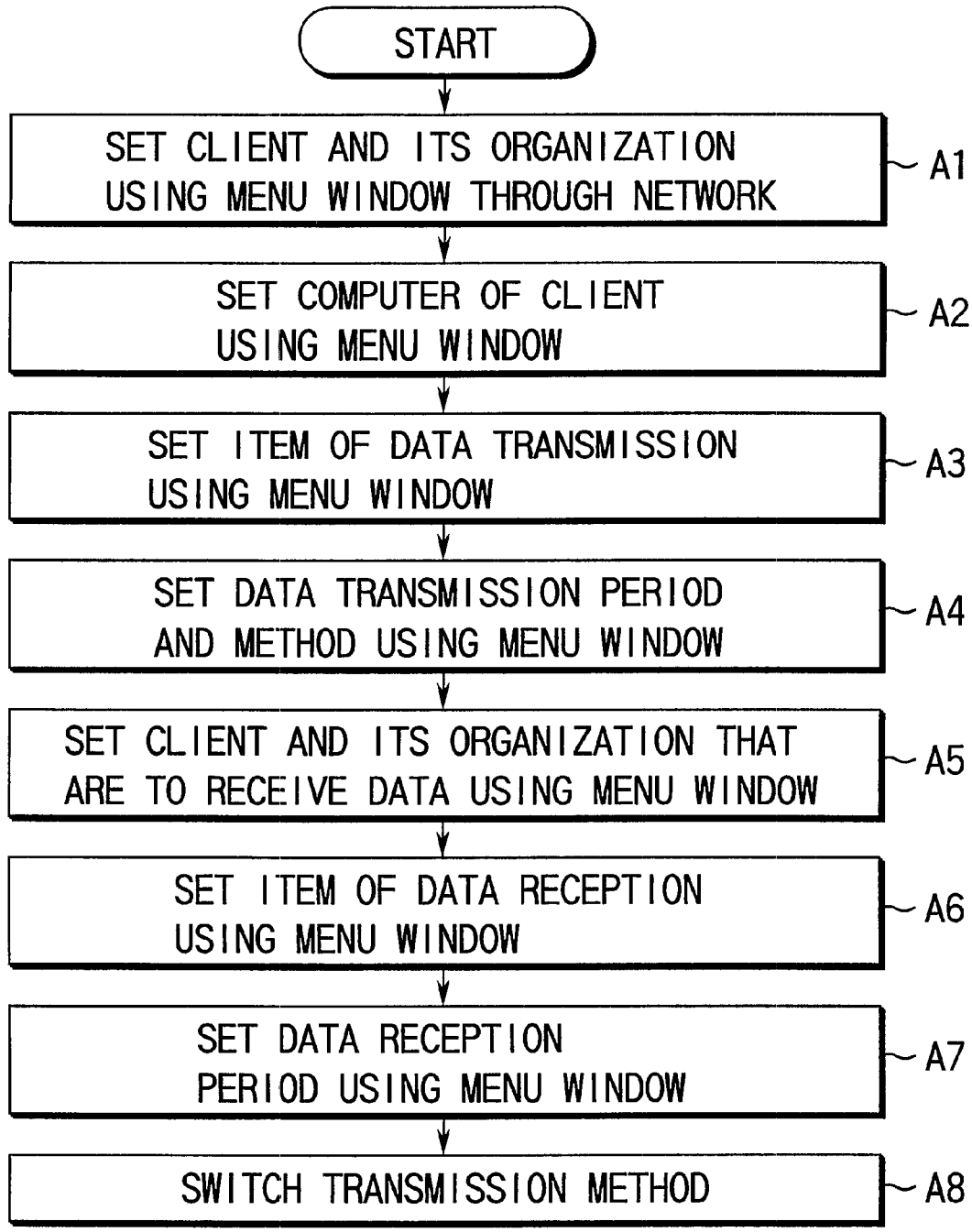
FIG. 16 is a flow chart showing a procedure of setting a data transmission/reception environment in use of the apparatus of the present invention.

FIG. 16 shows a processing routine for setting a network environment and items to be processed through the network. This will be briefly described below.

To transmit/receive data through a network, a person in charge and organization as a client must be set (step A1), and then, the computer of the client and a folder in which transaction data is to be stored must be set (step A2). Next, items of data to be transmitted are set (step A3). The data transmission period and transmission method need also be set (step A4). To set the reception environment, a person in charge and organization which are to receive data are set (step A5). Next, items of data to be received are set (step A6), and the data reception period and the like are set (step A7). The transmission method can be switched (step A8). In the above description, setting is sequentially made in steps A1 to A8. However, the order of settings may be changed.

An example of setting will be described with reference to a menu window.

FIGS. 17 to 22 show examples of a menu window used to set a company or computer for constitute a network.

Figure 17:
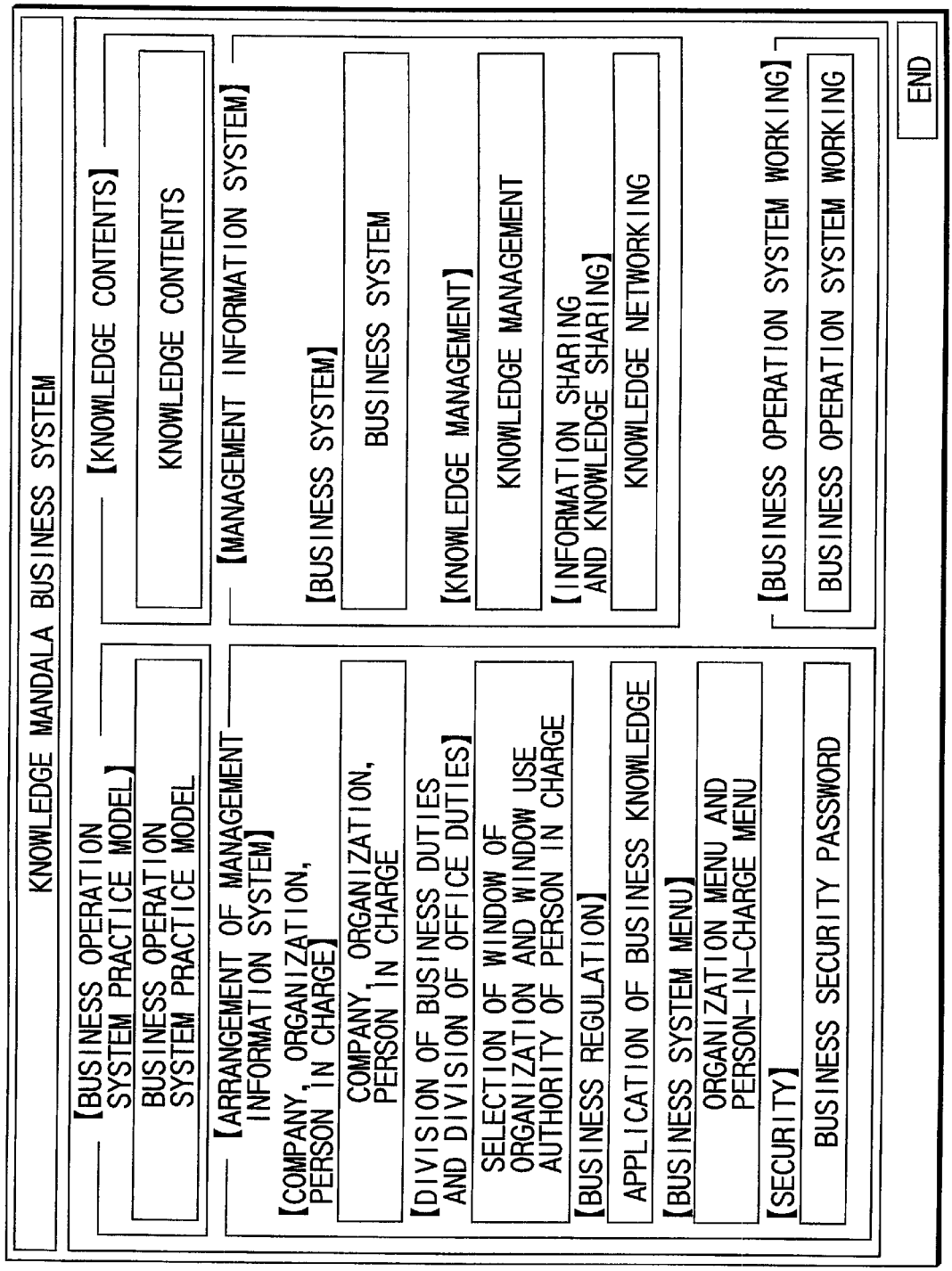
FIG. 17 is a view showing a menu window in use of the apparatus of the present invention.

The menu window shown in FIG. 17 is opened at first in setting the environment. This menu window has an item "knowledge networking" that is particularly associated with the present invention and an item "business operation system working". A menu window shown in FIG. 18 can be displayed by clicking the item "knowledge networking".

Figure 18:
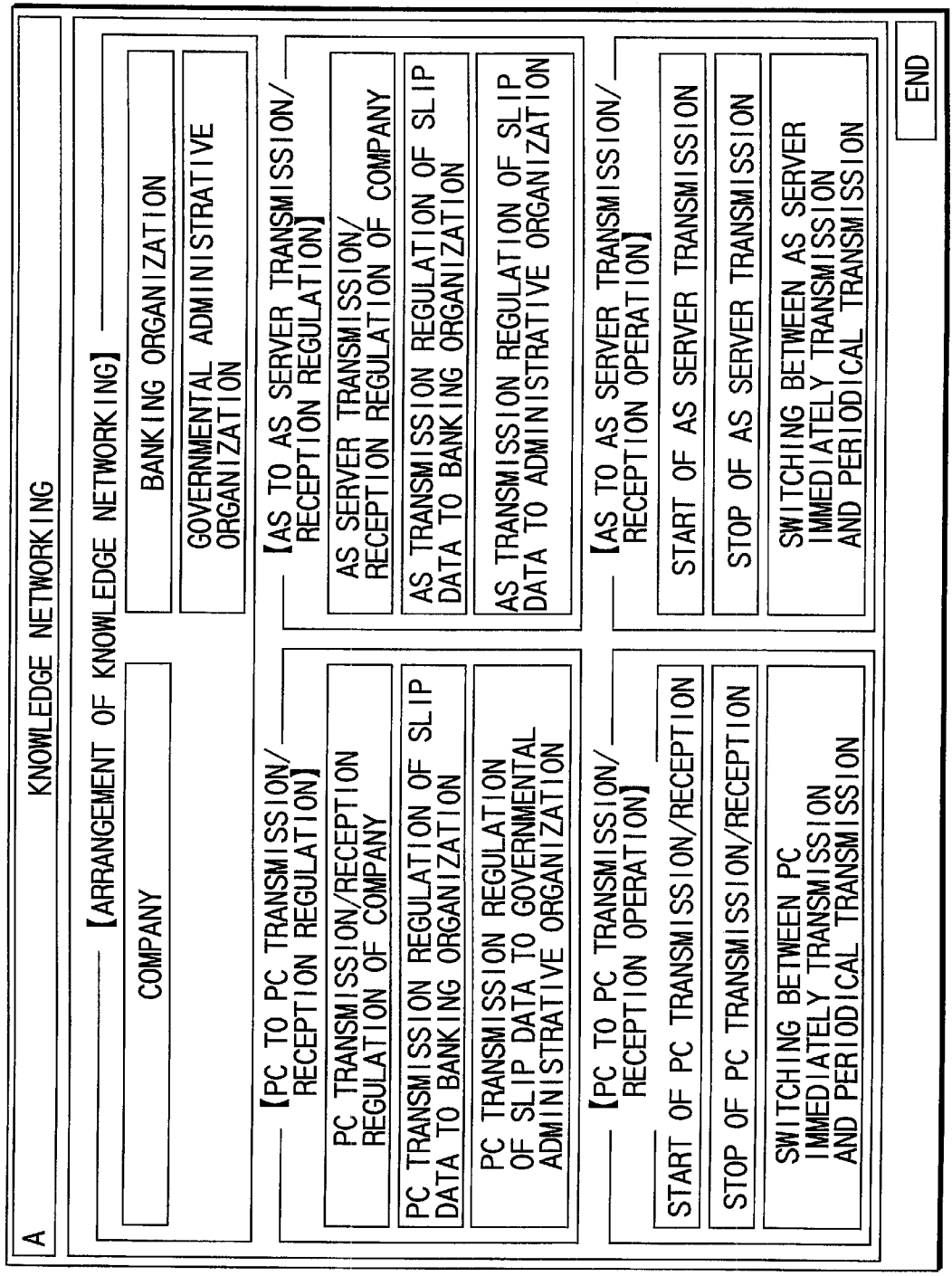
FIG. 18 is a view showing a menu window in use of the apparatus of the present invention.

The menu window in FIG. 18 is used to set the name of a company, banking organization, and administrative organization belonging to the group of networking in constructing it. This menu window has items "company", "banking organization", and "administrative organization" as subjects for forming networking.

To specify data to be transmitted or received and personal computers (PC) for transmitting or receiving the data after constructing the network, items "PC transmission/reception regulation of company", "PC transmission regulation of slip data to banking organization", and "PC transmission regulation of slip data to administrative organization" are present.

To specify data to be transmitted or received and AS servers for transmitting or receiving the data after constructing the network, items "AS server transmission/reception regulation of company", "AS server transmission regulation of slip data to banking organization", and "AS server transmission regulation of slip data to administrative organization" are present.

Figure 19:
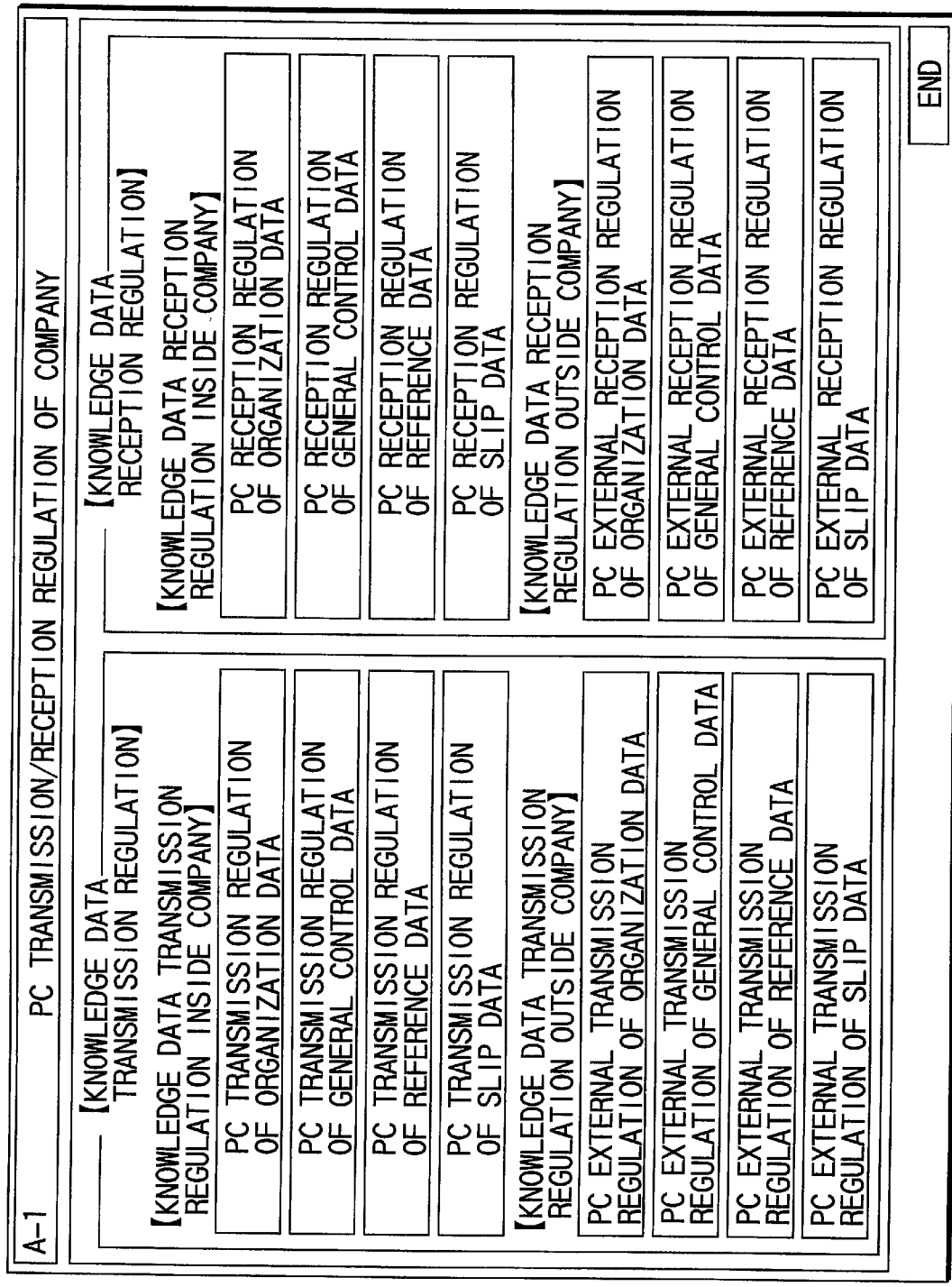
FIG. 19 is a view showing a menu window in use of the apparatus of the present invention.

When the item "PC transmission/reception regulation of company" is clicked, a menu window shown in FIG. 19 appears, so the PC transmission/reception regulation in the company and the transmission/reception regulation outside the company can be set. As shown in FIG. 19, the transmission/reception regulations include items "PC transmission/reception regulation of organization data", "PC transmission/reception regulation of general control data", "PC transmission/reception regulation of reference data", and "PC transmission/reception regulation of slip data". When an item is clicked, various organization data, various general control data, various reference data, or various slip data can be displayed. Data to be transmitted or received can be set from the displayed data.

Figure 20:
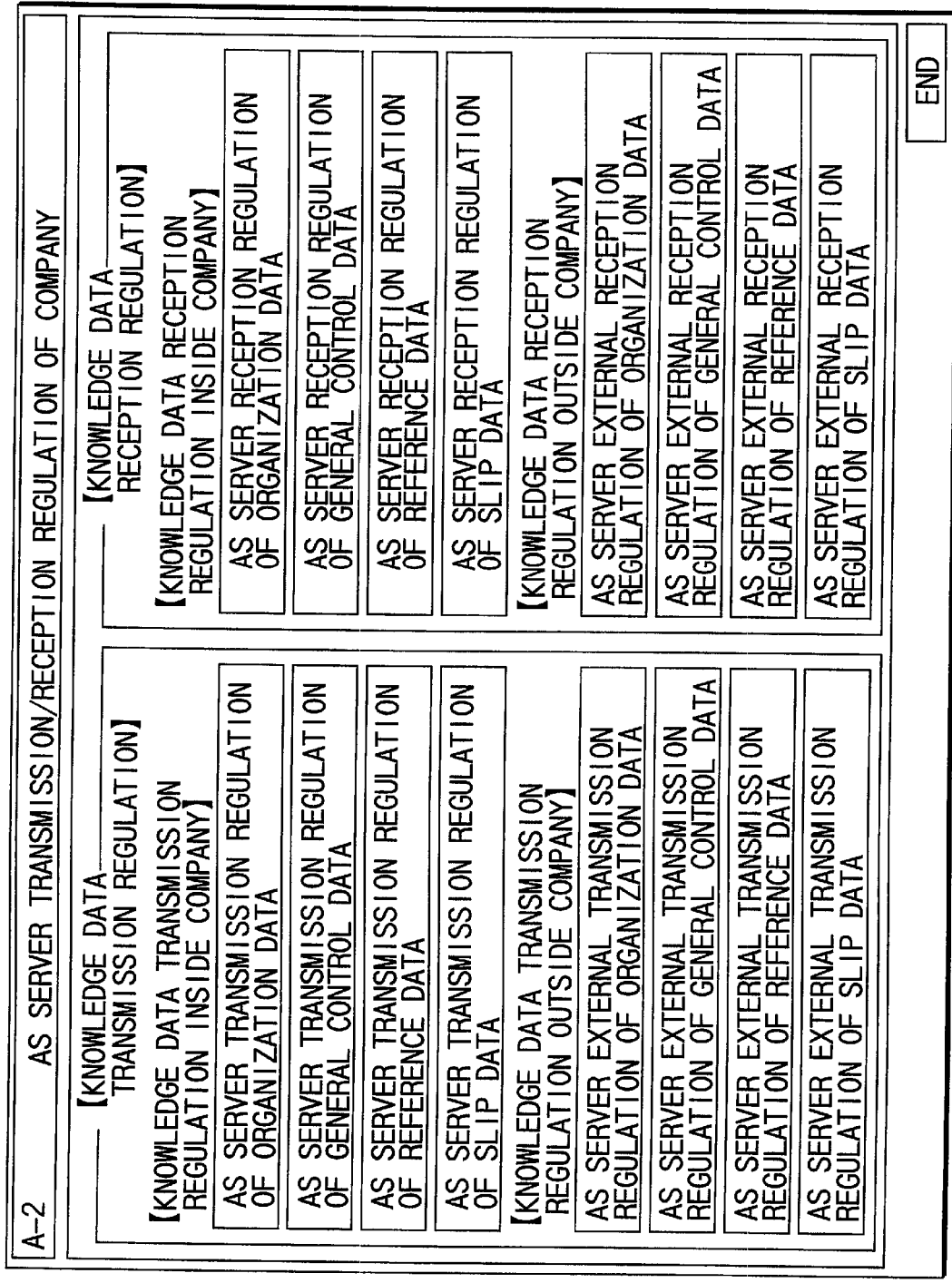
FIG. 20 is a view showing a menu window in use of the apparatus of the present invention.

When the item "AS server transmission/reception regulation of company" is clicked in the menu window shown in FIG. 18, a menu window shown in FIG. 20 is displayed, so a data transmission/reception regulation can be set as in the description of FIG. 19.

Figure 21:
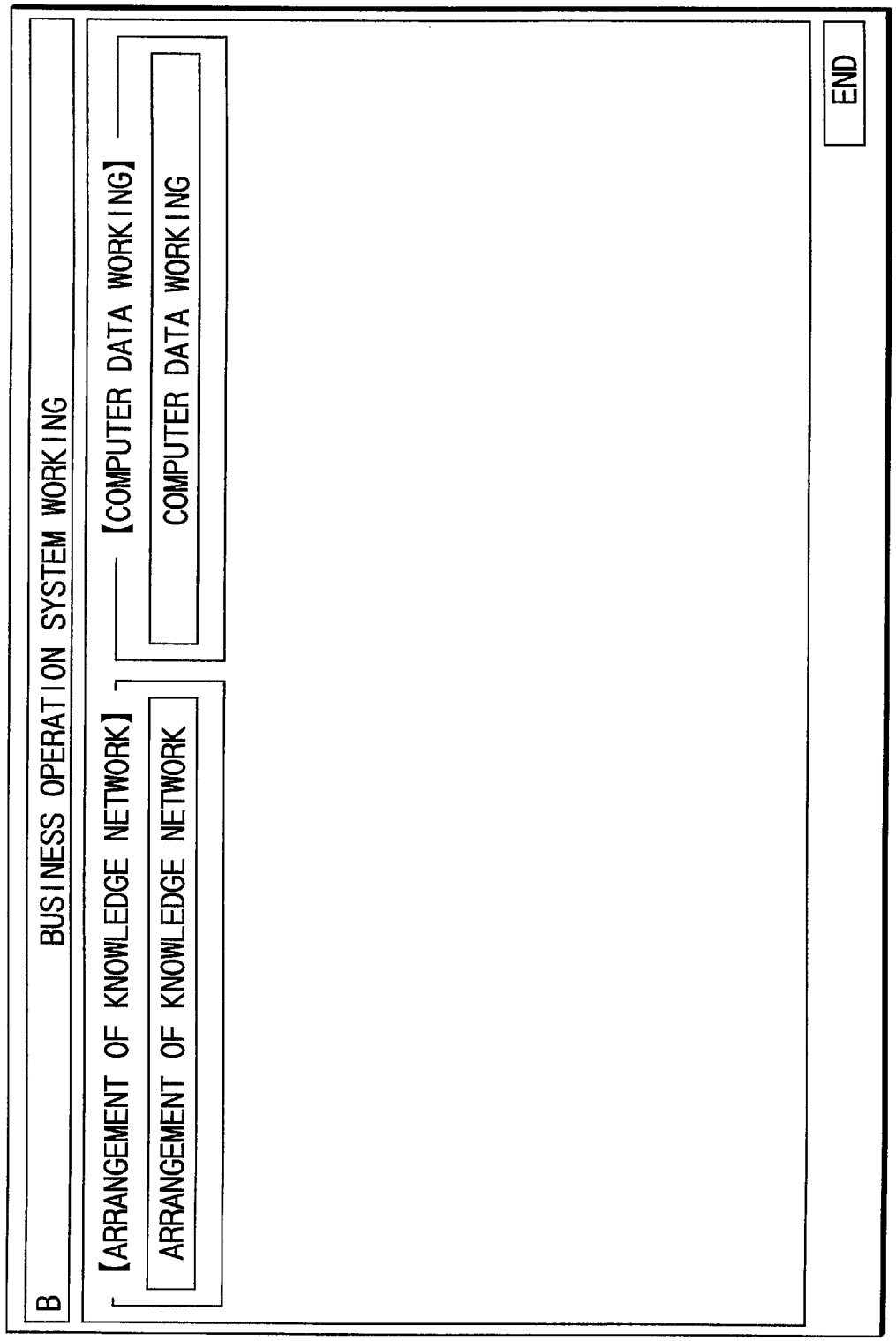
FIG. 21 is a view showing a menu window in use of the apparatus of the present invention.

Referring back to FIG. 17, when the item "business operation system working" is clicked on the menu window, the menu window shown in FIG. 21 appears. This menu window has items "configuration of knowledge network" and "computer data working".

Figure 22:
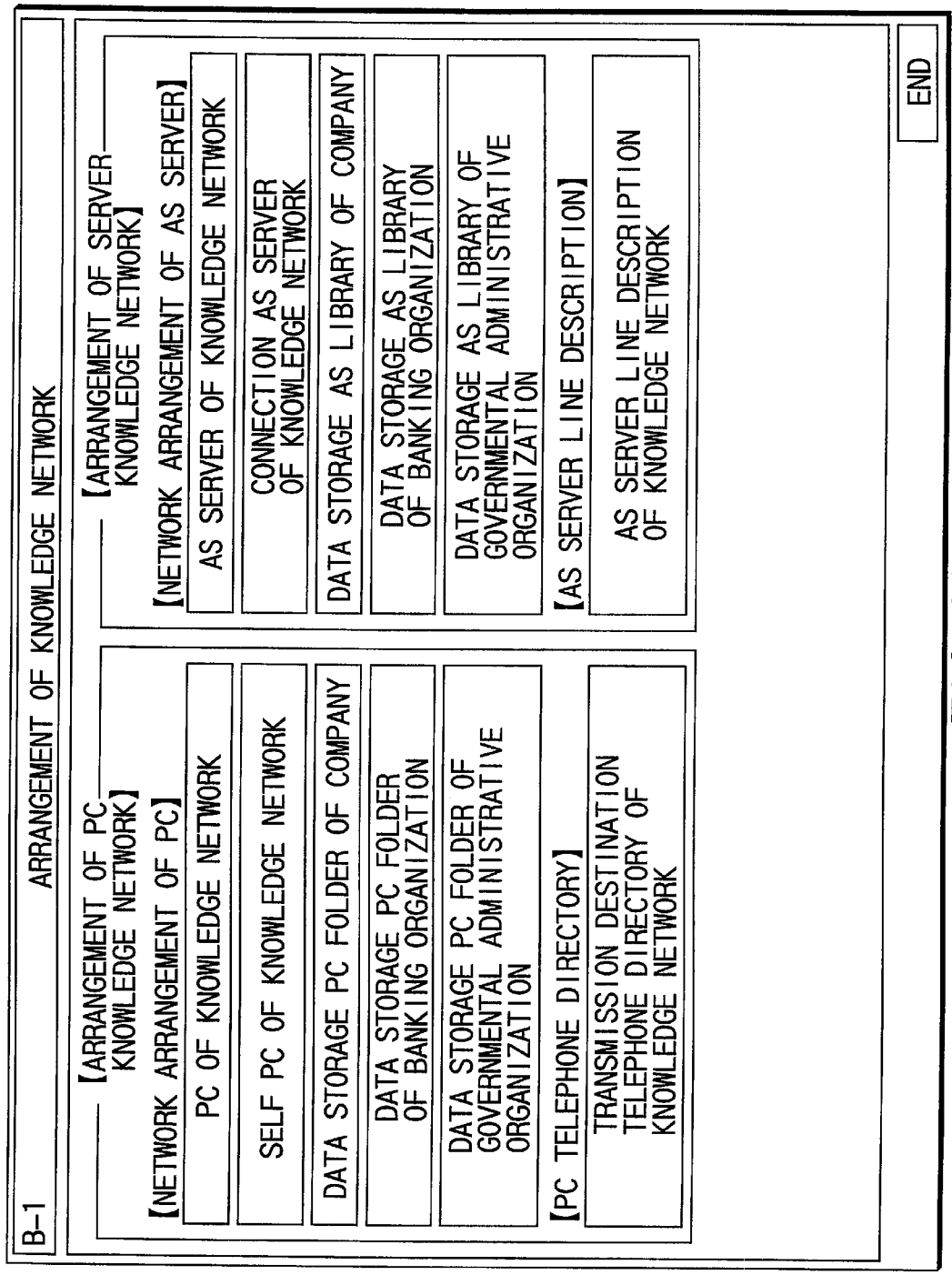
FIG. 22 is a view showing a menu window in use of the apparatus of the present invention.

When the item "configuration of knowledge network" is clicked, the menu window shown in FIG. 22 appears.

This menu window has items "PC of knowledge network", "self PC of knowledge network", "data storage folder of company", "data storage folder of banking organization", "data storage folder of administrative organization", "transmission destination telephone directory of knowledge network", "AS server of knowledge network", "connection AS server of knowledge network", "data storage AS library of company", "data storage AS library of banking organization", "data storage AS library of administrative organization", and "AS server line description of knowledge network". These items are used to specifically register a PC or AS server.

Assume that Kotobuki Shoji Co., Ltd. is present in Tokyo, a sales office of Kotobuki Shoji is present in Fukuoka, and a financial company, Knowledge Finance Co., Ltd. is present in Tokyo. Also assume that a network is constituted between the companies and between the business offices.

FIGS. 23 to 30 show an example in which a personal computer (having the method and apparatus of the present invention) located in the business operation management section of the Tokyo sales administrative division of Kotobuki Shoji forms a network together with a personal computer (having the method and apparatus of the present invention) located in Fukuoka, and a rule of transmission/reception data is to be set.

First, the item "knowledge networking" is clicked on the menu window (FIG. 17), and the item "company" is clicked on the menu window (FIG. 18). The window shown in FIG. 23 appears. In the window shown in FIG. 23, the company code of the company to which the user himself/herself belongs, company name, phonetic transcription of the company name, abbreviation of the company, English name of the company, English abbreviation of the company, postal code, address, building name, telephone number, and FAX number are input.

Next, when the item "PC of knowledge network" is clicked through the menu windows shown in FIGS. 17, 21, and 22, the window shown in FIG. 24 appears. In this window, the computer ID used in the network, computer name, computer country number, computer telephone number, and site of use can be input.

The item "PC of knowledge network" is clicked again through the menu window shown in FIG. 22 to input the computer ID of a communication partner, computer name, computer country number, computer telephone number, and site of use, as shown in FIG. 25.

When the item "data storage PC folder of company" is clicked in the menu window shown in FIG. 22, the data storage folder name in the PC of the business operation management section in Tokyo and data storage folder name in the PC of the Fukuoka office can be specified and input, as shown in FIGS. 26 and 27.

When the item "self PC of knowledge network" is clicked in the menu window shown in FIG. 22, the window shown in FIG. 28 appears, and the self computer ID can be specified. Since this setting operation is being performed in the Tokyo sales administrative division, the computer ID of the business operation management section of the Tokyo sales administrative division is designated as the self PC.

The window returns to the menu window shown in FIG. 19. When the item "PC transmission regulation of general control data" is clicked, the window shown in FIG. 29 appears. In this example, general control data is set as the type of data to be sent from the Tokyo sales administrative division to the Fukuoka office.

In the window shown in FIG. 29, the company code, transmission source computer ID, transmission source folder name, business processing window name, organization composition number of transmission data, organization code of transmission data, transmission destination computer ID, and transmission destination folder name are displayed. When the scroll button for business processing windows is clicked, items of general control data appear. In the example shown in FIG. 29, an item "general control of sales price of merchandise of organization" is displayed. In this window, the timing and method of transmitting the set general control data can also be specified.

Data representing a specific type of merchandise and its price are input next. When the item "general control of sales price of merchandise of organization" is clicked in this window, various types of merchandise handled and their current sales prices are displayed as a table, although none are illustrated. A changed sales price of a desired type of merchandise can be input.

The window returns to the menu window shown in FIG. 19. When the item "PC reception regulation of organization data" is clicked in the menu window, the window shown in FIG. 30 appears. In this example, merchandise reception order slips from buyers are set as the type of data to be received from the Fukuoka office by Tokyo sales administrative division.

In the menu window shown in FIG. 30, the company code, transmission source computer ID, transmission source folder name, business processing window name, organization composition number of reception data, organization code of reception data, receiving-side computer ID, and receiving-side folder name are displayed. When the scroll button for business processing windows is clicked, items of merchandise order reception slips from buyers are displayed. In the example shown in FIG. 30, an item "merchandise order reception slip from buyer" is being displayed. In this window, the timing of reception of the set reception data can be specified.

A specific customer and a specific merchandise order reception slip that is to be received from this customer are input next. When the item "merchandise order reception slip from buyer" is clicked in this window, buyer names handled and merchandise order reception slips are displayed as a table, although none are shown. The order reception slip of a desired type of merchandise can be input.

FIGS. 31 to 38 show the PC environment setting procedure of the Fukuoka office for which an environment is to be set.

First, the item "knowledge networking" is clicked in the menu window (FIG. 17), and then, the item "company" is clicked in the menu window (FIG. 18). The window shown in FIG. 31 appears. In the window shown in FIG. 31, the company code of the company to which the user himself/herself belongs, company name, phonetic transcription of the company name, abbreviation of the company, English name of the company, English abbreviation of the company, postal code, address, building name, telephone number, and FAX number are input.

Next, when the item "PC of knowledge network" is clicked through the menu windows shown in FIGS. 17, 21, and 22, the window shown in FIG. 32 appears. In this window, the computer ID used in the network, computer name, computer country number, computer telephone number, and site of use can be input.

The item "PC of knowledge network" is clicked again through the menu window shown in FIG. 22 to input the computer ID of a communication partner, computer name, computer country number, computer telephone number, and site of use, as shown in FIG. 33. In this case, the computer in the Tokyo sales administrative division is set.

When the item "data storage PC folder of company" is clicked in the menu window shown in FIG. 22, the data storage folder name in the PC of the Fukuoka office and data storage folder name in the PC of the Tokyo business operation management section can be specified and input, as shown in FIGS. 34 and 35.

When the item "self PC of knowledge network" is clicked in the menu window shown in FIG. 22, the window shown in FIG. 36 appears, and the self computer ID can be specified. Since this setting operation is being performed in the Fukuoka office, the computer ID of the Fukuoka office is designated as the self PC.

The window returns to the menu window shown in FIG. 19. When the item "PC reception regulation of general control data" is clicked, the window shown in FIG. 37 appears. In this example, general control data of merchandise sales prices of the organization, which is sent from the Tokyo sales administrative division, is set.

In the window shown in FIG. 37, the company code, transmission source computer ID, transmission source folder name, business processing window name, organization composition number of reception data, organization code of reception data, receiving-side computer ID, and receiving-side folder name are displayed. When the scroll button for business processing windows is clicked, items of general control data appear. In the example shown in FIG. 37, an item "general control of sales price of merchandises of organization" is displayed. In this window, the timing and method of receiving the set general control data can also be specified.

A specific type of merchandise whose control data is to be received is set next. When the item "general control of sales price of merchandises of organization" is clicked in this window, various types of merchandise handled and their current sales prices are displayed as a table, although none are illustrated. A changed sales price of a desired type of merchandise can be input.

The window returns to the menu window shown in FIG. 19. When the item "PC transmission of organization data" is clicked in the menu window, the window shown in FIG. 38 appears. In this example, merchandise reception order slips from buyers are set as the type of data to be transmitted from the Fukuoka office to the Tokyo sales administrative division.

In the menu window shown in FIG. 38, the company code, transmission source computer ID, transmission source folder name, business processing window name, organization composition number of transmission data, organization code of transmission data, transmission destination computer ID, and transmission destination folder name are displayed. When the scroll button for business processing windows is clicked, items of merchandise order reception slips from buyers are displayed. In the example shown in FIG. 38, an item "merchandise order reception slip from buyer" is being displayed. In this window, the timing of transmission of the set transmission data can be specified.

A specific customer and a specific merchandise order reception slip that is to be received from this customer are input next. When the item "merchandise order reception slip from buyer" is clicked in this window, buyer names handled and merchandise order reception slips are displayed as a table, although none are shown. The order reception slip of a desired type of merchandise can be input.

When "all" is designated as data of "general control of sales prices of merchandise of organization" to be transmitted from the Tokyo sales administrative division to the Fukuoka office, sales price information of all merchandise can be transmitted. On the other hand, when "all" is designated as data of "general control of sales prices of merchandise of organization" to be received by the Fukuoka office, sales price information of all merchandise can be received.

Also, when "all" is designated as data of "merchandise order reception slip from buyer" to be transmitted from the Fukuoka office to the Tokyo sales administrative division, all merchandise order reception slips can be transmitted. On the other hand, when "all" is designated as data of "merchandise order reception slip from buyer" to be received by the Tokyo sales administrative division, all merchandise order reception slips to be sent can be received.

The apparatus of the present invention also has a function of allowing communication with Knowledge Finance to make an application for financing.

FIGS. 39 to 46 are views showing a procedure of setting an environment such that Kotobuki Shoji can make an application for financing to Knowledge Finance.

FIGS. 47 to 54 are views showing a procedure of setting an environment such that Knowledge Finance can receive an application of financing from Kotobuki Shoji.

First, the item "knowledge networking" is clicked on the menu window (FIG. 17), and the item "company" is clicked on the menu window (FIG. 18). The window shown in FIG. 39 appears. In the window shown in FIG. 39, the company code of the company (given company to which the user belongs) to which the user himself/herself belongs, company name, phonetic transcription of the company name, abbreviation of the company, English name of the company, English abbreviation of the company, postal code, address, building name, telephone number, and FAX number are input.

When the item "company" is clicked again on the menu window (FIG. 18), the window shown in FIG. 40 appears. In the window shown in FIG. 40, the company code of Knowledge Finance (other company), company name, phonetic transcription of the company name, abbreviation of the company, English name of the company, English abbreviation of the company, postal code, address, building name, telephone number, and FAX number are input.

Next, when the item "PC of knowledge network" is clicked through the menu windows shown in FIGS. 17, 21, and 22, the window shown in FIG. 41 appears. In this window, the computer ID used in the network, computer name, computer country number, computer telephone number, and site of use can be input. In this case, a computer in the financing department of the Tokyo sales administrative division is used for Knowledge Finance.

The item "PC of knowledge network" is clicked again through the menu window shown in FIG. 22 to input the computer ID of a communication partner, computer name, computer country number, computer telephone number, and site of use, as shown in FIG. 42. In this case, a computer of the financing department of Knowledge Finance is designated.

When the item "data storage PC folder of company" is clicked through the menu window shown in FIG. 22, the data storage folder name in the PC of the Tokyo sales administrative division of Kotobuki Shoji and data storage folder name in the PC of the financing department of Knowledge Finance can be specified and input, as shown in FIGS. 43 and 44.

When the item "self PC of knowledge network" is clicked through the menu window shown in FIG. 22, the window shown in FIG. 45 appears, and the self computer ID can be specified. Since this environment setting operation is being performed in the Tokyo sales administrative division, the computer ID of the Tokyo sales administrative division is designated as the self PC. Next, the window returns to the menu window shown in FIG. 19. When the item "PC external transmission regulation of slip data" is clicked, the window shown in FIG. 46 appears. In this example, a financing application slip to be sent from the Tokyo sales administrative division to Knowledge Finance is set.

In the window shown in FIG. 46, the company code, transmission source computer ID, transmission source folder name, business processing window name, organization composition number of transmission data, organization code of transmission data, transmission destination computer ID, and transmission destination folder name are displayed. When the scroll button for business processing windows is clicked, items of financing application slips appear. In the example shown in FIG. 46, an item "Knowledge Finance application slip" is displayed. In this window, the timing and method of transmitting the set slip data can also be specified.

One of a plurality of Knowledge Finance application slips is designated next. When the item "Knowledge Finance application slip" is clicked in this window, a plurality of slips handled are displayed as a table, although none are illustrated. A desired slip can be selected by designating, e.g., the slip code.

On the other hand, the following environment setting is performed in Knowledge Finance.

First, the item "knowledge networking" is clicked on the menu window (FIG. 17), and the item "company" is clicked on the menu window (FIG. 18). The window shown in FIG. 47 appears. In the window shown in FIG. 47, the company code of the company (given company to which the user belongs) to which the user himself/herself belongs, company name, phonetic transcription of the company name, abbreviation of the company, English name of the company, English abbreviation of the company, postal code, address, building name, telephone number, and FAX number are input.

Figure 48:
FIG. 48 is a view showing an application window in use of the apparatus of the present invention.

When the item "company" is clicked again on the menu window (FIG. 18), the window shown in FIG. 48 appears. In the window shown in FIG. 48, the company code of Kotobuki Shoji (other company), company name, phonetic transcription of the company name, abbreviation of the company, English name of the company, English abbreviation of the company, postal code, address, building name, telephone number, and FAX number are input.

Next, when the item "PC of knowledge network" is clicked through the menu windows shown in FIGS. 17, 21, and 22, the window shown in FIG. 49 appears. In this window, the computer ID used in the network, computer name, computer country number, computer telephone number, and site of use can be input. In this case, a computer in the financing department of Knowledge Finance is used for the Tokyo sales administrative division of Kotobuki Shoji.

The item "PC of knowledge network" is clicked again through the menu window shown in FIG. 22 to input the computer ID of a communication partner, computer name, computer country number, computer telephone number, and site of use, as shown in FIG. 50. In this case, a computer of the financing department of the Tokyo sales administrative division is designated.

When the item "data storage PC folder of company" is clicked through the menu window shown in FIG. 22, the data storage folder name in the PC of the financing division of Knowledge Finance and data storage folder name in the PC of the Tokyo sales administrative division of Kotobuki Shoji can be specified and input, as shown in FIGS. 51 and 52.

When the item "self PC of knowledge network" is clicked through the menu window shown in FIG. 22, the window shown in FIG. 53 appears, and the self computer ID can be specified. Since this environment setting operation is being performed in Knowledge Finance, the computer ID of Knowledge Finance is designated as the self PC.

Next, the window returns to the menu window shown in FIG. 19. When the item "PC external reception regulation of slip data" is clicked, the window shown in FIG. 54 appears. In this example, a financing application slip to be sent from the Tokyo sales administrative division to Knowledge Finance is set.

Figure 54:
FIG. 54 is a view showing an application window in use of the apparatus of the present invention.

In the window shown in FIG. 54, the company code, transmission source computer ID, transmission source folder name, business processing window name, organization composition number of reception data, organization code of reception data, receiving-side computer ID, and receiving-side folder name are displayed. When the scroll button for business processing windows is clicked, items of financing application slips appear. In the example shown in FIG. 54, an item "Knowledge Finance application slip" is displayed. In this window, the timing and method of receiving the set slip data can also be specified.

When a plurality of Knowledge Finance application slips are present, one of them is designated next. When the item "Knowledge Finance application slip" is clicked in this window, a plurality of slips handled are displayed as a table, although none are illustrated. A desired slip can be selected by designating, e.g., the slip code.

In the above description, the transmission and reception regulations are set. To set slip, book, knowledge data to be transmitted or received, a format including the identification code of a slip or book stored in the self data group storage portion is set in the reception data group storage portion or transmission data group storage portion. When a slip or book having the same identification code as the set identification code is transmitted, the slip or book is received.

The above apparatus has a function of preparing various types of knowledge tables (tables of merchandise order reception slips from buyers, tables of particulars of order reception slips from buyers, tables of merchandise sales collection slips from buyers, tables of merchandise order slips to merchandise vendors, tables of particulars of merchandise order slips to merchandise vendors, tables of payment slips to merchandise vendors, and the like). These tables are used to intelligently assist the user.

FIGS. 55A to 60D show representative tables. Such tables are prepared in the reception data portion, self data portion, and transmission data portion (FIG. 13). FIGS. 55A to 60B show tables prepared in the self data portion.

Figure 55C:
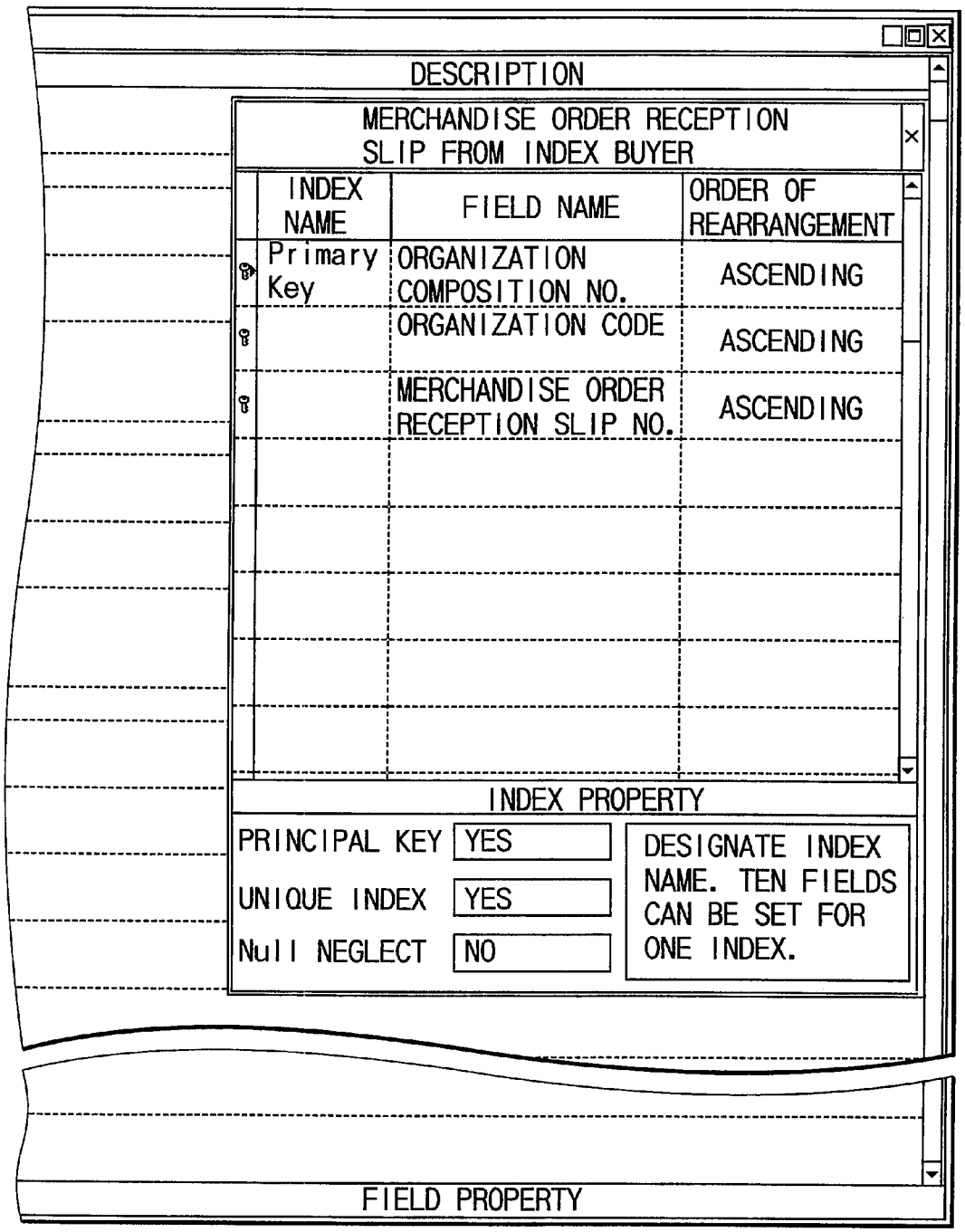
Figure 57D:
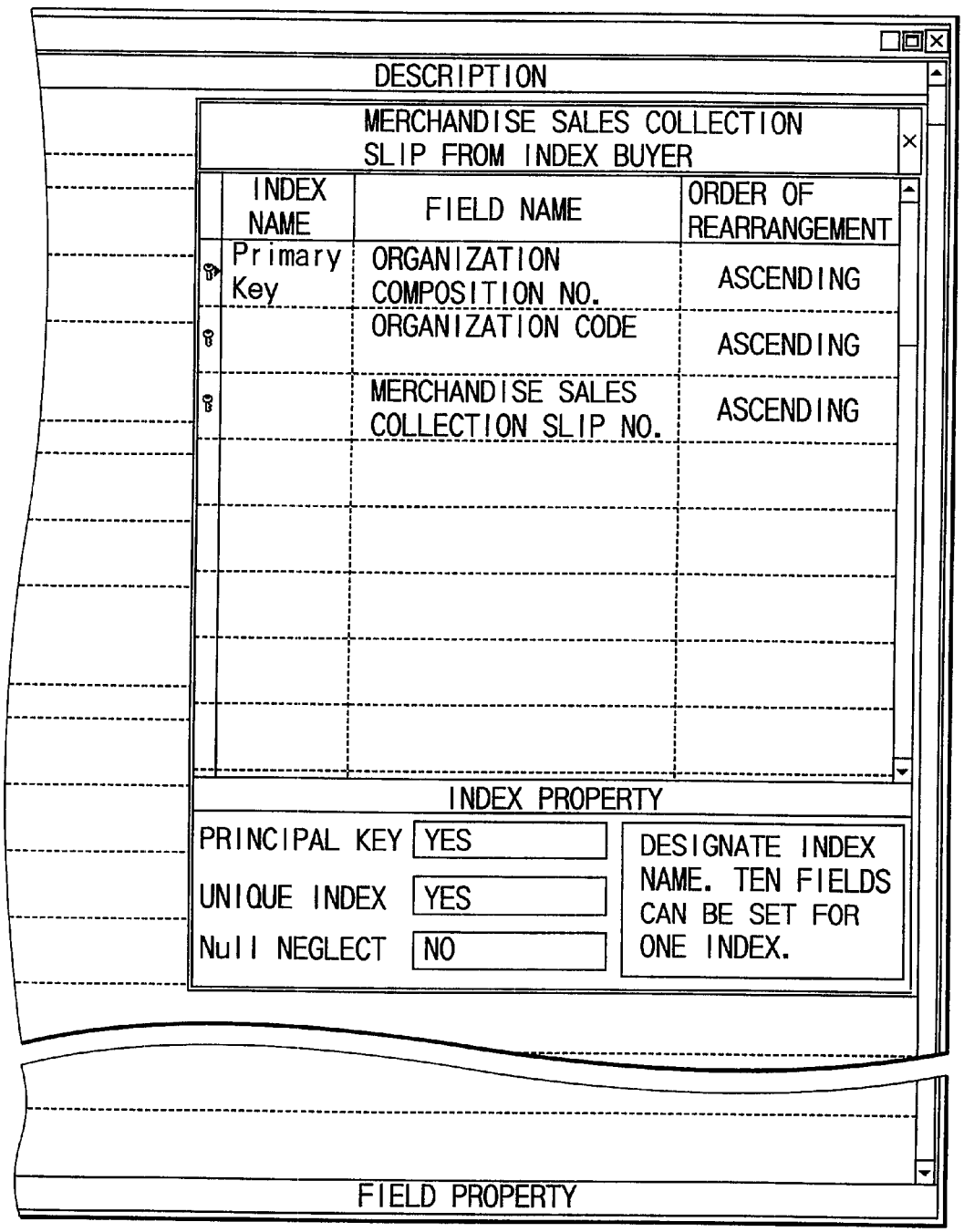

FIGS. 55A to 55C show the table of merchandise order reception slips from buyers. In this table, the composition numbers of organizations that have received orders, identification codes of organizations that have received orders, merchandise order reception slip numbers, dates of order reception, identification codes of customers, and the like are collected, as shown in FIGS. 55A to 55C. FIGS. 56A and 56B show the table of particulars of merchandise order reception slips from buyers. In this table, the composition numbers of order reception organizations, identification codes of order reception organizations, and the like are collected.

When an organization composition number, organization code, and merchandise order reception slip number to be specified are input to the index property window at the upper right of the window shown in FIGS. 55A to 55C, the date of order reception of the merchandise order reception slip of the organization, and the like are displayed in the columns of data types of the respective items shown in FIGS. 55A to 55C as detailed descriptive expressions and numerical values. When an organization composition number, organization code, merchandise order reception slip number, and particulars line order number to be specified are input to the index property window at the upper right of the window shown in FIGS. 56A and 56B, details such as the merchandise code described in the specified merchandise order reception slip of the organization are displayed in the columns of data types of the respective items shown in FIGS. 56A and 56B as numerical values and the like.

Such a table can be displayed by clicking and selecting a table name in a table menu (not shown) displayed.

FIGS. 57A to 57D show the table of merchandise sales collection slips from buyers, which is prepared in correspondence with the table of merchandise order reception slips from buyers (FIGS. 55A to 55C) and table of order reception slip particulars (FIGS. 56A and 56B).

In this table, the composition numbers of collection organizations, identification codes of organizations, merchandise sales collection slip numbers of organizations, dates of collection, and the like are collected. In addition, items such as the identification codes of buyers from which sales are to be collected, the composition numbers of organizations of buyers from which sales are to be collected, identification numbers, identification codes of organizations, and the like are collected. The numbers of estimate slips and reservation slips generated in the past are also displayed. To see specific data, an organization composition number, organization code, and merchandise sales collection slip number to be specified are input to the index property at the upper right of the window. Detailed numerical values and the like are displayed in the columns of data types of the respective items.

Figure 58C:
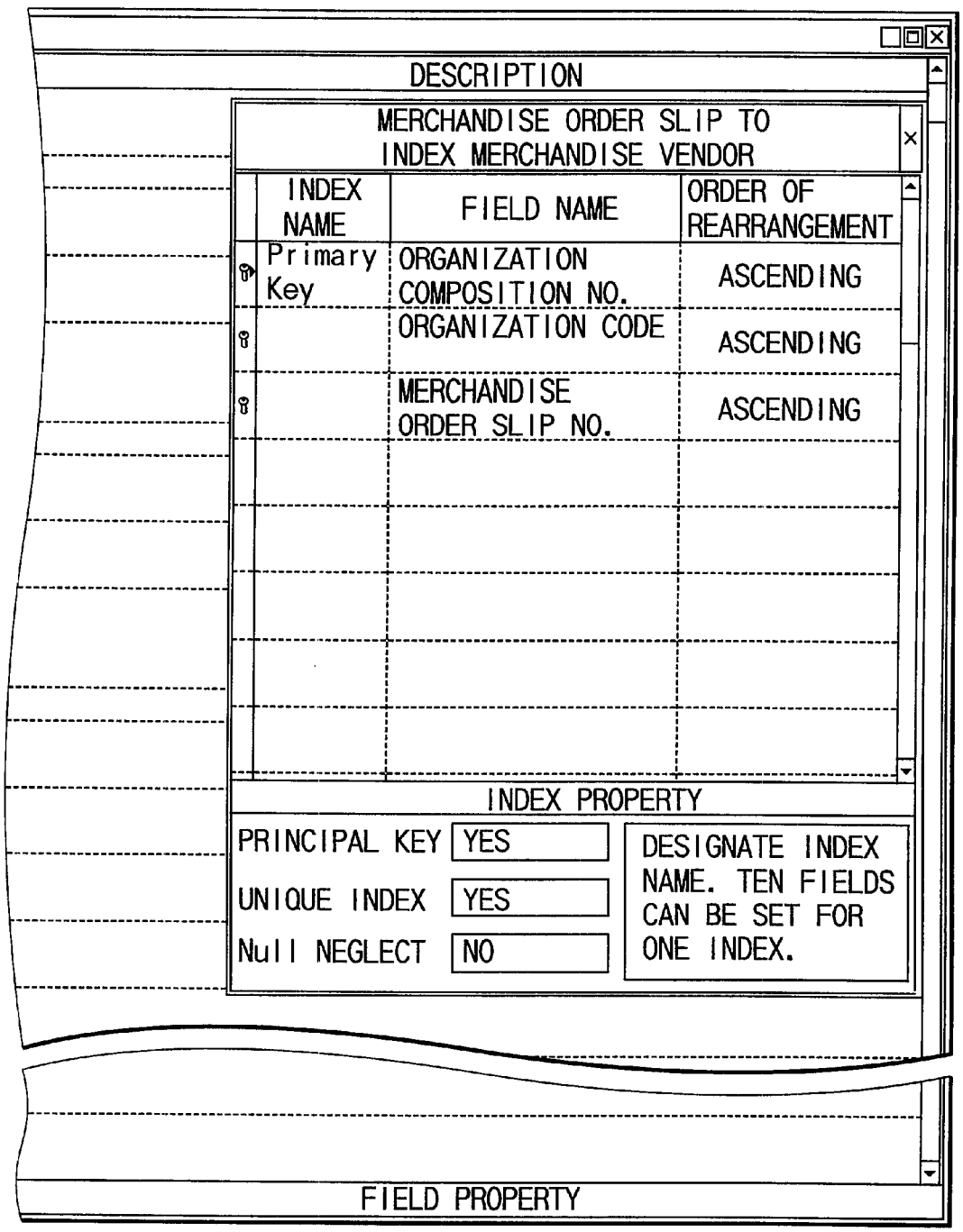
Figure 60D:
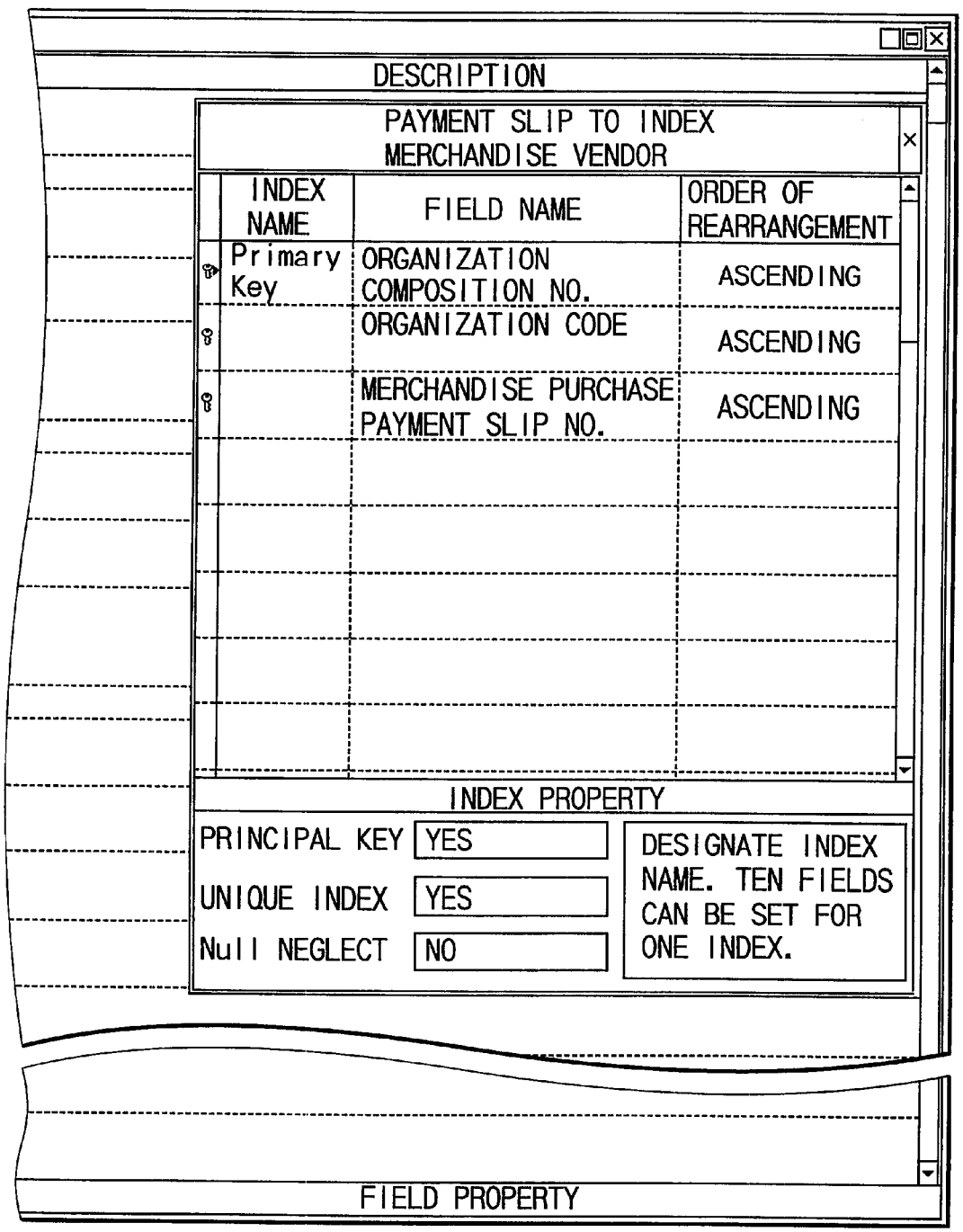

FIGS. 58A to 58C show the table of merchandise order slips to merchandise vendors. In this table, the composition numbers of organizations that have made orders, identification codes of organizations that have made orders, merchandise order slip numbers, dates of order, and the like are collected, as shown in FIGS. 58A to 58C. FIGS. 59A and 59B show the table of particulars of merchandise order slips to merchandise vendors. In this table, the composition numbers of ordering organizations, identification codes of ordering organizations, and the like are collected.

When an organization composition number, organization code, and merchandise order slip number to be specified are input to the index property window at the upper right of the window shown in FIGS. 58A to 58C, the order date of the merchandise order slip of the organization, and the like are displayed in the columns of data types of the respective items shown in FIGS. 58A to 58C as detailed descriptive expressions and numerical values. When an organization composition number, organization code, merchandise order slip number, and particulars line order number to be specified are input to the index property window at the upper right of the window shown in FIGS. 59A and 59B, details such as the merchandise code described in the specified merchandise order slip of the organization are displayed in the columns of data types of the respective items shown in FIGS. 59A and 59B as numerical values and the like.

FIGS. 60A to 60D show the table of payment slips to merchandise vendors. In this table, the composition numbers of organizations as parties concerned, identification codes of organizations, merchandise purchase payment slip numbers of organizations, dates of payment, and the like are collected. In addition, items such as the identification codes, organization composition numbers, and organization identification codes of merchandise vendors as payees are also collected, as shown in FIGS. 60A to 60D. The numbers of merchandise reservation slips and merchandise order slips issued in the past are also displayed. To see specific data, an organization composition number, organization code, and merchandise vendor payment slip number to be specified are input to the index property at the upper right of the window. Detailed numerical values and the like are displayed in the columns of data types of the respective items.

Each table can be displayed by clicking and selecting a table name in the window of a table menu (not shown) displayed. Display and selection of a table are achieved by a knowledge processing application.

With the above-described data structures and functions (transmission/reception), this apparatus can flexibly utilize data in a variety of applications. Examples of utilization will be described below.

Figure 61:
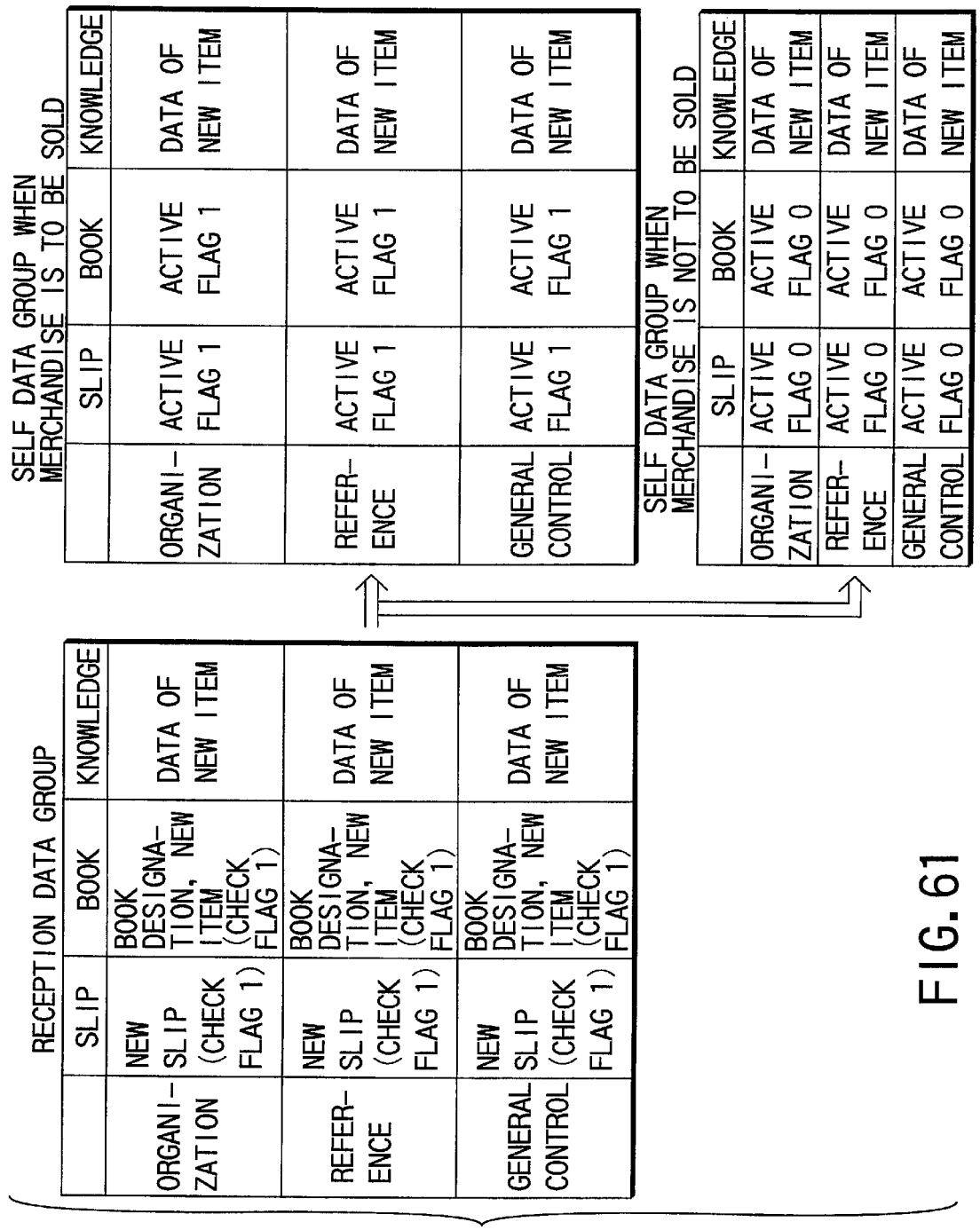
FIG. 61 is a view showing a use example of the data structure of the present invention.

[Case 1] A case wherein new sales merchandise is produced, and the head office notifies a branch of it (FIG. 61).

In this case, slips stored in the columns of organization/slip, reference/slip, and general control/slip of the reception data group storage portion 311 and books stored in the columns of organization/book, reference/book, and general control/book, which are to be used, are sent with, e.g., check flag "1". At the same time, specific data (merchandise code, vendor information, price information, information representing sales period, and attached memo information) associated with the new merchandise are sent. The slips are sent as slips having new codes.

On the transmitting side, items of the new slips and books are generated on the basis of the formats shown in FIG. 15, and necessary item data are input as knowledge data. This processing is realized by displaying a slip or book window selected from various setting windows and inputting data to the respective items by the user. When the prepared slips and books are to be designated as a transmission data group, an identification code representing "all" (i.e., organization, reference, and general control) is set in the slips and books. Processing on the receiving side presupposes new information reception setting because information of merchandise which has not been handled yet has arrived. New information reception setting can be realized by setting an organization from which information is to be received and an item "new information reception" in the business processing window. Information transmitted from an unset organization can be neglected. More specifically, for new sales merchandise, the receiving side can perform new information reception setting such that pieces of information associated with the new merchandise can be received as a reception data group. To do this, an item "new information" is prepared in setting the reception regulation, as described above. The knowledge processing application confirms the presence of the new merchandise with reference to the check flag of the newly received data. Since the check flag "1" is set in the column of reference, the knowledge processing application recognizes transmission of new information.

The user must confirm whether the branch is forced to sell the new merchandise or he/she can freely decide to or not to sell the merchandise, on the basis of the other data in the column of general control/knowledge. For this purpose, the knowledge processing application detects the check flag and temporarily stores a title "addition of new sales merchandise" in the reception information confirmation table in the column of knowledge to cause the user to decide whether the branch sells the merchandise. This is because there may be other matters transmitted and requiring user's determination. When the user performs operation for displaying the reception information confirmation table, a list of matters requiring user's determination is displayed.

When the user clicks the title "addition of new sales merchandise" to open the next layer, the merchandise name, merchandise code, sales price, sales period, and attached memo information associated with the merchandise, which are transmitted, are displayed. When the user decides to sell the merchandise in his shop, or the instruction by memo information from the head office is an forced instruction, active flags "1" representing use are added to the merchandise items in the columns of organization/slip, reference/slip, and general control/slip, and organization/book, reference/book, and general control/book of the self data group. In addition, data (new item data sent) corresponding to the items of the active slips and books are transferred and stored in the columns of organization/knowledge, reference/knowledge, and general control/knowledge of the self data group. When storage is ended, the reception data is stored in the reception log data group storage portion as a reception log data group together with the date and time, and the reception data group is reset. More specifically, the check flag "1" is returned to "0", and the sent knowledge data is erased. When the attached memo information gives the shop a free hand in deciding sales of the merchandise, and the user decides not to sell the merchandise, he/she operates a key for "no sales (neglect)". The active flag representing use and added to the merchandise items in the columns of organization/slip, reference/slip, and general control/slip, and organization/book, reference/book, and general control/book of the self data group is maintained at "0". However, data (new knowledge data sent) corresponding to the items of the slips and books are stored in the columns of organization/knowledge, reference/knowledge, and general control/knowledge of the reception data group and self data group.

As described above, when an unregistered slip or sales merchandise, and its books or knowledge data are transmitted, new slips or books with the check flag "1" in the columns of organization, reference, and general control are transmitted.

When an instruction for changing the sales period or price of merchandise which has already been registered in the column of reference is sent, corresponding slip or book items in the column of general control are sent with the check flag "1" (this case will be described later). When a slip or book is already present in the column of reference, and information of items of the slip or book simply associated with sales or transaction quantity is received, check flags are added to the items of the slip or book data in the column of organization of the reception data group.

Figure 62:
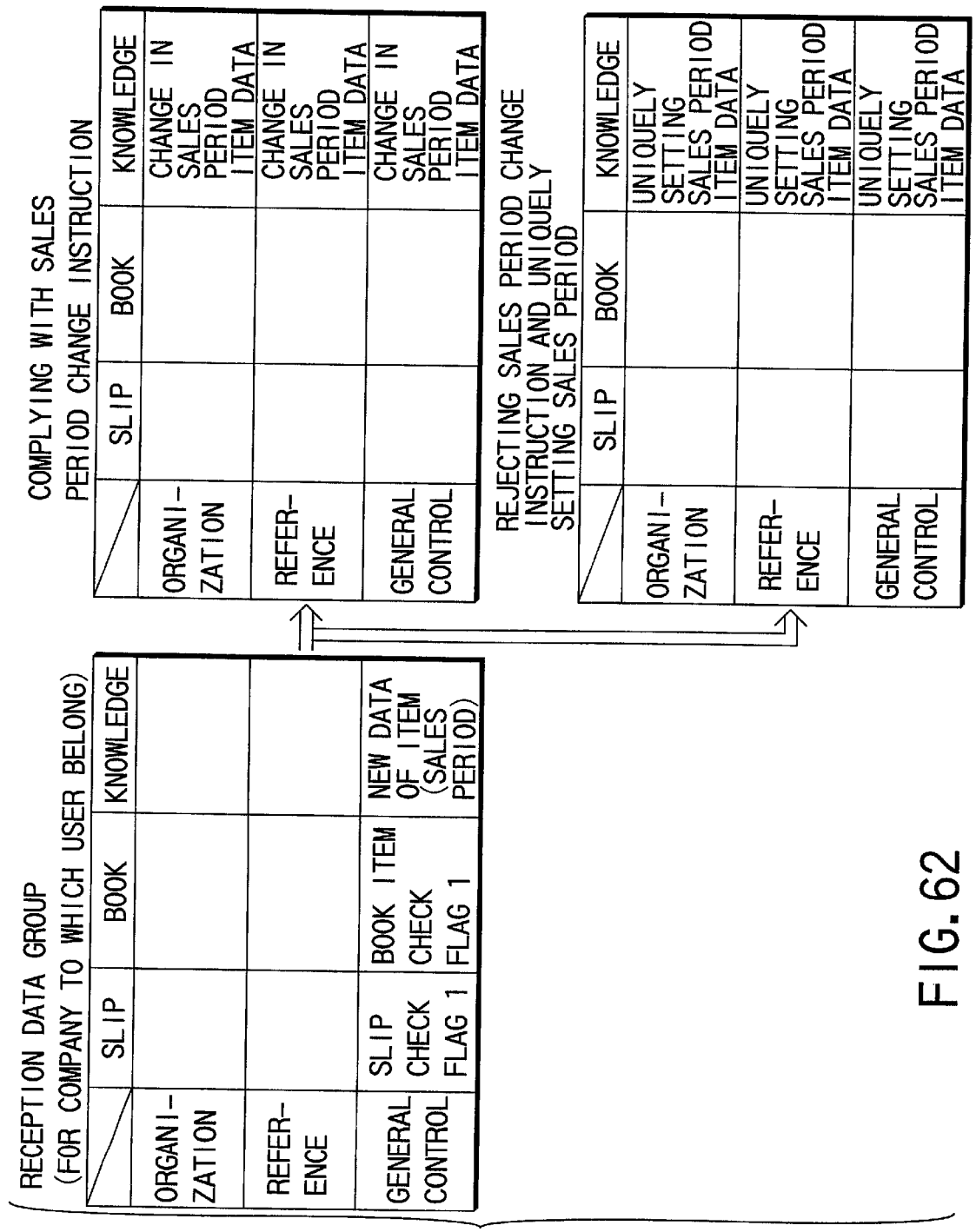
FIG. 62 is a view showing a use example of the data structure of the present invention.

[Case 2] A case wherein the merchandise is sold by the shop, and the head office transmits a change in sales period of the merchandise to the branch (FIG. 62).

Information representing the sales period change is transmitted to the reception data group 311 in the following manner. The check flags "1" are added to the items of slips in the column of general control/slip and books in the column of general control/book of the corresponding merchandise. The data and memo information of the new sales period corresponding to the sales merchandise are transmitted as part of data in the data group X3Y3 in the column of general control/knowledge of the reception data group. Transmission of the check flag "1" to only items in the columns of general control/slip and general control/book means that information of a certain change, correction, or alteration is sent.

In this case, the knowledge processing application detects the check flag and temporarily stores a title "sales period change instruction" added with a number in the reception information confirmation table in the column of knowledge of the reception data group to cause the user to determine whether the sales period of the merchandise can be changed. This is because there may be other matters transmitted and requiring user's determination. When the user performs operation for displaying the reception information confirmation table, a list of matters requiring user's determination is displayed.

When the user requests the reception information confirmation table, the reception information confirmation table contained in the knowledge table shown in FIG. 15 is displayed. This table has an item "sales period change instruction". This item includes the date of reception, merchandise code, and new sales period.

To confirm the current state of the merchandise on the screen, the user can confirm the order reception state and sales collection state by extracting tables as shown in FIGS. 55A to 60D from the column of knowledge of the self data group and displaying them. The user can also confirm the order state of the merchandise.

When the information in the knowledge table is confirmed, the user can determine whether the sales period can be changed in accordance with the unique state, i.e., the current transaction state (only when the memo information gives the user a free hand in changing the sales period). For example, when there are appropriate purchase orders and orders received, and purchase and delivery will be completed within the instructed sales period, the user can decide to change the sales period. However, if there are many purchase orders and orders received, and purchase and delivery will not be completed within the instructed sales period, the user can cancel the change to maintain the current state or set a unique sales period.

When the user decides to change the sales period, he/she operates a key "OK" to rewrite the sales period data in items, corresponding to the merchandise, in the columns of organization/knowledge, reference/knowledge, and general control/knowledge of the self data group. Information before the change is stored in the self log data group storage portion 302 in the form before the change. In the reception data group, the check flags of the items, corresponding to the merchandise, in the columns of general control/slip and general control/book are returned to "0", and the sales period data in the column of general control/knowledge is cleared. The past sales period data is stored in the reception log data group storage portion 312 as a reception log. Setting a unique sales period is also stored as a reception log.

When a unique sales period is set, sales period information before setting is stored in the column of organization/knowledge of the self log data group storage portion 302 as knowledge data. However, the transmitted reference sales period information is stored in the columns of reference/knowledge and general control/knowledge as knowledge data. In this case, the sales period information in the columns of reference and general control and that in the column of organization have different contents.

Figure 63:
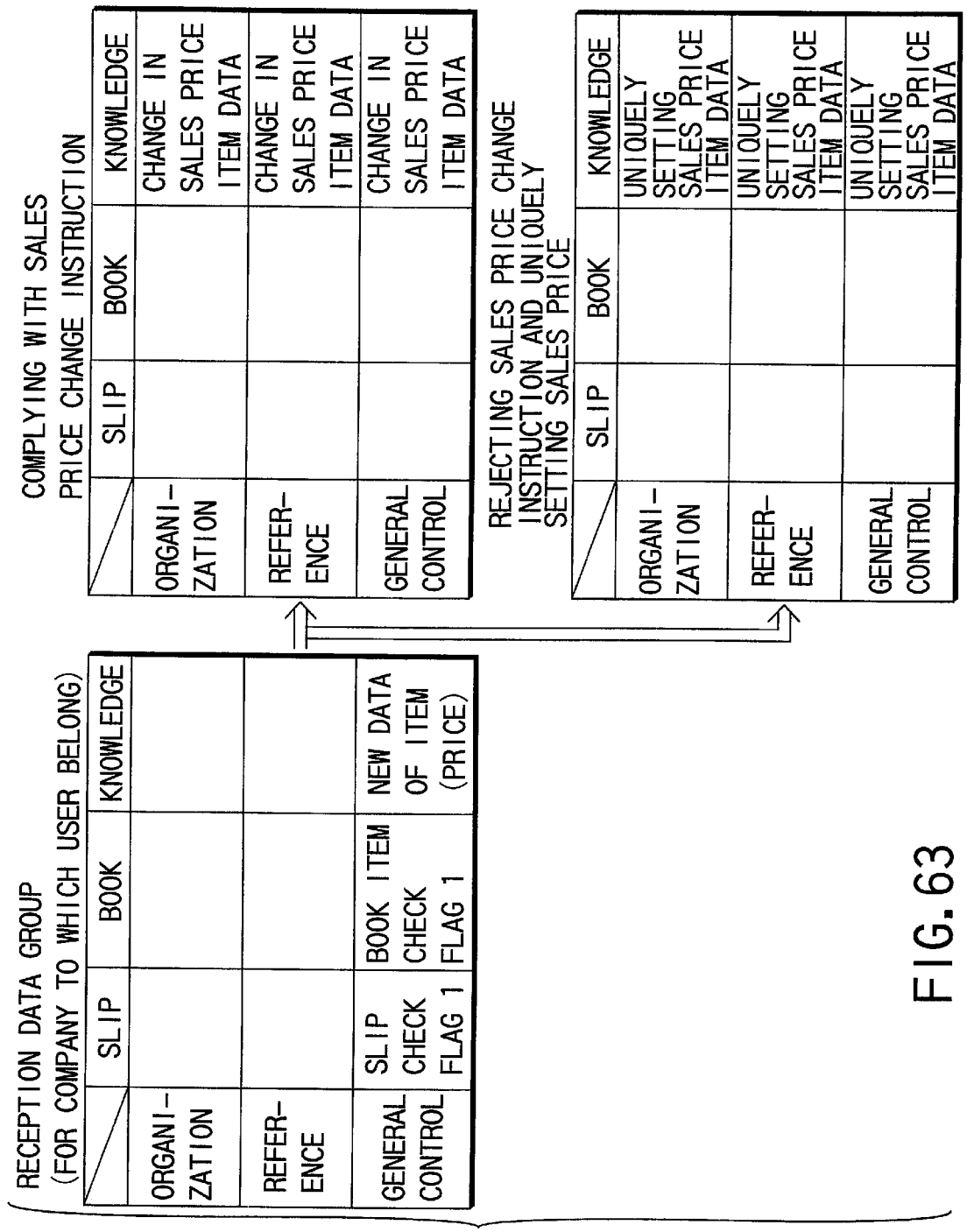
FIG. 63 is a view showing a use example of the data structure of the present invention.

[Case 3] A case wherein the head office transmits a change in sales price of the merchandise to the branch (FIG. 63).

Information representing the sales price change is transmitted to the reception data group 311 in the following manner. The check flags "1" are added to portions associated with the merchandise in the columns of general control/slip and general control/book of the reception data group. Data of the new sales price corresponding to the merchandise is transmitted as part of data in the data group X3Y3 in the column of general control/knowledge of the reception data group. Transmission of the check flag to slips and books in only the columns of general control/slip and general control/book of the reception data group means that information of a certain change, correction, or alteration is sent.

In this case, the knowledge processing application detects the check flag "1" and temporarily stores a title "sales price change instruction" added with a number in the reception information confirmation table in the column of general control/knowledge of the reception data group to cause the user to determine whether the sales price of the merchandise can be changed. This is because there may be other matters transmitted and requiring user's determination. When the user performs operation for displaying the reception information confirmation table, a list of matters requiring user's determination is displayed.

When the user requests the reception information confirmation table, the reception information confirmation table contained in the knowledge table shown in FIG. 15 is displayed. This table has an item "sales price change instruction". This item includes the date of reception, merchandise code, and new sales price.

To confirm the current state of the merchandise on the screen, the user can confirm the order reception state and sales collection state by extracting tables as shown in FIGS. 55A to 60D from the self data group and displaying them. The user can also confirm the order state of the merchandise.

When the information in the knowledge table is confirmed, the user can determine whether the sales price can be changed in accordance with the unique state, i.e., the current transaction state (only when the memo information gives the user a free hand in changing the sales price).

[Instruction of Reducing Price] . . . 1

For example, when there are many orders received from customers who agree to the sales price, the price need not be reduced. In this case, the current price may be maintained within the quantity of current order reception. Sales price change processing is unnecessary, and the user operates a key for "no change". The check flags of items of slips and books corresponding to the merchandise in the columns of general control of the reception data group are returned to "1", and knowledge data (information of the received sales price, date of reception and the like) are stored in the reception log data group storage portion 312 as reception log. The contents of knowledge data of the merchandise in the self data group are kept unchanged.

[Instruction of Reducing Price] . . . 2

For example, when there are few orders received from customers and a large quantity of stocked merchandise, the sales price need be reduced. The user operates a key for "OK". Data of items of the sales price currently set for the merchandise are changed to those corresponding to the new sales price.

In the self data group, knowledge data (sales price, date of change, and the like) in the columns of knowledge corresponding to the merchandise are rewritten. Information before the change is stored in the self log data group storage portion 302 in the form before the change. In the reception data group, the check flags of items of slips and books corresponding to the merchandise in the columns of general control are returned to the initial state, and knowledge data are stored in the reception log data group storage portion 312 as a reception log.

In the above description, when instruction data is sent from the head office to a branch, the branch can uniquely cope with the instruction data.

Processing performed on the side of the head office which sends the instruction data to a branch will be described.

The head office only accesses data in the transmission data group storage portion 321, adds the check flag "1" to corresponding portions in the columns of general control/slip and general control/book for the merchandise, inputs information (merchandise code, sales period, and sales price) associated with the merchandise as knowledge data in the column of general control/knowledge, and then sets the transmission regulation.

To transmit information associated with new merchandise, as in Case 1, data associated with the new merchandise are input by designating all columns. More specifically, items of slips and books for the new merchandise in the columns of organization/slip and book, reference/slip and book, and general control/slip and book. In addition, knowledge data associated with the merchandise are input to the columns of organization/knowledge, reference/knowledge, and general control/knowledge.

In the knowledge data input mode of the knowledge processing application, the user inputs the knowledge data and then designates organization, reference or general control as the storage positions.

When information associated with general control is to be transmitted, as in Case 2 or 3, the check flags "1" are added to portions associated with the merchandise in the columns of general control/slip and general control/book of the transmission data group, and knowledge data associated with the merchandise are input to the column of general control/knowledge.

When data transmission of the transmission data group is ended, the transmitted data are stored in the transmission log data group as a transmission log. Each column of knowledge has "transmission information confirmation table". Hence, the transmitted items (new sales merchandise addition, sales period change, or sales price change) are also stored in this table together with the date of transmission.

Figure 64:
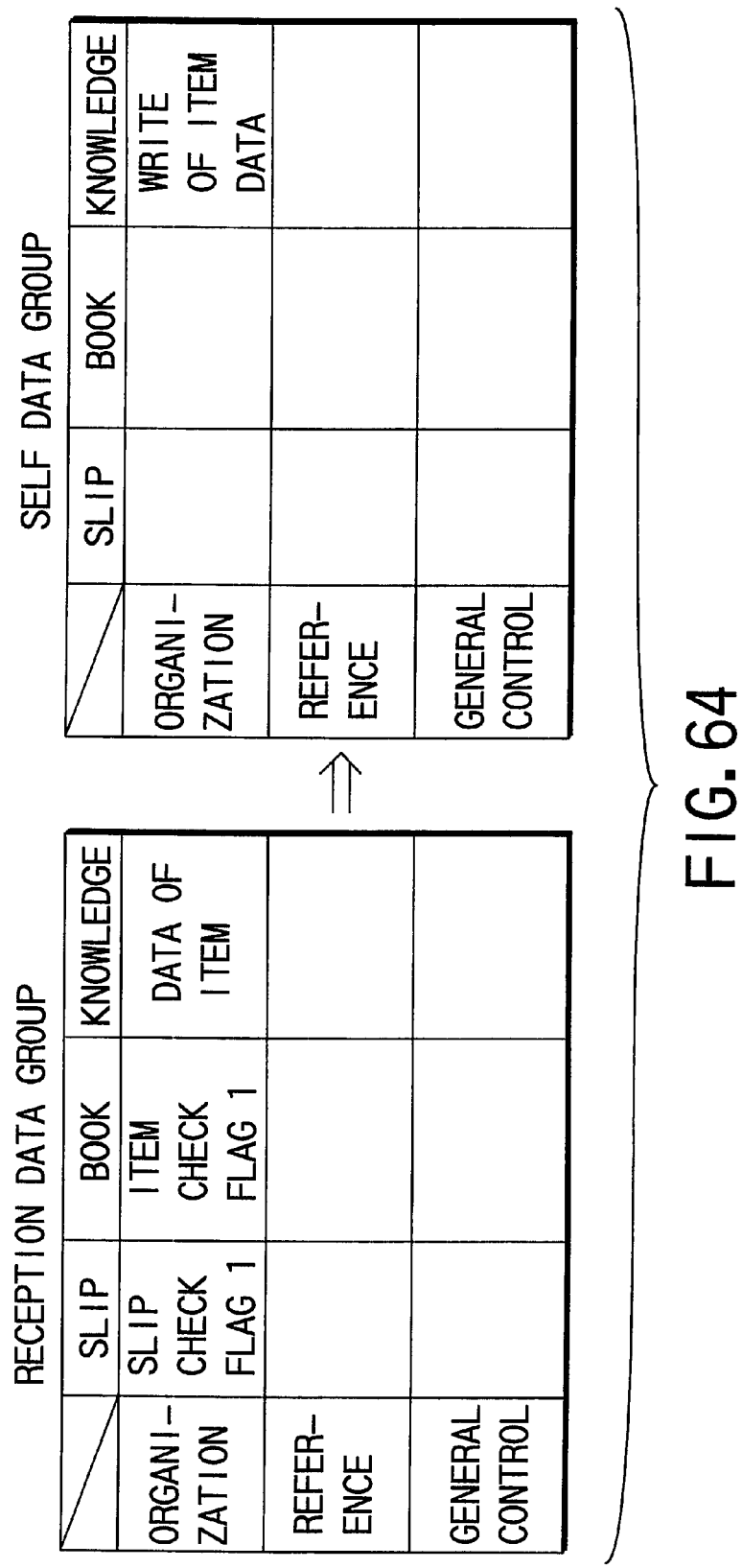
FIG. 64 is a view showing a use example of the data structure of the present invention.

[Case 4] A case wherein a merchandise receipt slip associated with merchandise A is sent from a customer (FIG. 64).

In this case, check flags are added to corresponding items of a receipt slip and books in the columns of organization/slip and organization/book of the other company reception data group storage portion 313, and data as slip contents (customer code, merchandise code, quantity, and the like) are stored in corresponding items in the column of organization/knowledge.

The knowledge processing application detects the check flag and temporarily stores a title "receipt slip reception" added with a number in the reception information confirmation table in the column of organization/knowledge to cause the user to determine whether the receipt slip is correct. This is because there may be other matters transmitted and requiring user's determination. When the user performs operation for displaying the reception information confirmation table, a list of matters requiring user's determination is displayed.

When the user requests the reception information confirmation table, the reception information confirmation table is displayed. This table has an item "merchandise receipt slip reception". This item includes the date of reception, buyer name, merchandise name, and merchandise code.

To confirm the current states of order reception, shipment, and delivery of the merchandise on the screen, the user can confirm the current states by displaying information (knowledge tables) as shown in FIGS. 55A to 60D.

For example, the sales collection slip table shown in FIGS. 56A and 56B can be displayed to open the merchandise reservation slip or merchandise order reception slip. The user can confirm whether the merchandise described in the receipt slip transmitted from the buyer equals that reserved by the buyer or whether the reserved quantity equals the quantity of receipt.

If the merchandise receipt slip has correct contents, the user operates a key for "write OK". The merchandise receipt slip is newly transferred to the merchandise sales collection slip table in the column of knowledge of the self data group as formal information. After this, information associated with the merchandise receipt slip in the reception data group is directly stored in the reception log data group storage portion 314, and the check flag of the slip is returned to the initial state.

When the above confirmation reveals that the contents of the merchandise receipt slip are different from the quantity of merchandise described in the reservation slip or order reception slip, the information of the merchandise receipt slip is temporarily stored in the column of knowledge of the temporary storage portion. In this case, the user can transmit inquiry information to the buyer using the column of general control of the transmission data group. As the transmission method, the merchandise receipt slip transmitted from the buyer and information thereof are transmitted together with memo information.

If the buyer side has described erroneous information in the merchandise receipt slip, the buyer transmits a corrected merchandise receipt slip and its information. If the merchandise receipt slip has correct contents, the user operates the key for "write OK". The corresponding information of the merchandise receipt slip, which is stored in the temporary storage portion, is cleared. The merchandise receipt slip is newly transferred to the merchandise sales collection slip table in the column of knowledge of the self data group as formal information.

When data has arrived at the reception data group from a transmission source that is not set as a reception object, reception of the data is rejected.

As described above, in this system, the cause of an event (e.g., arrival of a billing slip) can be clarified with reference to data collected in the knowledge tables. That is, this system is advantageous in having traceability information.

[Case 5] A case wherein the personnel organization of a branch or the head office is partially altered, and the alteration information is transmitted.

In this case, check flags "1" are transmitted for slips in the column of reference/slip and items in the column of reference/book corresponding to the personnel organization to be altered. In addition, check flags "1" are transmitted for slips in the column of general control/slip and items in the columns of general control/book. Furthermore, new information (disappearance, name change, establishment, consolidation destination, date of alteration, and the like) of a corresponding organization are sent as data in the columns of reference/knowledge and general control/knowledge. In this case, the temporary storage portion is used on the receiving side.

When an organization has disappeared or changed its name, the organization name or the like representing the personnel organization of knowledge data in the column of general control of the reception data group is sent together with attached memo information representing "disappear" or "name change". When the name is changed, a new name is sent. By executing the knowledge processing application, the organization name as knowledge data in the column of knowledge of the self data group is cleared or changed. The old organization name is directly recorded in the self log data group storage portion 302. The books of personnel associated with the new organization whose name has been changed are also transmitted. In this case, the books of the organization that has disappeared are deleted from the column of book of the self data group, or books of the organization which has changed its name are newly stored in the column of book of the self data group. In addition, knowledge data such as employee names to be written in the new personnel books are transmitted and stored in the column of knowledge in correspondence with item identification codes of the books.

In case of personnel changes as well, data of books and knowledge in the columns of reference and general control in the reception data group are transmitted.

[Case 6] The above system has a function of offset processing for billing slips agreed among a plurality of other company organizations.

For example, as described above, a company or organization as the partner of reception and object data to be received can be set in the reception data portion 310. In the knowledge tables of the self data group, records of merchandise sales billing slips transmitted to buyers or merchandise sales collection slips transmitted from merchandise vendors are collected.

This system therefore has a knowledge table in which information of merchandise sales billing slips (corresponding to bill collection) issued by transactions with a plurality of companies and information of merchandise purchase billing slips (corresponding to payment) from merchandise vendors are collected.

The knowledge table is used in the following way. The user displays the knowledge table and sets the offset amount range. Then, the amounts (collection amounts) described in merchandise sales billing slips (slips that are not paired with settled payment slips) are totalized within the set amount range. The amounts on merchandise purchase billing slips to be paid, which are transmitted from each vendor organization, are also totalized within the set amount (payment amount) range. Since the merchandise sales billing slips and merchandise purchase billing slips within the range of the above collection amount or payment amount are offset, these slips are added with codes of "settled" and stored in the column of knowledge of the self log data group storage portion. Unsettled billing slips are left in the column of knowledge of the self data group storage portion.

When a partner (organization) transmits a settled merchandise purchase billing slip, a settled payment slip is transmitted using the column of general control together with the number of the billing slip. The transmission data group storage portion 321 is used for this transmission. In addition, a pay-in slip in which the amount calculated from the settled merchandise sales billing slip is prepared and transmitted to a finance company or bank designated by the partner (organization) that has transmitted the merchandise purchase billing slip. The partner (organization) can receive cash or be accommodated with a loan from the finance company or bank on the basis of the payment slip. This processing can be executed in the computer of each organization every time or in units of weeks or months.

To transmit data to each partner company organization, bank, or finance company, a transmission application automatically executes transmission using a telephone number or partner identification code which registers the transmission destination.

Figure 65:
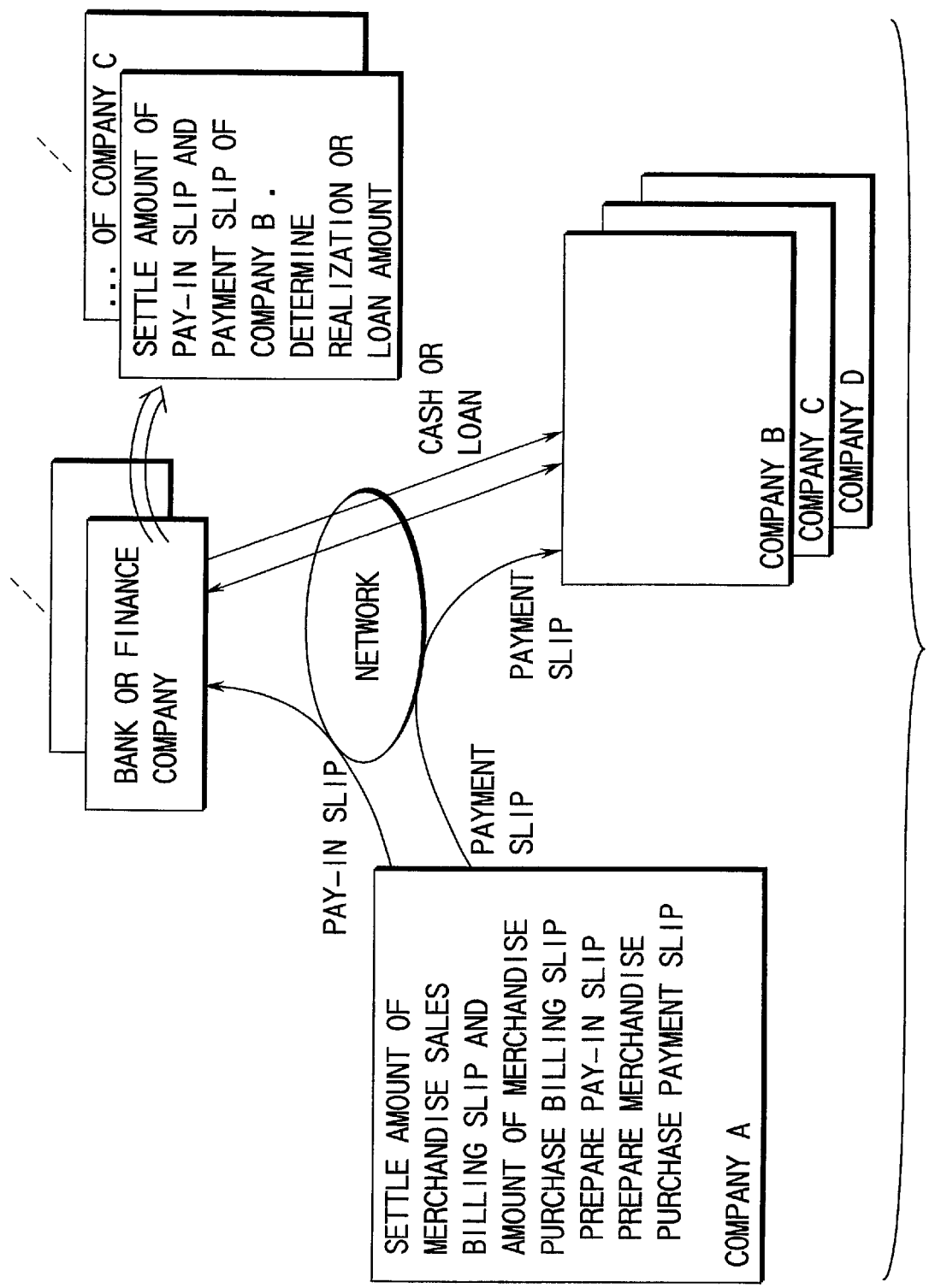
FIG. 65 is a view showing a use example of the apparatus of the present invention.

FIG. 65 shows the above settlement processing. In FIG. 65, a company A performs settlement processing, a company B receives a merchandise purchase payment slip from the company A and sends the payment slip to a bank or finance company for realization or financing. When each company executes this processing on the network, immediate settlement processing can be realized.

Between credible companies, the above settlement processing can be performed using order reception and order slips agreed with each other. The above settlement processing can also be performed using a deposit payment slip or deposit billing slip. Alternatively, realization or financing between the company and bank or finance company can be performed using a merchandise delivery slip.

The reason is as follows. With the above structure, intelligent processing can easily be performed with only data collection processing without preparing complex software for data processing. More specifically, a window desired by the user (slip, book, or table) and the IDs of items to be displayed on the window are made to correspond to each other. When a window (slip, book, or table) is selected, knowledge data of items to be displayed on the window are automatically selected from the column of knowledge and displayed.

When the user displays the menu window of a slip, book, or knowledge table and selects a desired window, the knowledge data are collected, and the contents of items are displayed. For slips, books, and knowledge tables as well, when a desired company or organization name is designated, the slips, books, and knowledge tables of the designated company or organization can be sorted.

Figures 66, 67:
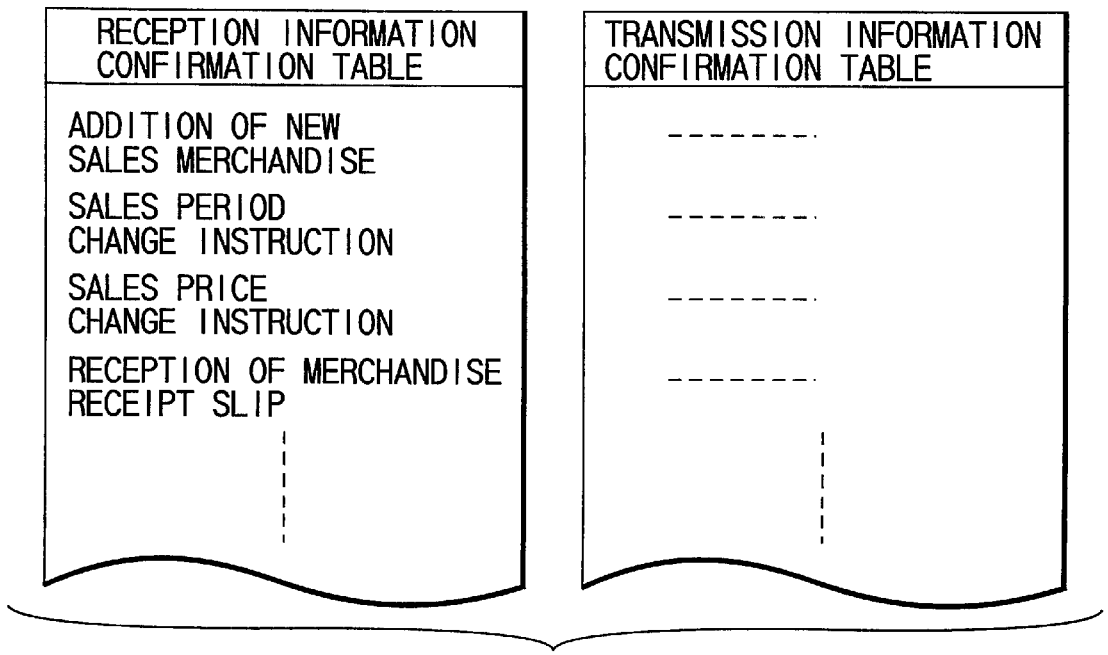
FIG. 66 is a view showing a transmission/reception confirmation table used in the apparatus of the present invention.
FIG. 67 is a view for explaining an example of preparation of the knowledge table used in the apparatus of the present invention.

FIG. 66 shows a display example of the reception information confirmation table and transmission information confirmation table. In this apparatus, when transmission or reception items are set, the list of items can be newly displayed, as described above. This is because items received or to be transmitted can be determined by reading the check flag "1" of the reception data group or transmission data group. When a slip, book, or knowledge information that is not described in the columns of reference and general control is transmitted, it can be determined as additional information. The items of the slip or book can be designated (check flag "1") in only the column of general control. When data is sent in the column of general control/knowledge, it can be determined that data of an instruction, change, or alteration is sent. When items of a slip or book are designated in the column of organization, and specific data is transmitted in the column of organization/knowledge, this means that information which is already set as transmission/reception data items in the network has arrived.

To prepare various tables in the column of general control, when a table preparation mode is designated, a window for inputting a table name appears, as shown in FIG. 67. A table name is input to the table name input column. Already input item names are scrolled by a scroll button, and necessary items are checked with check marks. When this table is displayed, the items with check marks appear. By designating and clicking a necessary item, detailed information of this item is displayed. As the item name, information of the self data group, which is described in the column of knowledge data, is read out and displayed.

As described above, the data structure of this system can easily be handled. This data structure may be recorded on a recording medium and reproduced.

Figure 68:
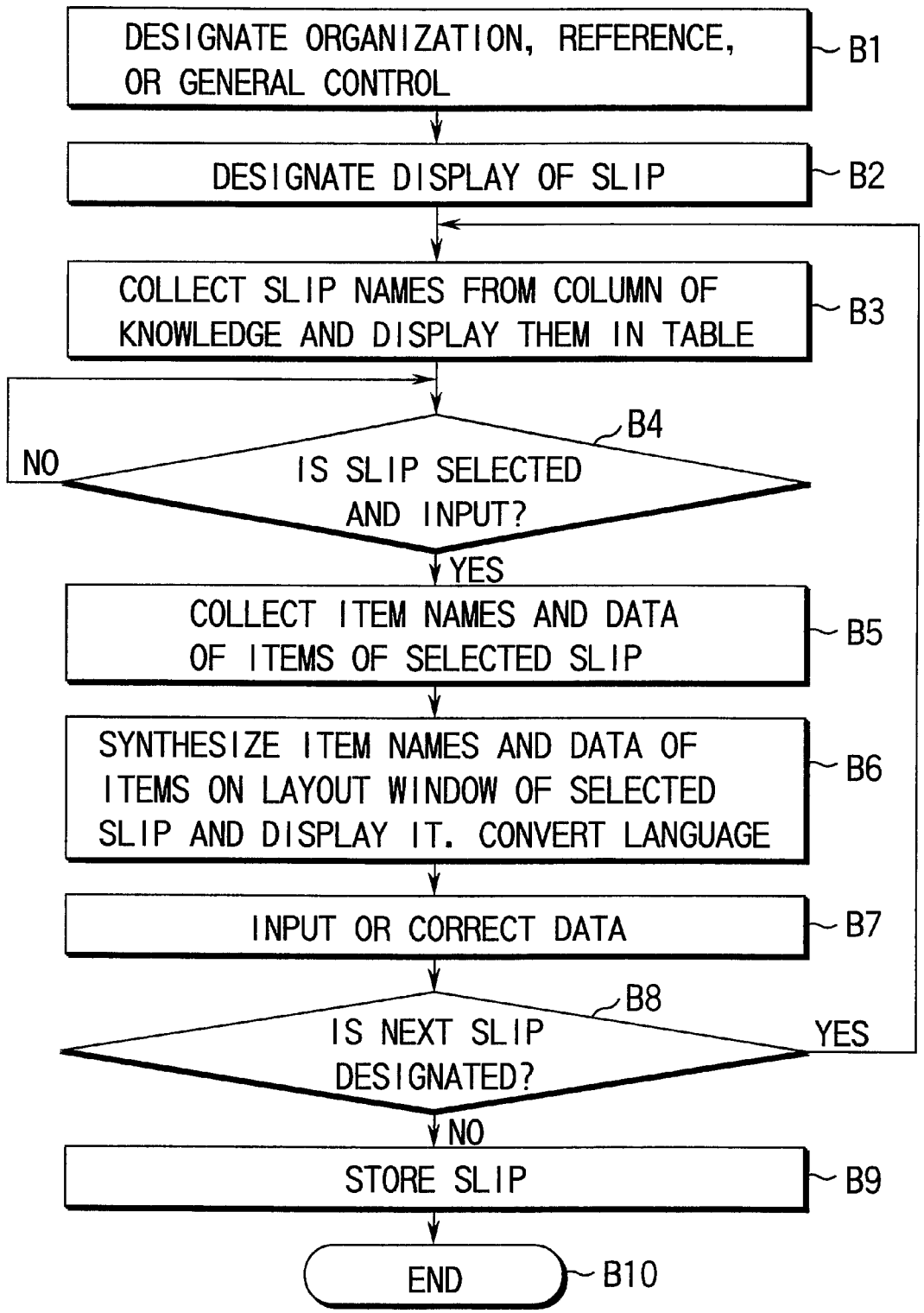
FIG. 68 is a flow chart showing a processing procedure of displaying slips used in the apparatus of the present invention.

FIG. 68 shows a data processing procedure of an application used by the user to display a slip and confirm the contents, or collect or input item data. To display a slip, first, slips in the column of organization, reference, or general control, which are to be displayed, are designated in the data structure shown in FIG. 15 (step B1). Next, the user instructs to display slips (step B2). The user operates the keyboard to input the designation and instruction. When display of slips is instructed, slip names are collected from the column of knowledge, listed in a table, and displayed. The user selects a desired slip. The user clicks a desired one of the displayed slip names to input the selection (step B4). When a slip is selected, the item names of the selected slip and data of the items are collected from the column of knowledge (step B5). The item names and data of the items are displayed on the layout window of the selected slip. According to the data structure shown in FIG. 15, the displayed contents can be converted into another language, so the language can be changed even at this time point (step B6). At this time, the data can be corrected or input (step B7). After this, the scroll button is clicked to display a window "display the next slip?". By clicking "YES", the flow returns to step B3. When "NO" is clicked, the displayed slip data is stored, and processing is ended (steps B8, B9, and B10).

The same processing procedure as for a slip can be used to process a book.

Figure 69:
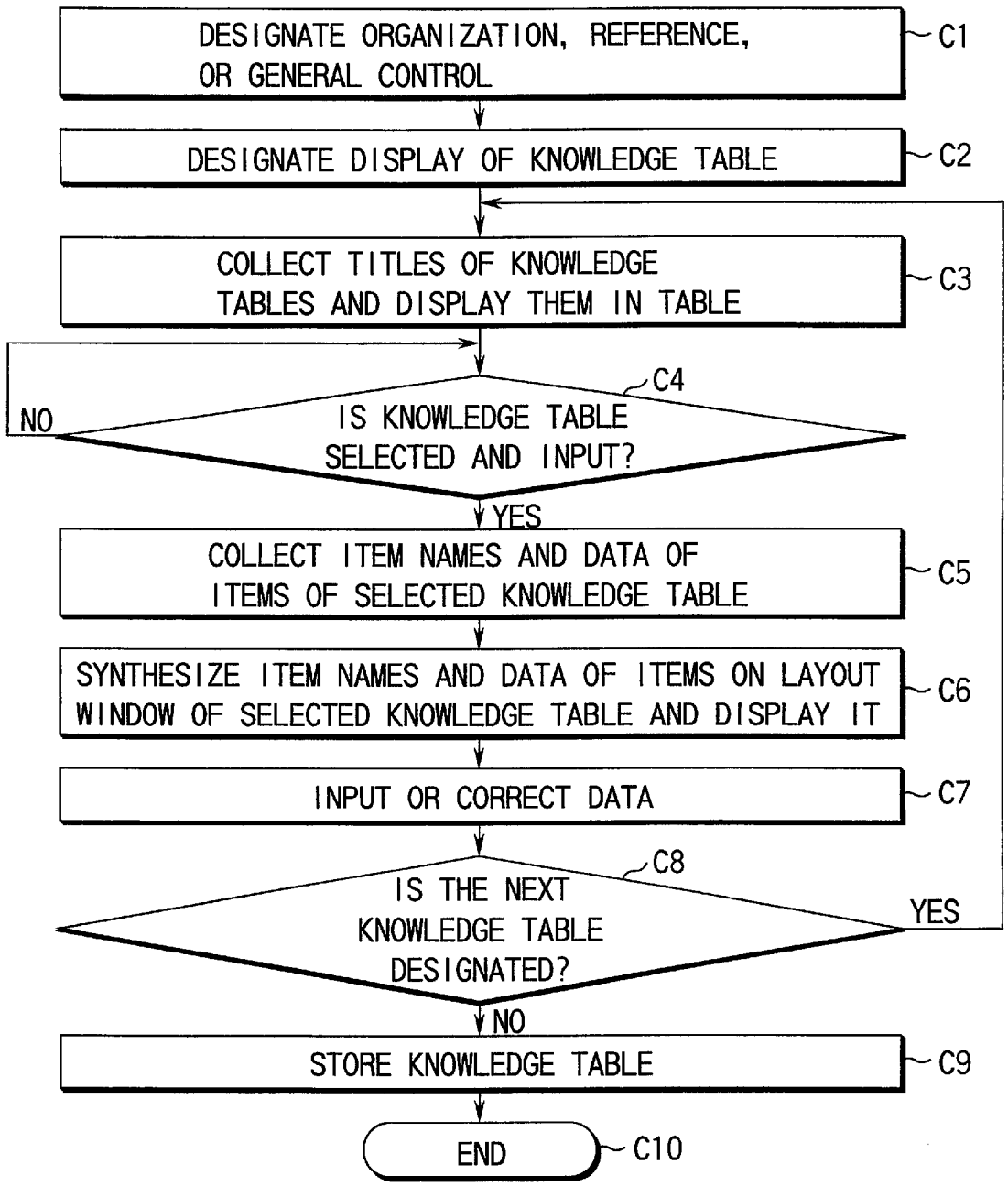
FIG. 69 is a flow chart showing a processing procedure of displaying items used in the apparatus of the present invention.

FIG. 69 shows a procedure executed to display a knowledge table stored in the column of knowledge and input or correct data.

To display a knowledge table, knowledge tables in the column of organization, reference, or general control, which are to be displayed, are designated in the data structure shown in FIG. 15 (step C1). Next, the user instructs to display knowledge tables (step C2). The user operates the keyboard to input the designation and instruction. When display of knowledge tables is instructed, knowledge table names are collected from the column of knowledge, listed in a table, and displayed. The user selects a desired knowledge table. The user clicks a desired one of the displayed knowledge table names to input the selection (step C4). When a knowledge table is selected, the item names of the selected knowledge table and data of the items are collected from the column of knowledge (step C5). The item names and data of the items are displayed on the layout window of the selected knowledge table (step C6). At this time, the data can be corrected or input (step C7). After this, the scroll button is clicked to display a window "display the next knowledge table?". By clicking "YES", the flow returns to step C3. When "NO" is clicked, the displayed knowledge table data is stored, and processing is ended (steps C8, C9, and C10).

Figure 70:
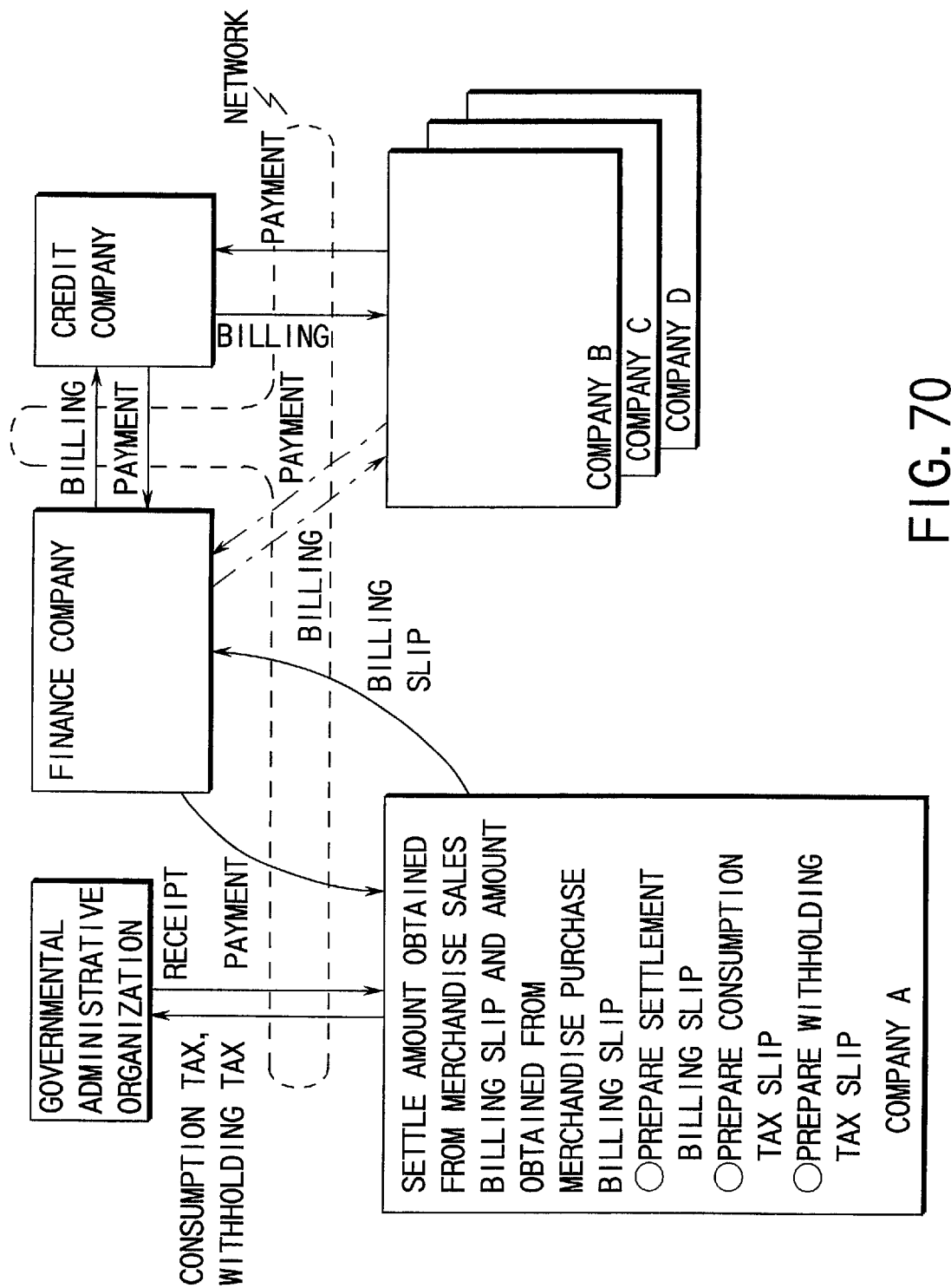
FIG. 70 is a view showing a use example of the apparatus of the present invention.

FIG. 70 shows another example of business transactions in the network constructed using the apparatus of the present invention.

As described above, when a company or organization as a transmission or reception partner is set, object data to be transmitted or received can be set. In the knowledge table of the self data group, records of merchandise sales billing slips transmitted to buyers and merchandise sales collection slips transmitted from merchandise vendors are collected (FIGS. 50A to 60D).

This system also has a knowledge table for collecting information of merchandise sales billing slips (corresponding to bill collection) issued by transactions with a plurality of companies and information of merchandise purchase billing slips (corresponding to payment) from merchandise vendors.

Assume that a user of the company A displays a knowledge table now and sets an offset amount range. The amounts (collection amounts) described in merchandise sales billing slips (slips that are not paired with settled payment slips) are totalized within the set amount range. The amounts on merchandise purchase billing slips to be paid, which are transmitted from each vendor organization, are also totalized within the set amount (payment amount) range. Since the merchandise sales billing slips and merchandise purchase billing slips within the range of the above collection amount or payment amount are offset, these slips are added with codes of "settled" and stored in the column of knowledge of the self log data group storage portion. Unsettled billing slips are left in the column of knowledge of the self data group storage portion.

Assume that the merchandise sales amount exceeds the merchandise purchase billing amount. In this case, a settlement billing slip representing the settlement result is prepared. Also, a consumption tax slip and withholding tax slip that are linked to this settlement billing slip are prepared.

The computer apparatus of the company A transmits the settlement billing slip to the finance company (company which makes temporary advance) and the consumption tax slip and withholding tax slip that are linked to this settlement billing slip to the administrative organization through the network.

The finance company pays cash or check or gives a loan to the company A in accordance with the amount on the settlement billing slip. The finance company can send a bill corresponding to the amount on the settlement billing slip to a credit company through the network and receive the cash, check, or loan. The credit company sends a bill corresponding to the amount on the settlement billing slip to, e.g., the company B corresponding to the settlement billing slip through the network. In response to this, the company B makes payment by cash or check to the credit company.

In the above example, the billing and payment relationships between the companies A and B are settled in the company A. The present invention is not limited to this, and the apparatus of the present invention can be used for various application purposes.

Figure 71:
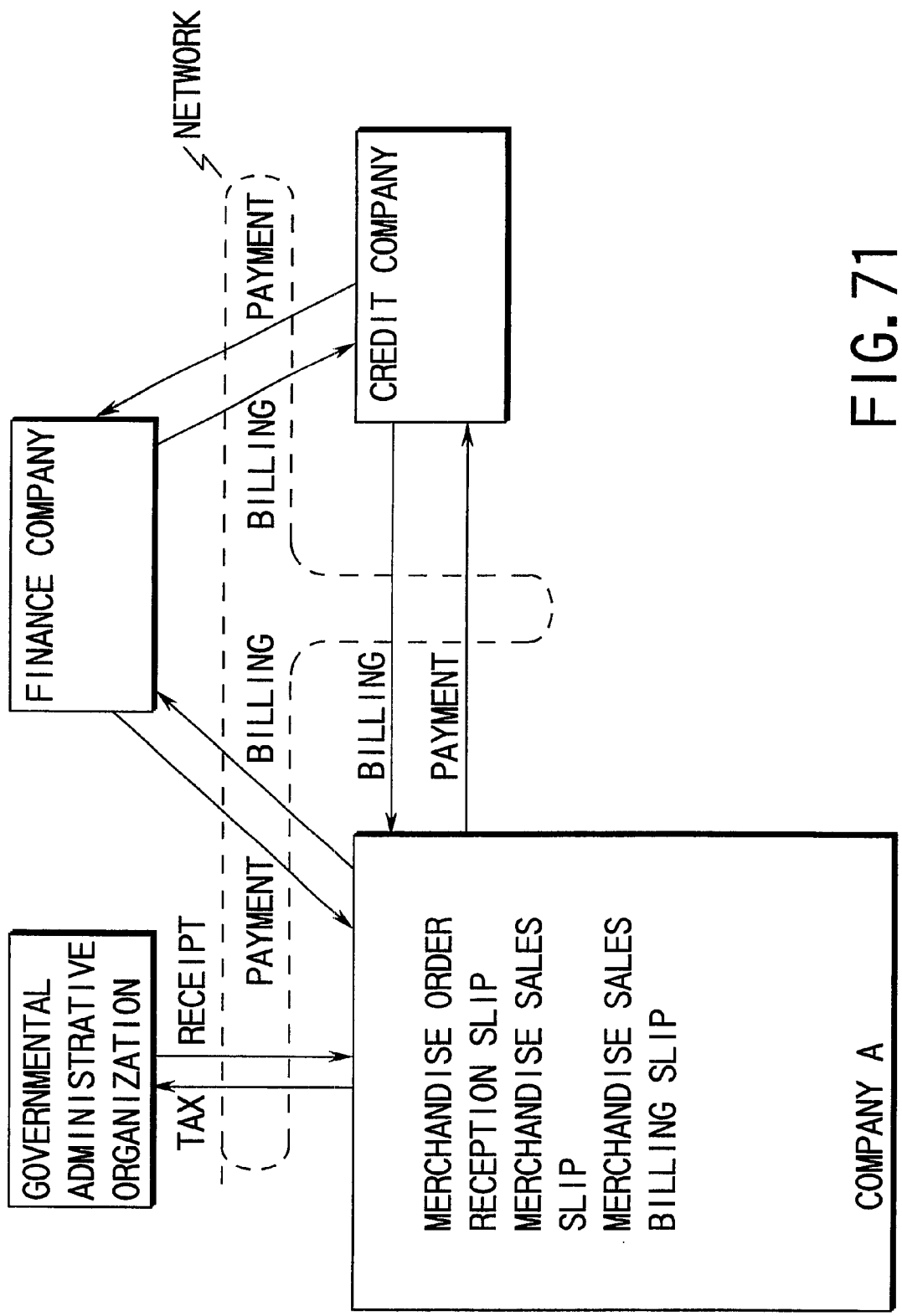
FIG. 71 is a view showing a use example of the apparatus of the present invention.

FIG. 71 shows still another example of business transactions in the network constructed using the apparatus of the present invention.

In this example, the company A demands loan or payment of cash or check from the finance company through the network at the stage of the merchandise sales billing slip, merchandise sales slip, or merchandise order slip on the basis of the slip. A slip used to pay taxes based on the billing slip to a public organization is transmitted to the governmental administrative organization. The finance company can demand loan or payment of cash or check based on the slip from a credit company in which the company A is registered, through the network. The credit company can bill the company A on the basis of the slip and receive payment.

When such a network is constructed, the company A can early receive cash or loan before payment from the merchandise buyer. The governmental administrative organization can also early obtain the tax revenue. The company A is not limited to a merchandise handling company but may be a medical organization, school, or other public organizations. When the knowledge table preparing function and transmission/reception regulation setting function are used, various applications are possible.

This system also has an item name use order setting function. A plurality of expressions are used for an item name stored in the column of knowledge, though the expressions have the same meaning. The item name use order setting function prepares a plurality of item names to be used and sets the priority of use of the plurality of item names. More specifically, companies or business circles sometimes use different expressions for the same meaning. For example, "cancel" may be expressed as "retract" or "retract reservation", and "purchase order" may be expressed as "reservation" or "order".

Figure 72:
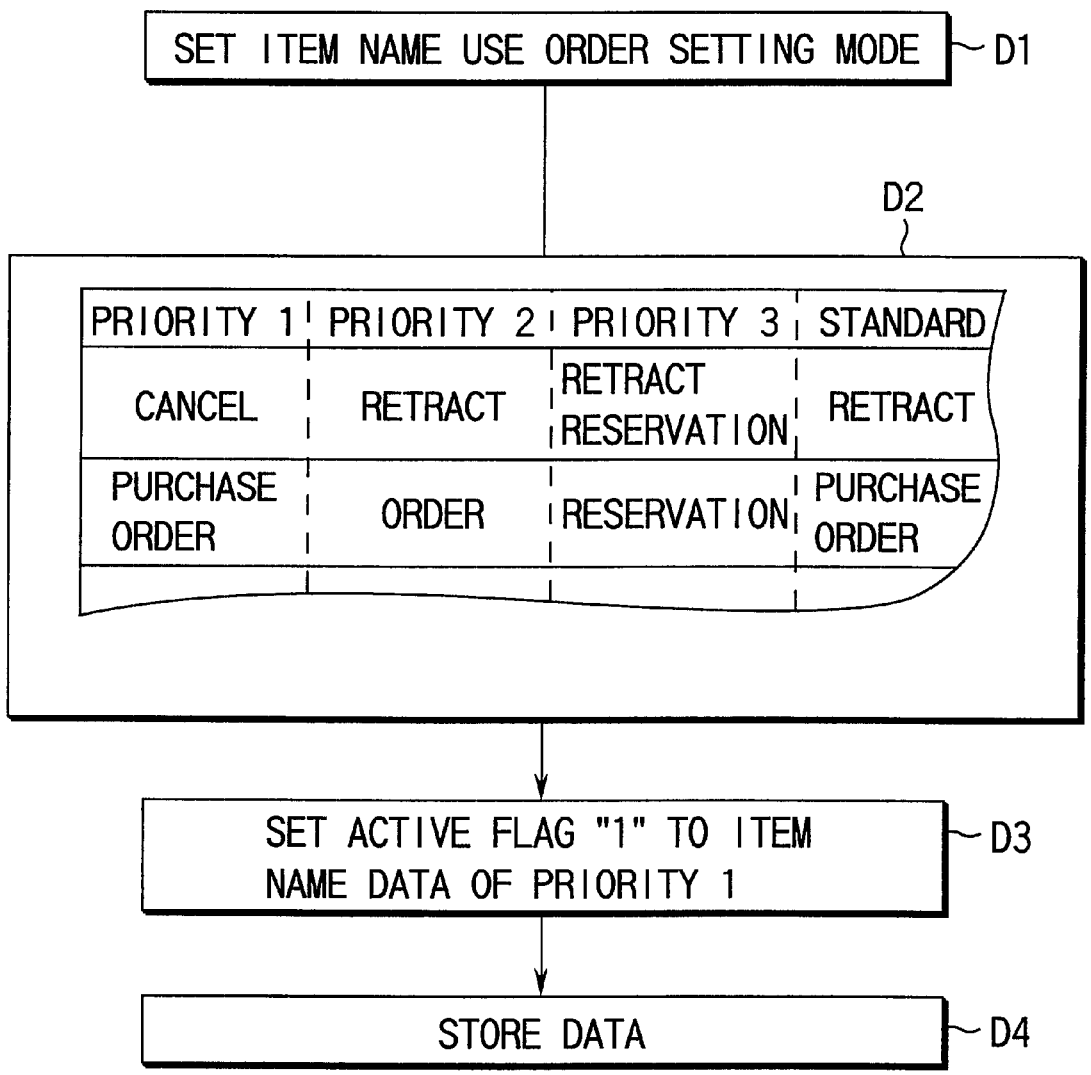
FIG. 72 is a flow chart showing a processing procedure for setting use item names used in the apparatus of the present invention.

FIG. 72 shows a procedure of setting the use order using the item name use order setting function. When an item name use order setting mode is set from the keyboard (step D1), a list of item names in the column of, e.g., reference/knowledge is displayed on the window. The first item name from the left of the window has priority 1. The second from the left of the window has priority 2 (step S2). The user can input an item name to be used in the column of item name of priority 1 through the keyboard, as needed. The user can also replace the item name of priority 1 with that of priority 2. The user can uniquely set item names to be used. Standard item names are also displayed on the item name list, which cannot be deleted. When the item name of priority 1 is set for actual use, and end operation is performed, an active flag is added to the data of the item name of priority 1 (steps D3 and D4). Hence, in the format of various items shown in FIG. 14, an active flag bit is added to item name data. The active flag and check flag described above are formed from one bit, though they actually have one byte.

The present invention is not limited to the above embodiment. In the data structure shown in FIG. 15, the columns of organization, reference, and general control are present in the vertical direction, and the columns of slip, book, and knowledge are present in the horizontal direction. However, the present invention is not limited to this order. The order of columns may be changed.

The titles "organization", "reference", "general control", "slip", "book", and "knowledge" need not be used as far as the nine areas have their meanings. More specifically, there are columns of slip, book, and knowledge used in the given company to which the user belongs, columns of slip, book, and knowledge used in both the given company and affiliated companies, and columns of slip, book, and knowledge used for a change or instruction. Slips in the three columns of slip are of the same type and have different identification codes. In addition, the active and inactive states of the slips are identified by active and check flags. Books in the three columns of book are of the same type and have different identification codes. In addition, the active and inactive states of the books are identified by active and check flags. Knowledge data in the three columns of knowledge are of the same type and have different identification codes. In addition, the active and inactive states of the knowledge data are identified by active and check flags. Furthermore, the contents of item data may be different.

In the system of the present invention, a sort function of various items is imparted as an application. For example, a list of buyer organizations, list of deal merchandises, list of order reception merchandises, or list of purchase order merchandises are displayed.

In the structures of a slip, book, and knowledge, another area is ensured. This area is used to record code information to be added later. For example, this area may be used as a special code area for a specific partner or an area for recording, e.g., descrambling key information. The effect of such special code is obtained in use for data communication with only, e.g., a governmental administrative organization.

The area may also be used as a code area for confirming a password for a specific person having, e.g., the layout window alteration authority. Alternatively, the area may be directly used as a password area.

As has been described above, according to the present invention, a very flexible data structure useful for management of data and business transactions can be provided. In addition, by obtaining a work assist method capable of increasing the flexibility of data processing for both other companies and a given company to which a user belongs, obtaining information simultaneity inside and outside the given company, performing quick data processing, and obtaining knowledge work processing, various determinations can be quickly made.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An intelligent data structure using a network, wherein data is used in an apparatus in a head office and a plurality of apparatus in branch offices and other companies, comprising:

reception processing means connected to a network, transmission processing means connected to the network, a self data group storage portion for a given company, a reception data group storage portion for the given company for storing data received by said reception processing means, a transmission data group storage portion for the given company, for storing data to be transmitted by said transmission processing means, a plurality of other company reception data group storage portions for storing data which is transmitted from each of other companies, and received by said reception processing means, and a plurality of other company transmission data group storage portions for storing data to be transmitted by said transmission processing means to said each of the companies, wherein said self data group storage portion, said reception data group storage portion, said transmission data group storage portion, said plurality of other company reception data group storage portions and said plurality of other company transmission data group storage portions have the same data structure in which slip data that means a slip has a structure comprising at least a slip identification code, a slip item identification code expressed or described in the slip, and a layout window identification code used to display the slip, book data that means a book has a structure comprising at least a book identification code, a book item identification code expressed or described in the book, and a layout window identification code used to display the book, and knowledge data that means knowledge comprises an actual data group corresponding to the slip identification code and the slip item identification code, and the book identification code and the book item identification code, a knowledge table formed from collection item identification codes prepared to collect items corresponding to the slip item identification code and the book item identification code, thereby gathering data of items corresponding to the collection item identification codes, and a layout window identification code used to display the knowledge table, the slip data is arranged in columns named organization, reference, and general control, each slip in each column having the same data structure, the book data is arranged in the columns named organization, reference, and general control, each book in each column having the same data structure, and the knowledge data is arranged in the columns named organization, reference, and general control, each knowledge data entry having the same data structure, data in the column named organization is defined as data used by said apparatus in said head office, data in the column named reference is defined as entire data used in said apparatus in said head office and other apparatuses of branch offices and other companies, and data in the column named general control is defined as data of at least an instruction, communication, or message, wherein the data in the column named general control is used in reflecting contents of data into the data of the organization or the data of the reference;

and wherein said knowledge data includes item name data which can be displayed in Japanese, English or Chinese;

and wherein data in said column named general control is received data indicating that a personnel organization of a branch or the head office is partially altered.

2. A structure according to claim 1, wherein when the slip, book, and knowledge data are received in the column named general control of the reception data group, the received knowledge data of the data can be displayed using the knowlege table so as to allow operation of permitting or inhibiting replacement of the received knowledge data with corresponding knowledge data of the self data group.

3. A structure according to claim 1, wherein a table for displaying a list of reception items received by said reception processing means is prepared as the knowledge table.

4. A structure according to claim 1, wherein a table for displaying an array of slips used in a sales process of merchandise is prepared as the knowledge table.

5. A structure according to claim 1, wherein a table for displaying an array of slips used in a purchase process of merchandise is prepared as the knowledge table.

6. A structure according to claim 1, wherein each of said self data group storage portion, said reception data group storage portion, and said transmission data group storage portion has a self log data group storage portion, a reception log data group storage portion, and a transmission log data group storage portion, respectively, for storing data with the same data structure as said corresponding self data group storage portion, said reception data group storage portion, and said transmission data group storage portion, respectively, each said log data group storage portion functioning to store old data before change, reception, and transmission of data, in said self data group storage portion, said reception data group storage portion and said transmission data group storage portion, respectively.

7. A structure according to claim 1, wherein each of said reception processing means and said transmission processing means has date conversion means for allowing data exchange with a device using a different data format.

8. A structure according to claim 1, wherein a table for displaying slips associated with past transactions of merchandise is prepared as the knowledge table, and said apparatus further comprises means for collecting actual data in the column named knowledge in correspondence with the slips in items of the table.

9. A structure according to claim 1, wherein said reception processing means has a slip and book item name conversion function.

10. An intelligent data structure using a network, comprising:

columns named slip, book, and knowledge used in a given company to which a user belongs;

columns named slip, book, and knowledge used in said given company and other companies; and columns named slip, book, and knowledge used for a change or instructions;

wherein slip formats in said slip columns are of the same type meaning they have the same data structure and have different identification codes, and active and inactive states are discriminated by an active flag, book formats in said book columns are of the same type meaning they have the same data structure and have different identification codes, and active and inactive states are discriminated by an active flag, and knowledge formats in said knowledge columns are of the same type meaning they have the same data structure and have different identification codes, active and inactive states are discriminated by an active flag, and said data structure has item names of the columns of corresponding slip and book and actual data of items and wherein said knowledge data includes item data which can be displayed in Japanese, English or Chinese;

and wherein data in said column named general control is received data indicating that a personnel organization of a branch or the head office is partially altered.

11. An intelligent data processing apparatus for a given company using a network comprising:

reception processing means connected to a network for receiving data transmitted by other computers some of which are operated by other companies on said network, transmission processing means connected to said network for transmitting data to other computers some of which are operated by other companies on said network, a self data group storage portion for said given company, a reception data group storage portion for the given company for storing data received by said reception processing means, a transmission data group storage portion for said given company for storing data to be transmitted by said transmission processing means, a plurality of other company reception data group storage portions for storing data which is transmitted from each of said other companies and received by said reception processing means, a plurality of other company transmission data group storage portions for storing data to be transmitted by said transmission processing means to each of said other companies, wherein said self data group storage portion, said reception data group storage portion, said transmission data group storage portion, said plurality of other company reception data group storage portions and said plurality of other company transmission data group storage portions all have the same data structure in which slip data is stored, each slip having a data structure comprising at least a slip identification code, a slip item identification code expressed or described in said slip, and a layout window identification code used to display said slip, book data is stored, each book having a data structure comprising at least a book identification code, a book item identification code expressed or described in said book, and a layout window identification code used to display said book, knowledge data is stored as a knowledge table, said knowledge data having a data structure comprising an actual data group corresponding to said slip identification code and said slip item identification code, and said book identification code and said book item identification code, thereby gathering data of items corresponding to collection item identification codes, and a layout window identification code used to display said knowledge table, and wherein said slip data is arranged in columns named organization, reference, and general control having the same data structure, and wherein said book data is arranged in the columns named organization, reference, and general control having the same data structure, and wherein said knowledge data is arranged in the columns named organization, reference, and general control having the same data structure, and wherein data in said column named organization is defined as data used by said intelligent data processing apparatus for said given company, and wherein data in said column named refererence is defined as entire data used in said intelligent data processing apparatus for said given company and other intelligent data processing apparatuses for said other companies, and and wherein data in said column named general control is defined as data for at least an instruction, communication, or message, and wherein the data in the column named general control is used in reflecting contents of data into the data of the organization or the data of the reference; and further comprising means for setting a format of a slip or book present in said self data group storage portion in said reception data group storage portion to regulate reception data and selling items of a slip or book present in said self data group storage portion in said transmission data group storage portion to regulate transmission data;

and wherein said knowledge data includes item name data which can be displayed in Japanese, English or Chinese;

and wherein data in said column named general control is received data indicating that a personnel organization of a branch or the head office is partially altered.

12. An apparatus according to claim 11, further comprising:

means for, when said slip, book, and knowledge data are transmitted in said column named general control of said reception data group storage portion, displaying received knowledge data of data in said knowledge table so as to allow operation of permitting or inhibiting replacement of said received knowledge data with corresponding knowledge data of said self data group.

13. An apparatus according to claim 11, further comprising:

transmission regulation means for selecting desired slip or book data and knowledge data when transmitting slip or book data and knowledge data by said transmission processing means.

14. An apparatus according to claim 11, further comprising:

reception regulation means for selecting desired slip or book data and knowledge data when receiving slip or book data and knowledge data by said reception processing means.

15. An apparatus according to claim 11, wherein the slip data and the knowledge data accompanying the slip data to be transmitted according to a transmission regulation of said transmission processing means are transmitted to a corresponding apparatust in a finance company.

16. An apparatus according to claim 11, wherein the slip data to be transmitted according to a transmission regulation of said transmission processing means are transmitted to a corresponding apparatus in a governmental administrative organization.

17. An apparatus according to claims 11, wherein the knowledge data contains item name data in a plurality of languages, and said apparatus has a language switching function in a display state of slips or books.

18. An intelligent recording medium used by a given company and using a network, comprising:

a self data group storage portion for a given company;

a reception data group storage portion for said given company for storing data received by a reception processing circuit;

a transmission data group storage portion for said given company for storing data to be transmitted by a transmission processing circuit;

a plurality of other company reception data group storage portions for storing data which is transmitted from each of one or more companies other than said given company, and a plurality of other companies transmission data group storage portions for storing data to be transmitted by a transmission processing circuit to each of one or more companies other than said given company, wherein said self data group storage portion, said reception data group storage portion, said transmission data group storage portion, said plurality of other company reception data group storage portions and said plurality of other company transmission data group storage portions have the same data structure in which slip data is stored, each slip having a data structure comprising at least a slip identification code, a slip item identification code expressed or described in the slip, and a layout window identification code used to display the slip, book data is stored, each book having a data structure comprising at least a book identification code, a book item identification code expressed or described in the book, and a layout window identification code used to display the book, and knowledge data is stored, said knowledge data comprising an actual data group corresponding to said slip identification code and said slip item identification code, and said book identification code and said book item identification code, a knowledge table formed from collection item identification codes prepared to collect items corresponding to said slip item identification codes and said book item identification code, thereby gathering data of items corresponding to said collection item identification codes, and a layout window identification code used to display said knowledge table, and wherein said slip data is arranged in columns named organization, reference, and general control, and wherein said book data is arranged in columns named organization, reference, and general control, and wherein said knowledge data is arranged in columns named organization, reference, and general control, and wherein data in said column named organization is defined as data used by said given company, and wherein data in said column named reference is defined as entire data used by said given company and other companies having computers coupled to said network, and wherein data in said column of general control is defined as data of at least an instruction, communication, or message, and wherein the data in the column named general control is used in reflecting contents of data into the data of the organization or the data of the reference; and wherein said medium has an application for processing for, when said slip, book, and knowledge data are transmitted in said column named general control of said reception data group, displaying received knowledge data of data in said knowledge table so as to allow operation of permitting or inhibiting replacement of received knowledge data with corresponding knowledge data of said self data group;

and wherein said knowledge data includes item name data which can be displayed in Japanese, English or Chinese;

and wherein data in said column named general control is received data indicating that a personnel organization of a branch or the head office is partially altered.

* * * * *